US012775946B2

(12) United States Patent
Seed et al.

(10) Patent No.: US 12,775,946 B2
(45) Date of Patent: Oct. 27, 2026

(54) SERVICE LAYER DYNAMIC AUTHORIZATION

(71) Applicant: IPLA Holdings Inc., New York, NY (US)

(72) Inventors: Dale N. Seed, Allentown, PA (US); Vinod Kumar Choyi, Conshohocken, PA (US); William Robert Flynn, IV, Schwenksville, PA (US); Quang Ly, North Wales, PA (US); Donald A. Fleck, Emmaus, PA (US); Richard P. Gorman, Ivyland, PA (US); Nicholas J. Podias, Brooklyn, NY (US); Michael F. Starsinic, Newtown, PA (US); Hongkun Li, Malvern, PA (US); Zhuo Chen, Claymont, DE (US); Yogendra C. Shah, Exton, PA (US); Shamim Akbar Rahman, Cote St. Luc (CA)

(73) Assignee: IPLA Holdings Inc., New York, NY (US)

( * ) Notice: Subject to any disclaimer, the term of this patent is extended or adjusted under 35 U.S.C. 154(b) by 5 days.

(21) Appl. No.: 19/019,067

(22) Filed: Jan. 13, 2025

(65) Prior Publication Data

US 2025/0148462 A1 May 8, 2025

Related U.S. Application Data

(63) Continuation of application No. 15/248,952, filed on Aug. 26, 2016, now abandoned.

(Continued)

(51) Int. Cl.

| | |
|---|---|
| ***G06Q 20/40*** | (2012.01) |
| ***H04L 9/40*** | (2022.01) |

(Continued)

(52) U.S. Cl.

CPC .......... *G06Q 20/40* (2013.01); *G06Q 20/401* (2013.01); *G06Q 20/4016* (2013.01);

(Continued)

(58) Field of Classification Search

CPC .. G06Q 20/40; G06Q 20/401; G06Q 20/4016; H04W 12/084; H04W 12/086; H04L 63/10; H04L 63/20; H04L 67/12

See application file for complete search history.

(56) References Cited

U.S. PATENT DOCUMENTS

| | | | |
|---|---|---|---|
| 7,797,754 | B2 | 9/2010 | Carroll et al. |
| 9,432,379 | B1 | 8/2016 | Roche et al. |

(Continued)

FOREIGN PATENT DOCUMENTS

| | | | |
|---|---|---|---|
| CN | 100361435 | C | 1/2008 |
| CN | 101311957 | A | 11/2008 |

(Continued)

OTHER PUBLICATIONS

Elmangoush et al., Design of RESTful APIs for M2M services, 16th Int'l. Conf. on Intelligence in Next Generation Networks, IEEE, Oct. 2012, pp. 50-56 (Year: 2012).*

(Continued)

*Primary Examiner* — Scott C Anderson
(74) *Attorney, Agent, or Firm* — XSENSUS, LLP

(57) ABSTRACT

An extensible policy-based service layer dynamic authorization framework can allow a service layer to determine whether or not to grant or deny a registrant access to a resource or service hosted by the service layer for which the registrant currently lacks the proper privileges to access. This method can also enable a service layer to dynamically update its statically configured authorization privileges (by leveraging its dynamic authorization results) such that future requests from the same registrant and to the same resource (Continued)

and service do not require dynamic authorization to be performed.

20 Claims, 45 Drawing Sheets

Related U.S. Application Data

(60) Provisional application No. 62/211,471, filed on Aug. 28, 2015.

(51) Int. Cl.
*H04L 67/12* (2022.01)
*H04W 12/084* (2021.01)
*H04W 12/086* (2021.01)
*H04W 4/70* (2018.01)

(52) U.S. Cl.
CPC .............. *H04L 63/10* (2013.01); *H04L 63/20* (2013.01); *H04L 67/12* (2013.01); *H04W 12/084* (2021.01); *H04W 12/086* (2021.01); *H04W 4/70* (2018.02)

(56) References Cited

U.S. PATENT DOCUMENTS

| | | | | |
|---|---|---|---|---|
| 2003/0191719 | A1 | 10/2003 | Ginter et al. | |
| 2008/0184353 | A1 | 7/2008 | Carroll et al. | |
| 2009/0196173 | A1* | 8/2009 | Wang | H04W 72/52 370/230 |
| 2009/0228956 | A1 | 9/2009 | He et al. | |
| 2010/0265947 | A1 | 10/2010 | Kokot et al. | |
| 2011/0252483 | A1 | 10/2011 | Cross et al. | |
| 2012/0084831 | A1 | 4/2012 | Hu et al. | |
| 2013/0173747 | A1* | 7/2013 | Kim | H04L 67/52 709/217 |
| 2013/0317632 | A1 | 11/2013 | Moon et al. | |
| 2013/0336627 | A1* | 12/2013 | Calvert | H04N 21/2187 386/224 |
| 2015/0020151 | A1* | 1/2015 | Ramanathan | G06F 21/10 726/1 |
| 2015/0033305 | A1 | 1/2015 | Shear et al. | |
| 2015/0033312 | A1 | 1/2015 | Seed et al. | |
| 2015/0059003 | A1 | 2/2015 | Bouse | |
| 2015/0135277 | A1* | 5/2015 | Vij | H04L 63/0892 726/4 |
| 2015/0163206 | A1* | 6/2015 | McCarthy | G06F 21/6227 726/4 |
| 2015/0237073 | A1 | 8/2015 | Lang et al. | |
| 2015/0244724 | A1 | 8/2015 | Xu et al. | |
| 2019/0318348 | A1 | 10/2019 | Brenner et al. | |

FOREIGN PATENT DOCUMENTS

| | | | |
|---|---|---|---|
| CN | 101453354 | A | 6/2009 |
| CN | 101563871 | A | 10/2009 |
| CN | 103927316 | A | 7/2014 |
| EP | 2911084 | A2 | 8/2015 |
| KR | 10-2013-0133988 | A | 12/2013 |
| KR | 10-2015-0014345 | A | 2/2015 |
| WO | 2015/013485 | A2 | 1/2015 |
| WO | 2017/040263 | A1 | 3/2017 |

OTHER PUBLICATIONS

Applicant IDS (Year: 2020).

Chiosi et al, "Network Functions Virtualisation", Network Functions Virtualisation—Introductory White Paper, Issue 1, 2012, http://portal.etsi.org/NFV/NFV White Pager.pdf.

European Telecommunications Standards Institute (ETSI), GS NFV 002 V1.2.1, "Network Functions Virtualisation (NFV); Architectural Framework", Dec. 2014, 21 pages.

European Telecommunications Standards Institute (ETSI), GS NFV 003 V1.2.1, Network Functions Virtualisation (NFV); Terminology for Main Concepts in NFV, Dec. 2014, 13 pages.

European Telecommunications Standards Institute (ETSI), GS NFV 004 V1.1.1, Network Functions Virtualisation (NFV); Virtualisation Requirements, Oct. 2013, 17 pages.

International Patent Application No. PCT/US2016/048398: International Search Report and The Written Opinion dated Oct. 19, 2016, 11 pages.

Lei et al, "An Overview of Reliable Server Pooling Protocols", Network Working Group, RFC 5351, Sep. 2008, 15 pages.

OneM2M "Functional Architecture" TS-0001 V1.6.1, Technical specification, Jan. 30, 2015, 321 pages.

OneM2M "Service Component Architecture", TS-0007-Service_Component_Architecture-V0_2_0, Technical Specification, May 15, 2014, 47 pages.

Sprecher, N. and Hu, Yun-Chao, "Multi-Access Edge Computing", ETSI, 2 pages, 2017, http://www.etsi.org/technologies-clusters/technologies/multi-access-edge-computing?tmpl=.

Zong et al, "Virtualized Network Function (VNF) Pool Problem Statement Draft-zong-vnfpool-problem-Statement-06", Network Working Group, Internet-Draft, Jul. 1, 2014, 13 pages.

* cited by examiner

SERVICE LAYER DYNAMIC AUTHORIZATION

CROSS-REFERENCE TO RELATED APPLICATIONS

This Application is a continuation of U.S. patent application Ser. No. 15/248,952, filed Aug. 26, 2016, which claims the benefit of U.S. Provisional Patent Application Ser. No. 62/211,471, filed Aug. 28, 2015, the disclosures of which are hereby incorporated by reference as if set forth in their entirety.

BACKGROUND

From a protocol stack perspective, middleware service layers are typically layered on top of existing network protocol stacks and provide value added services to client applications as well as other services. Hence, service layers are often categorized as 'middleware' service layers. For example, FIG. 1 shows a service layer 102 located in between an IP networking stack and applications. Note, another example could involve layering a service layer 102 directly over a transport protocol such as TCP or UDP or over a non-RESTful protocol such as SOAP (not shown in FIG. 1).

An example deployment scenario of middleware service layer instances within a network is shown in FIG. 2. In this example, the service layer instances are deployed on various network nodes (gateways and servers) and are providing value-added services to network applications, device applications, and to the network nodes themselves.

An M2M/IoT service layer 102 is an example of one type of middleware service layer specifically targeted towards providing value-added services for M2M/IoT type devices and applications. Recently, several industry standards bodies (e.g. oneM2M described in oneM2M Functional Architecture, oneM2M-TS-0001 oneM2M Functional Architecture-V-1.10.0, ETSI M2M Machine-to-Machine communications (M2M) Functional Architecture, Draft ETSI TS 102 690 1.1.1 (2011-10), and OMA LWM2M described in OMA Lightweight M2M (LWM2M) Technical Specification, Draft Version 1.0-14 Mar. 2013)) have been developing M2M/IoT service layers to address the challenges associated with the integration of M2M/IoT types of devices and applications into deployments such as the Internet/Web, cellular, enterprise, and home networks.

An M2M service layer 102 can provide applications and devices access to a collection of M2M centric capabilities supported by the service layer 102. A few examples include security, charging, data management, device management, discovery, provisioning, and connectivity management. These capabilities are made available to applications via APIs which make use of message formats, resource structures and resource representations supported by the M2M service layer 102.

The purpose and goal of oneM2M is to develop technical specifications which address the need for a common M2M service layer 102 that can be readily embedded within various hardware and software platforms, and relied upon to connect a wide variety of devices in the field with M2M application servers worldwide.

The oneM2M services layer supports a set of Common Service Functions (CSFs) (i.e., service capabilities). An instantiation of a set of one or more particular types of CSFs is referred to as a Common Services Entity (CSE) (i.e., service layer) which can be hosted on different types of network nodes (e.g. infrastructure node, middle node, application-specific node). These common functions are exposed via the Mca, Mcc and Men reference points as shown in FIG. 3. The Mca reference point designates communication flows between an Application Entity (AE) and a CSE, while the Mcc reference point designates communication flows between two CSEs in the same M2M Service Provider domain. Communications across Mca and Mcc take place via paired Request/Response messages, wherein each request performs a specific RESTful operation (e.g., Create, Retrieve, Update, and Delete) upon a resource hosted on the targeted CSE. Mcc' is used between CSEs located in the Infrastructure Domain of different M2M SPs. Men is used between a CSE and an underlying Network Services Entity (NSE) for services other than transport and connectivity.

CSEs are hosted on architectural entities referred to as "nodes". A node is a functional entity that contains a) one CSE and zero or more AEs, or b) one or more AEs. The oneM2M architecture supports various types of node configurations as shown in FIG. 4.

The initial set of common service functions (CSF) supported by oneM2M is shown in FIG. 5. A particular CSE implementation may not support every function, but a complete implementation would include all the functions in the illustration.

Per the oneM2M RESTful architecture, CSFs are represented as a set of "resources". A resource is a uniquely addressable entity in the architecture having a representation that can be manipulated via RESTful methods such as Create, Retrieve, Update, and Delete. These resources are made addressable using Universal Resource Identifiers (URIs). A resource may contain child resources and attributes. A child resource is a resource that has a containment relationship with a parent resource. The parent resource representation contains references to its child resources. The lifetime of a child resource is limited by the parent's resource lifetime. Each resource supports a set of "attributes" that store information about the resource.

Authentication is the process of validating that the identity of a service layer registrant is associated with a trustworthy credential. How to perform an authentication process will depend on the authentication mechanism used. For example, in the case of certificate-based authentication, authentication typically involves verifying a digital signature. In the case of symmetric key authentication, authentication typically involves verifying a Message Authentication Code (MAC). Mutual Authentication is a two-way authentication which occurs between a registrant and the service layer it is registering to. Hence, mutual authentication is the process of the service layer validating the identity of the registrant as well as the registrant validating the identity of the service layer.

Service layer authorization mechanisms are used to control access to resources and/or services hosted in the service layer. Authorization typically involves allowing authenticated registrants to access resources and services hosted in a service layer based on statically provisioned authorization policies and assigned roles. An authorization policy is a set of rules that define whether a given service layer registrant is permitted to access a protected resource or service hosted in the service layer. These policies can be based on different mechanisms. Three common types of authorization policies are Authorization List (ACL), Role Based Authorization (RBAC), and Subscription Based Authorization (SBAC).

A service layer ACL defines which service layer registrants are permitted to access which resources and services, as well as which operations they are allowed to perform on a given resource or service. For example, registrant 123 is allowed to read (but not write) resource ABC.

A service layer RBAC defines privileges to perform specific operations on resources or services based on the specific role assigned to the registrant. For example, registrant 123 may have a role as 'administrator' while registrant 456 may have a role as 'user'. RBAC may define privileges that 'administrator' has both read and write access to particular resources while 'user' has only read access.

A service layer SBAC defines privileges to perform specific operations on a resource or services based on the subscription level of the registrant. For example, registrant 123 may have a subscription which entitles it to access certain types of services but not others based on the cost of the subscription.

ACL, RBAC, and SBAC privileges can be pre-provisioned (i.e., configured out-of-band) based on a service layer subscription model. For example, based on the type of service layer subscription that a registrant has pre-established between itself and the service layer provider, the subscription can determine the types of privileges granted to the registrant when it attempts to access service layer resources and services.

M2M service layers (e.g. oneM2M, ETSI M2M, OMA LWM2M) are examples of service layers that support authorization mechanisms such as the ones described above.

Note, that the focus of this disclosure is on enhancements to the authorization functionality associated with service layer authorizations (not identification and authentication).

oneM2M defines an existing <accessControlPolicy> resource that supports a configured set of privileges as shown in FIG. 6A. The privileges can be configured with a set of authorization rules (i.e., policies) defining which authenticated service layer registrants have privileges to access resources associated with the <accessControlPolicy> resource. Once configured these privileges are typically static from the perspective of the service layer. The service layer does not dynamically create, update, or delete privileges on-the-fly.

To date, oneM2M has defined privileges based on an ACL policy. oneM2M defines this ACL policy as a set of access-control-rule tuples that can be stored within the privileges attribute, where each tuple is comprised of three components: AccessControlOriginators, accessControlOperations, accessControlContext.

- accessControlOriginators—The set of service layer registrants authorized to access resources associated with this authorization policy (e.g. list of CSE-IDs or AE-IDs).
- accessControlOperations—The set of operations that each authorized service layer registrant is authorized to perform (e.g. Create, Retrieve, Update, and Delete).
- accessControlContext—oneM2M currently defines the following three types of authorization context:
- accessControlTime Windows—Time window during which requests are allowed. Requests occurring outside this time to resources associated with this authorization policy will be denied
- accessControlLocationRegions—List of locations where service layer registrants are allowed to be located when accessing resources associated with this authorization policy. Requests from service layer registrants from locations not in this list will be denied.
- accessControlIpAddresses—IP addresses of service layer registrants allowed to access resources associated with this authorization policy. Requests from service layer registrants that have IP addresses not in this list will be denied.

The OAuth 2.0 authorization framework enables a third-party client application to obtain access to an HTTP resource on behalf of the resource owner. OAuth specifies a process for resource owners to authorize third-party access to their resources without sharing their credentials. Designed specifically to work with Hypertext Transfer Protocol (HTTP), OAuth essentially allows access tokens to be issued to third-party client applications by an authorization server, with the approval of the resource owner. The application then uses the access token to access the protected resources hosted by the resource server, as shown in FIG. 6B.

In Step A of FIG. 6B, the client requests authorization from the resource owner. The authorization request can be made directly to the resource.

In Step B of FIG. 6B, the client receives an authorization grant, which is a credential representing the resource owner's authorization.

In Step C of FIG. 6B, the client requests an access token by authenticating with the authorization server and presenting the authorization grant.

In Step D of FIG. 6B, the authorization server authenticates the client and validates the authorization grant, and if valid, issues an access token.

In Step E of FIG. 6B, the client requests the protected resource from the resource server and authenticates by presenting the access token.

In Step F of FIG. 6B, the resource server validates the access token, and if valid, serves the request.

SUMMARY

An extensible policy-based service layer dynamic authorization framework can allow a service layer to determine whether or not to grant or deny a registrant access to a resource or service hosted by the service layer for which the registrant currently lacks the proper privileges to access. This method can also enable a service layer to dynamically update its statically configured authorization privileges (by leveraging its dynamic authorization results) such that future requests from the same registrant and to the same resource and service do not require dynamic authorization to be performed.

A method to allow a service layer registrant to specify consultation-based dynamic authorization policies for its resources or services that a service layer can then use to consult the registrant to determine whether or not to grant or deny other service layer registrants privilege to access its resources or services can be used.

A method for a service layer registrant to specify payment-based dynamic authorization policies for its resources or services which a service layer can then use to support dynamic authorization to other registrants can be used. Wherein privileges are granted or denied based on the rate other service layer registrants are willing to pay to access the resources or services can be used.

A method for a service layer registrant to specify barter-based dynamic authorization policies for its resources or services wherein these policies allow the service layer to dynamically barter on behalf of a registrant wishing to gain access to other registrant's resources and services in exchange for access to its own resources or services can be used.

A method for a service layer registrant to specify security-assessment-based dynamic authorization policies for its resources or services wherein these policies allow the service layer to dynamically assess the security level of a registrant wishing to gain access to other registrant's resources and services and determine whether its level of security meets dynamic authorization requirements or not can be used.

A method for a service layer registrant to specify reputation-based dynamic authorization policies for its resources or services wherein these policies allow the service layer to dynamically assess the reputation level of a registrant wishing to gain access to other registrant's resources and services and determine whether its reputation meets dynamic authorization requirements, or not, can be used.

Embodiments of the proposed service layer dynamic authorization features for a oneM2M-based system are described. The embodiments include oneM2M architecture, resource-level, messaging-level and procedural-level proposals that describe how the service layer dynamic authorization features defined by this disclosure can be realized in a oneM2M system.

Note that although the methods and embodiments defined in this disclosure are described in terms of M2M/IoT service layers, these ideas can also be applied to other types of service layers as well.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein.

DETAILED DESCRIPTION OF ILLUSTRATIVE EMBODIMENTS

Figure 1:
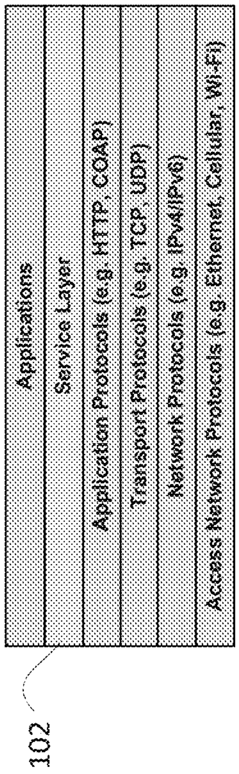
FIG. 1 is a diagram of a protocol stack supporting a middleware service layer
Figure 2:
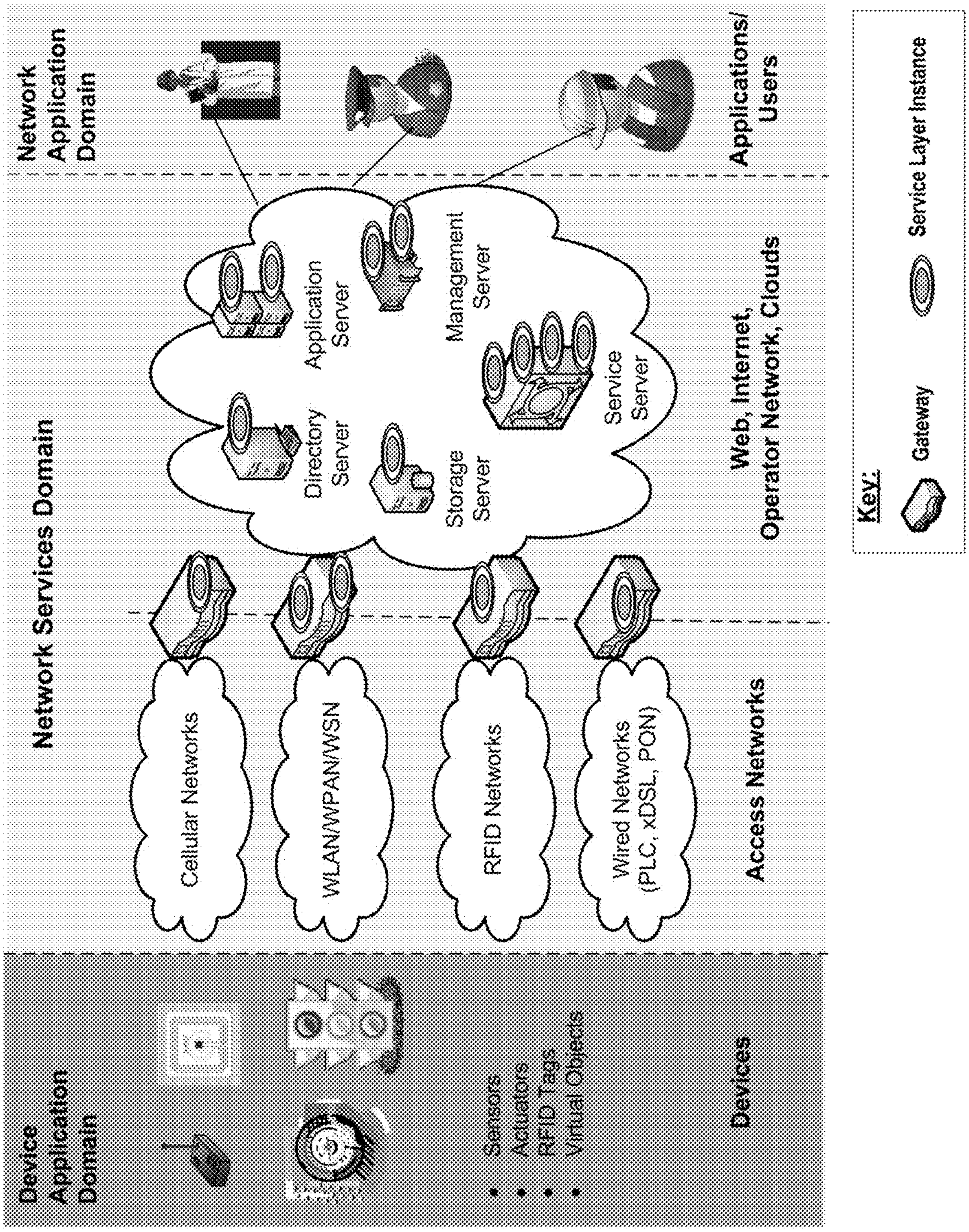
FIG. 2 is a diagram of an exemplary middleware service layer deployment within a network
Figure 3:
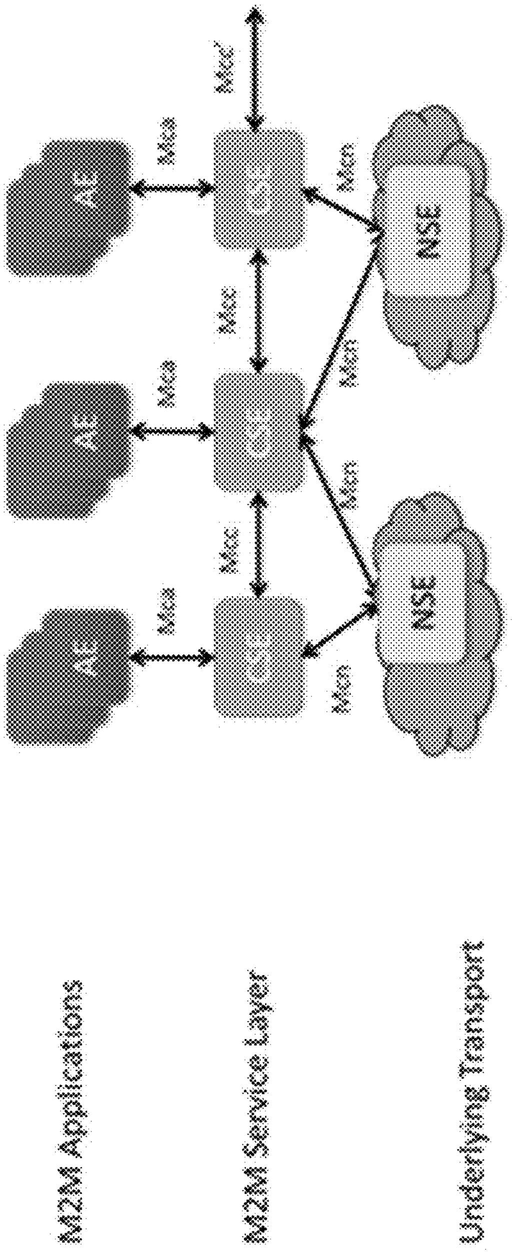
FIG. 3 is a diagram of a oneM2M Architecture
Figure 4:
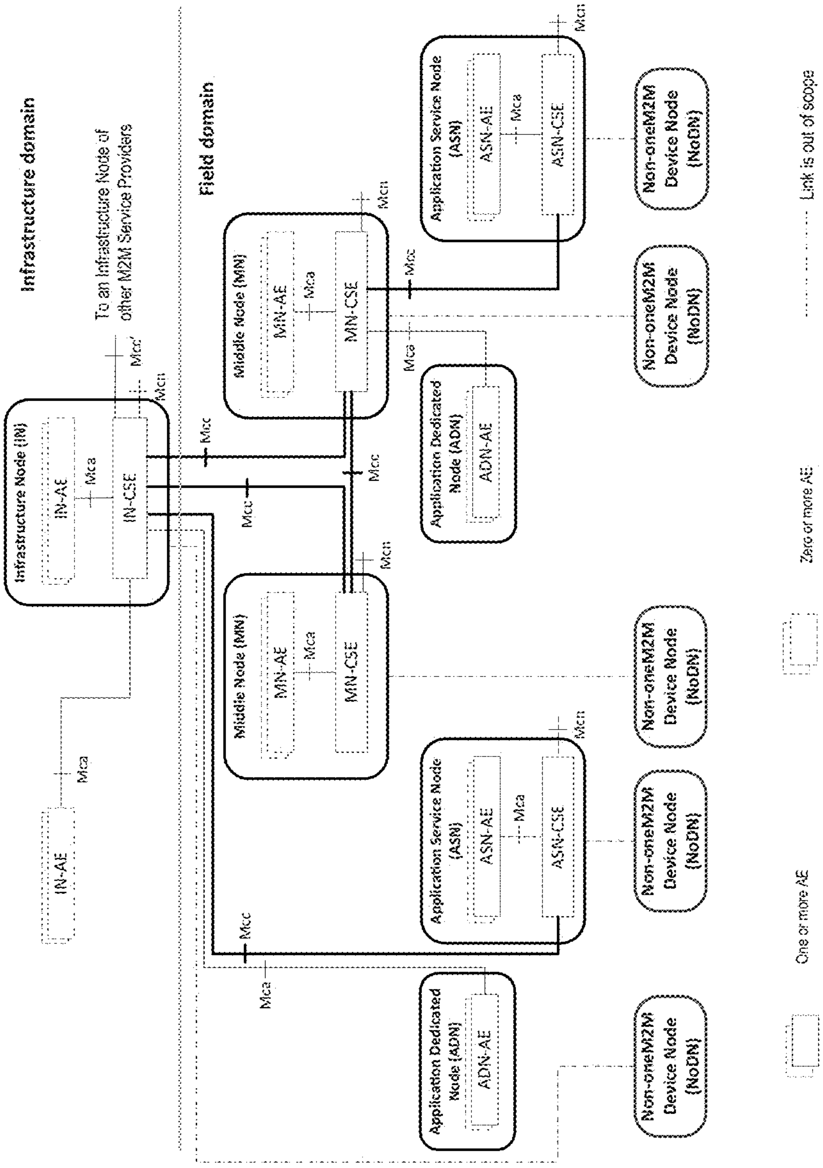
FIG. 4 is a diagram of a oneM2M Architecture Configurations
Figure 5:
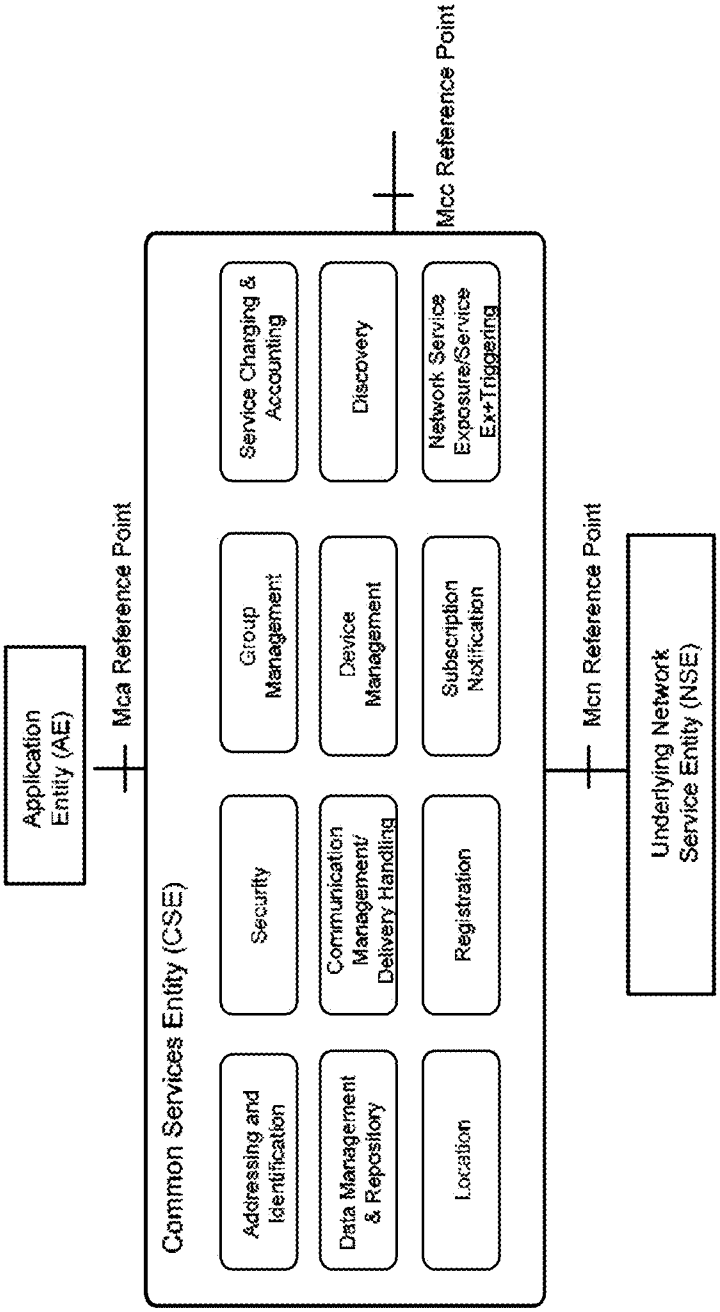
FIG. 5 is a diagram of a oneM2M CSFs

AAA Authentication, Authorization, and Accounting
ACL Access Control List
ACP Access Control Policy
AE Application Entity
API Application Programming Interface
CSF Capability Service Function
CSE Capability Service Entity
IoT Internet of Things
MAC Message Authentication Code
MAF M2M Authentication Function
MEF M2M Enrollment Function
M2M Machine to Machine
NSE Network Service Entity
PA Policy Administration
PD Policy Determination
PE Policy Enforcement
PI Policy Information
RBAC Role Based Authorization
SBAC Subscription Based Authorization
SLDA Service Layer Dynamic Authorization
SLSA Service Layer Static Authorization
SP Service Provider
URI Universal Resource Identifier A Network Node can be an addressable entity within a network hosting resources or services. A network node may be either a physical entity (e.g., a device, gateway, or server) or a virtual entity (e.g., Virtual Machine) in a network.

A resource can be an addressable entity having a representation that can be manipulated via RESTful methods such as Create, Retrieve, Update, and Delete.

A service can be set of related software functionalities accessed via a supported interface (E.g., a data storage service).

A service layer 102 can be a software layer that hosts resources and services that are made available to Service Layer registrants through a set of Application Programming Interfaces (APIs) and underlying networking interfaces.

A Service Layer Registrant can be an entity that registers to a Service Layer. For example, an application, an individual service, or another instance of a Service Layer.

In one embodiment, Service Layer Dynamic Authorization can include 1) whether to grant or deny privileges to access a resource or service hosted by a service layer for which a requester currently lacks the proper privileges to access and 2) whether to update static authorization privileges with dynamic authorization results such that future requests from the same registrant and to the same resource and service do not require dynamic authorization to be performed.

A Common Service Function (CSF) is a oneM2M term for a Service supported by a Service Layer. A Common Service Entity CSE is a oneM2M term for a Service Layer.

Existing service layers (e.g. oneM2M described in oneM2M Functional Architecture, oneM2M-TS-0001 oneM2M Functional Architecture-V-1.10.0, ETSI M2M Machine-to-Machine communications (M2M) Functional Architecture, Draft ETSI TS 102 690 1.1.1 (2011-10), and OMA LWM2M described in OMA Lightweight M2M (LWM2M) Technical Specification, Draft Version 1.0-14 Mar. 2013) support authorization mechanisms to control which services or resources they permit their registrants (e.g. M2M/IoT devices) to access as well as the types of operations the registrants are allowed to perform on these resources and/or services. However, these service layer authorization mechanisms are typically configured to be static in nature (e.g. pre-provisioned) and hence have the following shortcomings:

Shortcoming #1—Lack of support to allow a service layer registrant to gain access to a resource for which it does not have permissions to access by dynamically adding new permissions. As a result, registrants are limited to accessing only those resources and/or services for which they have statically pre-provisioned authorization policies to access.

Shortcoming #2—Lack of support for advanced authorization mechanisms that allow a registrant owning or managing resources or services hosted in the service layer to specify authorization in terms of a consultation that is performed by the service layer to the registrant to determine whether or not the registrant wishes to grant or deny access to other registrants attempting to access their resources or services but do not have proper privileges to do so. As a result, registrants are unable to detect if/when other registrants are interested in accessing their resources or services and in turn whether or not to dynamically authorize access for such requests.

Shortcoming #3—Lack of support for advanced authorization mechanisms that allow a registrant owning or managing resources or services hosted in the service layer to specify authorization in terms of the rates/fees a requesting registrant is willing to pay for access. As a result, registrants are unable to allow the service layer to dynamically authorize access to other registrants based on their willingness to pay to access.

Shortcoming #4—Lack of support for advanced authorization mechanisms that allow a registrant owning or managing resources or services hosted in the service layer to specify authorization in terms of a bartering agreement a requesting registrant is willing to agree to. For example, a bi-lateral agreement between registrants that they will grant access to each other's resources. As a result, registrants are unable to barter and use their resources as a commodity to dynamically gain access to other registrant's resources or services.

Shortcoming #5—Lack of support for advanced authorization mechanisms that allow a registrant owning or managing resources or services hosted in the service layer to specify authorization in terms of a required security assessment level that a registrant must meet. For example, a registrant is unable to configure the service layer to dynamically authorize access to its resources or services to other registrants based on them satisfying security level assessments (e.g. platform meets certain security requirements) dynamically performed by the service layer.

Shortcoming #6—Lack of support for advanced authorization mechanisms that allow a registrant owning or managing resources or services hosted in the service layer to specify authorization in terms of a required reputation assessment level that a registrant must meet in order to be authorized. For example, a registrant is unable to configure the service layer to dynamically authorize access to its resources or services to other registrants based on them satisfying a reputation level assessment (e.g. peer reviews of the registrant meet certain level of satisfaction such as '4 out of 5 stars').

The following use case describes how service layer dynamic authorization can be supported by a service layer as well as its value-add. In this use case App #1 202 creates a resource named XYZ hosted in the service layer. App #1 202 then configures an access control policy for resource XYZ with a set of static access privileges. The static access privileges define rules such as a list of other Apps that are allowed to access resource XYZ as well as what operations they can perform on it. These privileges are used by the service layer to control which Apps are allowed to access the resource and which operations they are allowed to perform on the resource. App #1 202 can configure these privileges with the known Apps that it is aware of and that it wants to grant access to. App #1 202 can also configure a dynamic authorization policy for the resource. This policy defines rules that can be used by the service layer to support dynamically creating, updating, or deleting the static access privileges. This is especially useful to support cases where new/different Apps attempt to access the resource, however, App #1 202 does not have any prior awareness of relationship with these Apps and hence has not configured the static privileges to grant them access to the resource.

Figure 7:
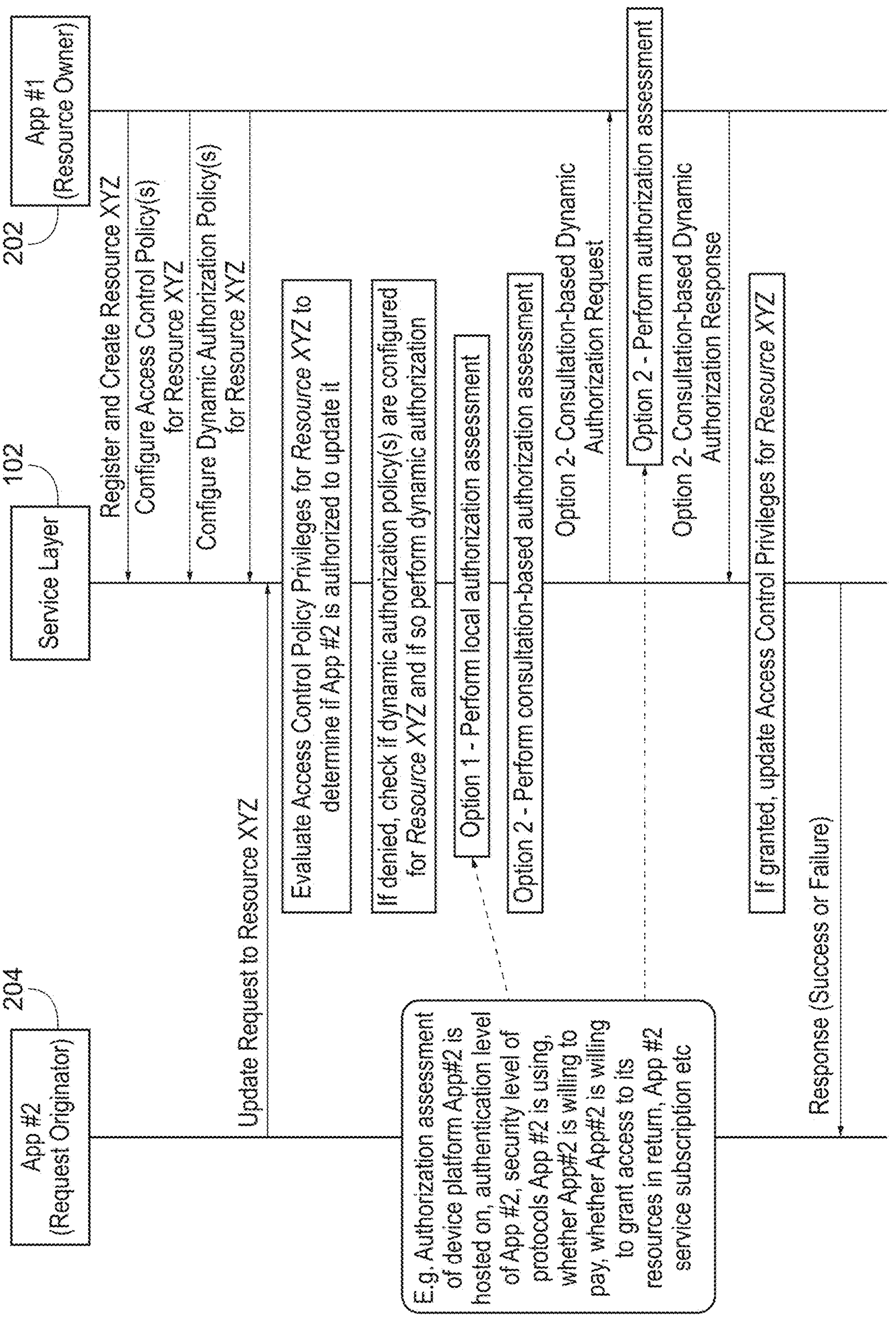
FIG. 7 is a diagram of a Service Layer Dynamic Authorization Perform Locally by Service Layer

In this use case, App #2 204 is an example of an App which App #1 has not granted static access privileges for. App #2 204 performs a request to resource XYZ. The Service Layer, first checks the static access privileges and finds that App #2 204 has not been given privileges. The Service Layer 102 than checks if a dynamic authorization policy has been configured. If so, the Service Layer 102 can support functionality to assess whether or not to update the static access privileges and grant access privileges to these Apps. The dynamic authorization functionality can be performed locally by the Service Layer 102 using the configured dynamic authorization policies as shown in FIG. 7. Alternatively, the Service Layer 102 can support consulting with other entities in the system (e.g. an Authorization Server) to have them assist the Service Layer 102 in performing the dynamic authorization as shown in FIG. 8.

Figure 8:
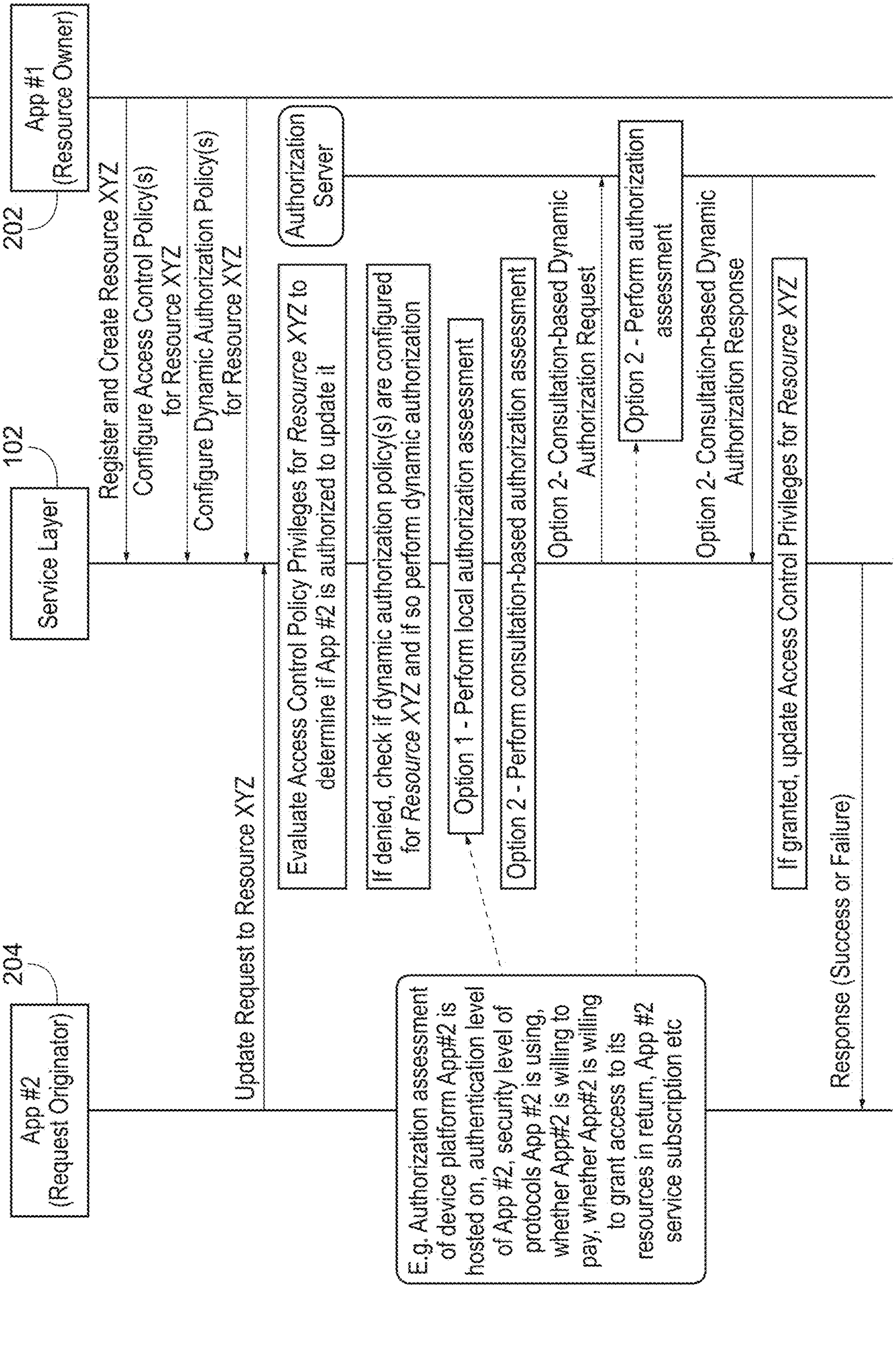
FIG. 8 is a diagram of a Service Layer Dynamic Authorization performed via Consultation
Figure 44A:
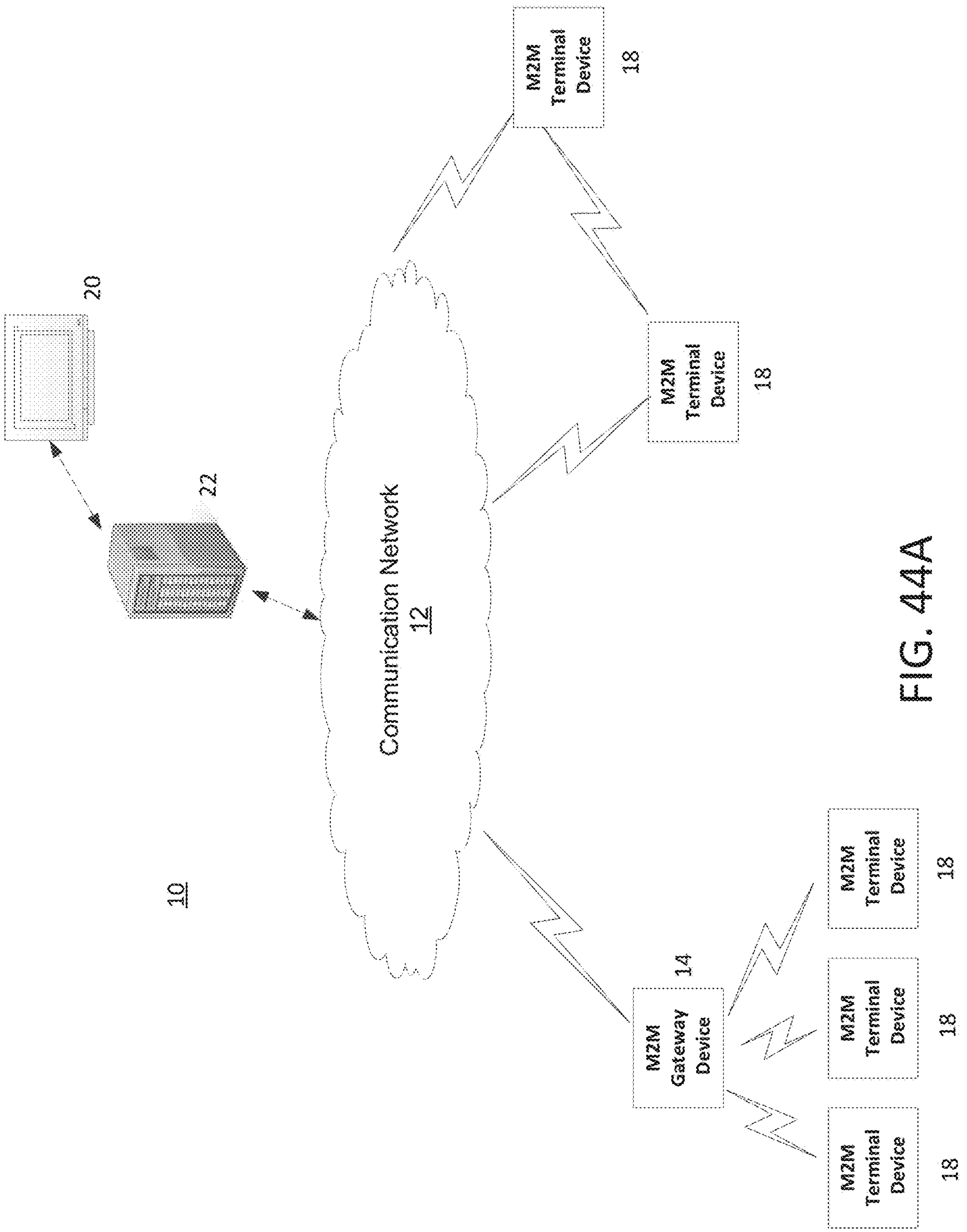
FIG. 44A is a diagram of a M2M/IoT/WoT communication system that includes a communication network.
Figure 44B:
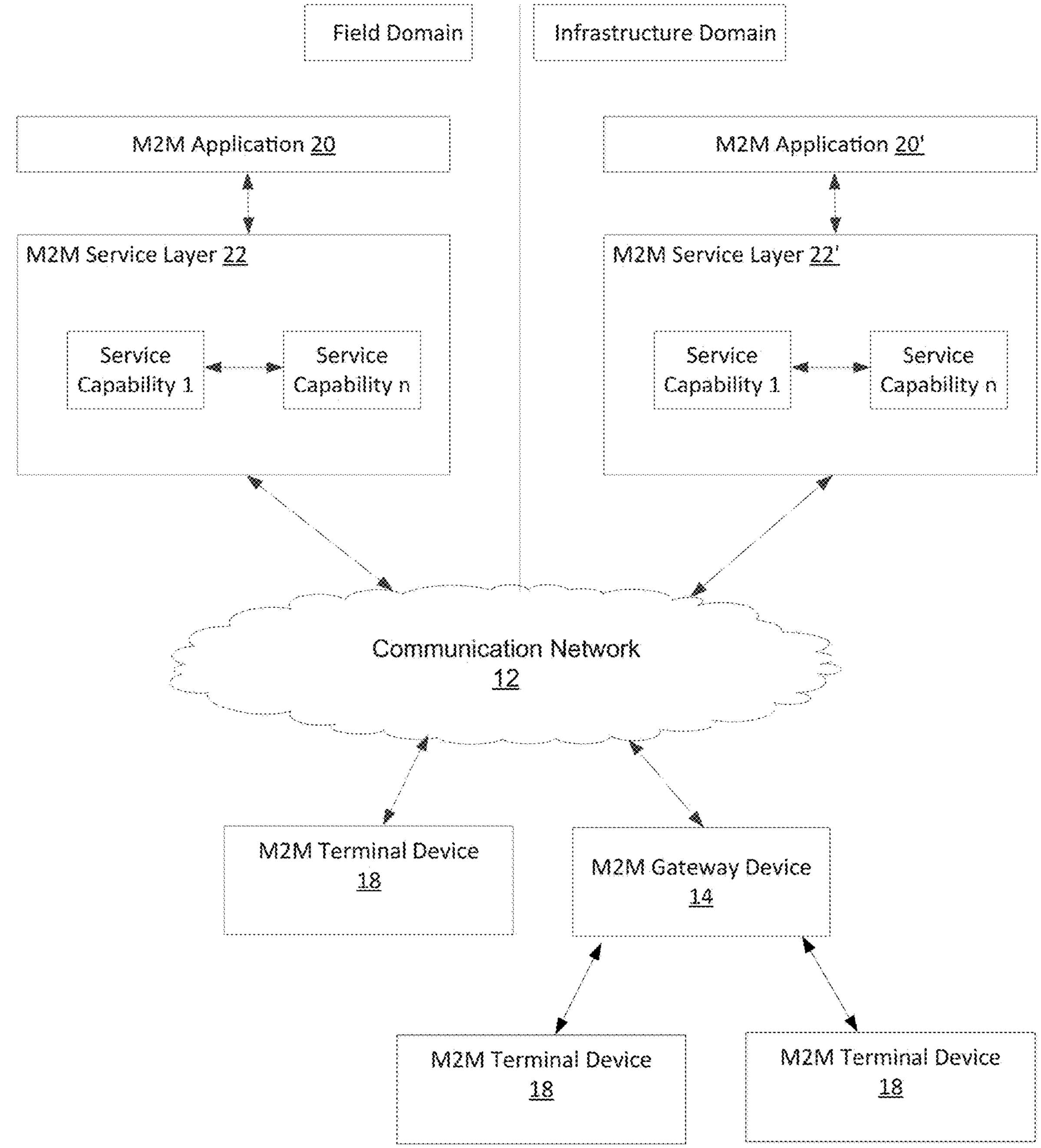
FIG. 44B is a diagram of an illustrated M2M service layer in the field domain that provides services for the M2M application, M2M gateway devices, and M2M terminal devices and the communication network.
Figure 44C:
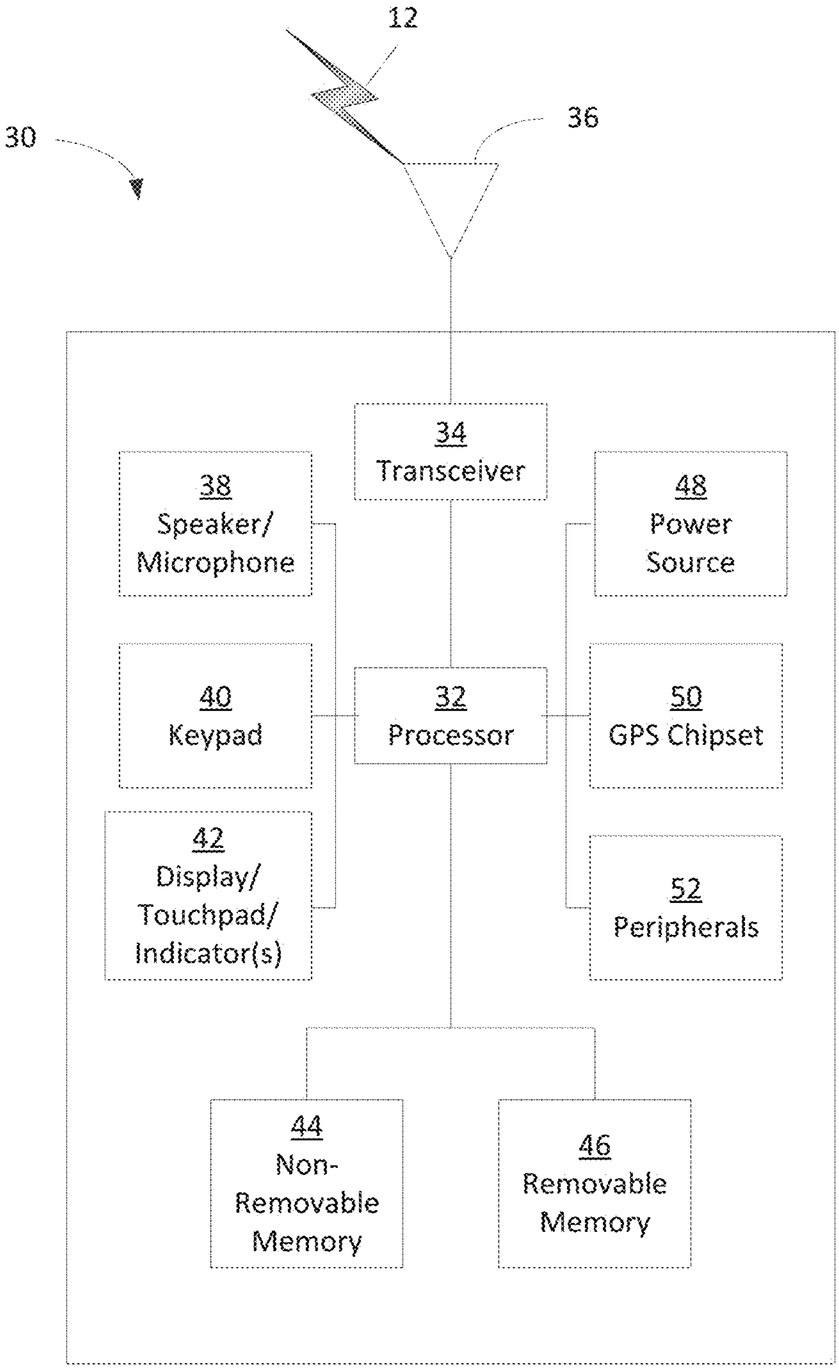
FIG. 44C is a diagram of an exemplary device that may be used to implement any of the network nodes described herein.
Figure 44D:
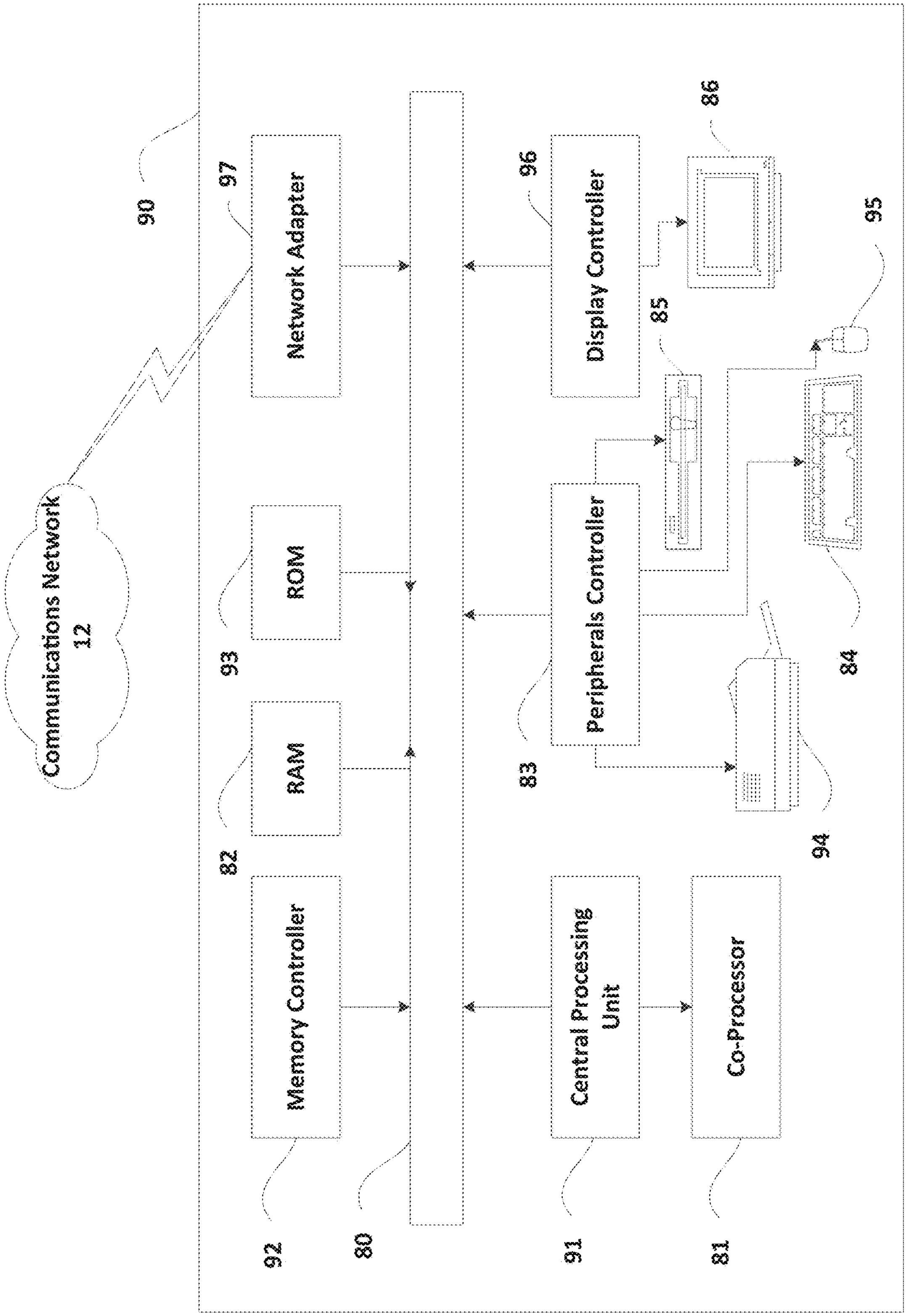
FIG. 44D is a block diagram of a computer system or server that may be used to implement any of the network nodes described herein.

It is understood that the entities performing the steps illustrated in FIGS. 7-8 are logical entities that may be implemented in the form of software (i.e., computer-executable instructions) stored in a memory of, and executing on a processor of, a network node or computer system such as those illustrated in FIG. 44C or FIG. 44D. That is, the method(s) illustrated in FIGS. 7-9 may be implemented in the form of software (i.e., computer-executable instructions) stored in a memory of a network node, such as the node or computer system illustrated in FIG. 44C or FIG. 44D, which computer executable instructions, when executed by a processor of the node, perform the steps illustrated in FIGS. 7-8 It is also understood that any transmitting and receiving steps illustrated in FIGS. 7-8 may be performed by communication circuitry of the node under control of the processor of the node and the computer-executable instructions (e.g., software) that it executes.

Service Layer Dynamic Authorization Function

Figure 9:
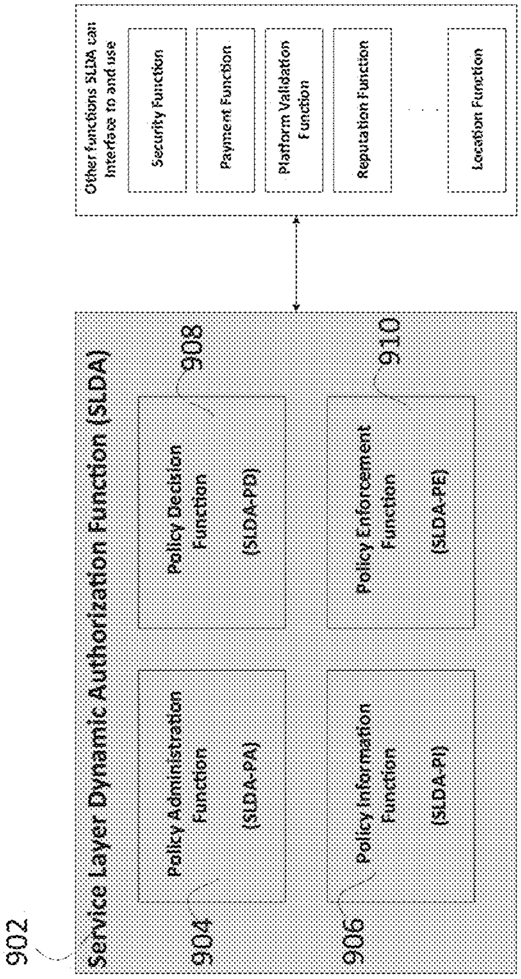
FIG. 9 is a diagram of a Service Layer Dynamic Authorization Function

The proposed framework consists of a service layer dynamic authorization (SLDA) function 902 as shown in FIG. 9. This function support servicing requests to determine whether or not a requester shall be granted access privileges to a desired resource or service hosted by the service layer for which the requester does not already have pre-established privileges to access. This function consists of the following four sub-functions also shown in FIG. 9.

- Policy Administration Function (SLDA-PA) 904—Manages service layer dynamic authorization policies.
- Policy Decision Point (SLDA-PD) 908—Evaluates and issues service layer dynamic authorization decisions.
- Policy Enforcement Point (SLDA-PE) 910—Intercepts request to a service layer resource or service and enforces SLDA-PD's decision.
- Policy Information Point (SLDA-PI) 906—Provides additional context information to a SLDA-PD 908, such as security, payment, location and reputation assessments.

It is understood that the functionality illustrated in FIG. 9, may be implemented in the form of software (i.e., computer-executable instructions) stored in a memory of, and executing on a processor of, a node of an M2M network (e.g., a server, gateway, device, or other computer system), such as one of those illustrated in FIG. 44C or 44D described below.

Service Layer Dynamic Authorization Deployment Schemes

Figure 10:
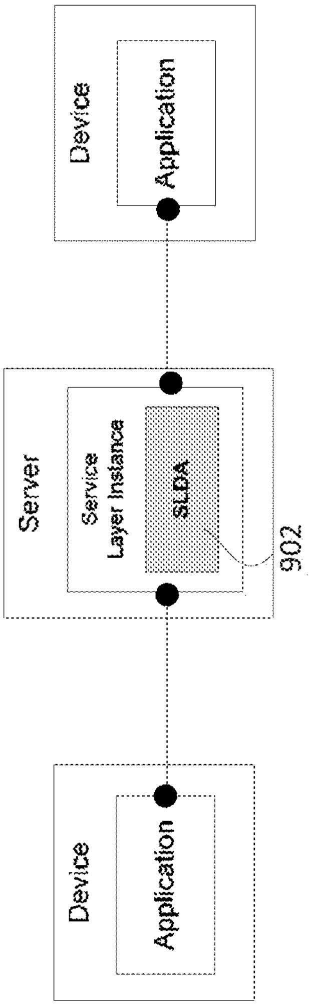
FIG. 10 is a diagram of a SLDA 902 Deployed as Local Function in Service Layer

The SLDA function 902 supports several flexible deployment schemes. The SLDA function 902 can be deployed as a local function of a service layer in which case the service layer can support dynamic authorization functionality natively as shown in FIG. 10.

Figure 11:
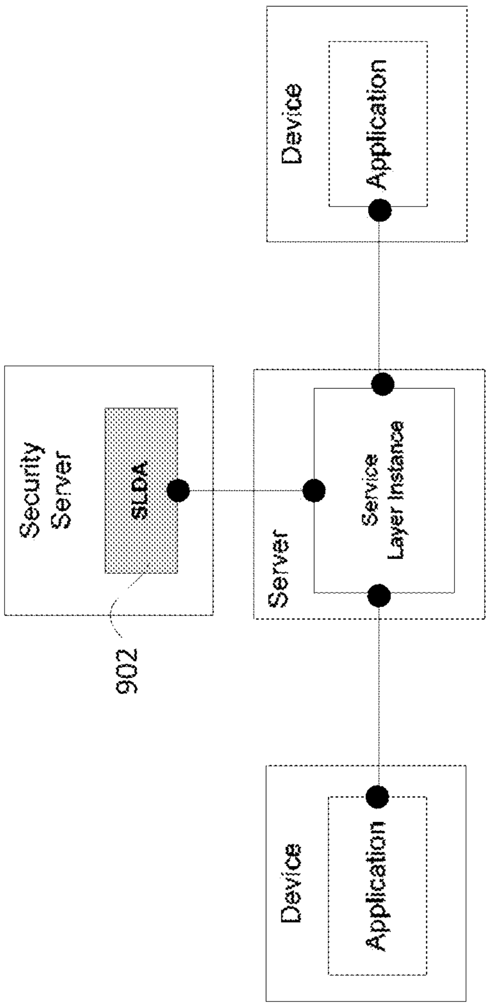
FIG. 11 is a diagram of a SLDA 902 Deployed Separate from Service Layer

The SLDA function 902 can also be deployed separately from a service layer as shown in FIG. 11. In this case, the SLDA 902 can be deployed as a standalone function in the network or can be deployed as a sub-function of another entity (e.g. Security Server).

Figure 12:
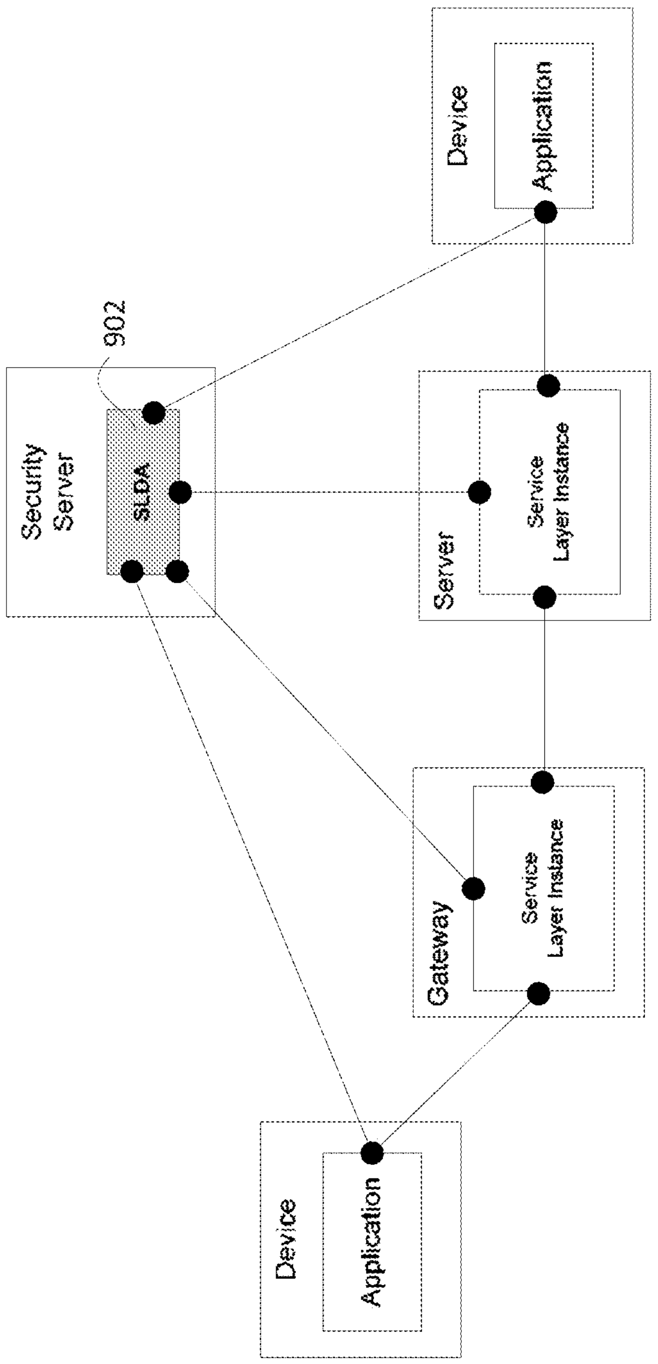
FIG. 12 is a diagram of a SLDA 902 Deployed Separate from Service Layer

The SLDA 902 can also be deployed in a centralized manner in which case a single SLDA function 902 can service dynamic authorization requests from multiple service layer instances as well as applications. In this deployment scheme, all dynamic authorization administration, decisions as well as enforcement are performed by the centralized SLDA 902 as shown in FIG. 12.

Figure 13:
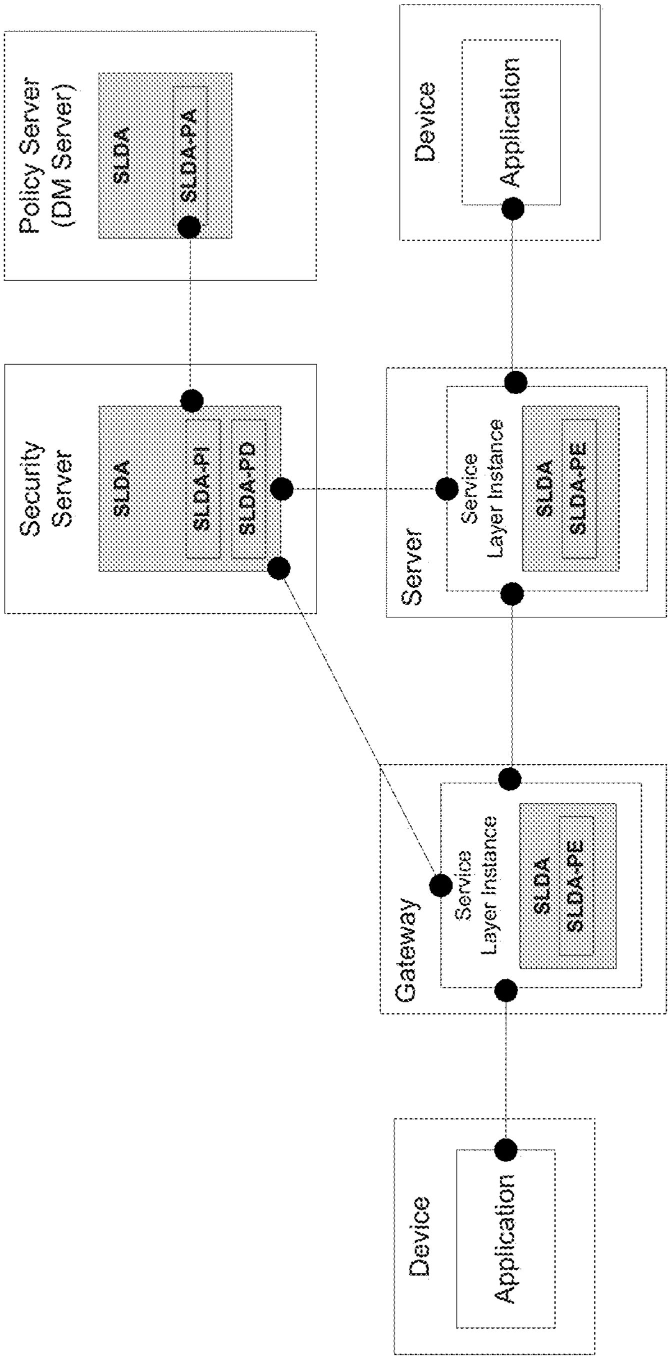
FIG. 13 is a diagram of a SLDA 902 Deployed Separate from Service Layer

Conversely an SLDA 902 can be deployed in a distributed manner in which case an SLDA 902 or its sub-functions can be distributed throughout a network. For example, the SLDA-PI, SLDA-PA 904 and SLDA-PD 908 sub-function can be deployed on a centralized node in the network while separate SLDA-PE 910 sub-functions can be deployed locally within each of the service layer instance throughout a network as shown in FIG. 13. In this distributed scheme, dynamic authorization policy information, administration and decisions can be made by the centralized SLDA-PD 908, while the outcome of these decisions can be enforced by the individual SLDA-PEs of the individual service layers for each request they process.

It is understood that the functionality illustrated in FIGS. 10-13, may be implemented in the form of software (i.e., computer-executable instructions) stored in a memory of, and executing on a processor of, a node of an M2M network (e.g., a server, gateway, device, or other computer system), such as one of those illustrated in FIG. 44C or 44D described below.

Service Layer Dynamic Authorization Process

Authorization Process: The Authorization process involves:

- Provisioning of Generic Authorization Rules
  - Provisioning of Static Rules and Parameters to SLSA-PD 1406, SLSA-PE 1410 and SLSA-PI 1412
  - Provisioning of Dynamic Rules and Parameters to SLDA-PD 908, SLDA-PE 910 and SLDA-PI 906
  - Provisioning of logic/rules to co-ordinate between static and dynamic rules
- Creation of Granular Resource-specific Authorization Rules
  - Creation of static rules for access to a resource Creation of dynamic rules for access to a resource Providing an Authorized entity with Access to resource involves:

Conveying dynamic authorization rules to an entity

Providing mechanisms for an entity to obtain various levels of authorization (AuthLevel)

Providing various types of Dynamic Authorization (a combination of one or more of the following):

Authenticated (Single-factor, Multi-factor)

Platform integrity

Application or Device-type

Non-Authenticated

Payment or Subscription based

Reputation based

Barter based (exchange of data/resource)

Provisioning of Authorization Rules

Figure 14:
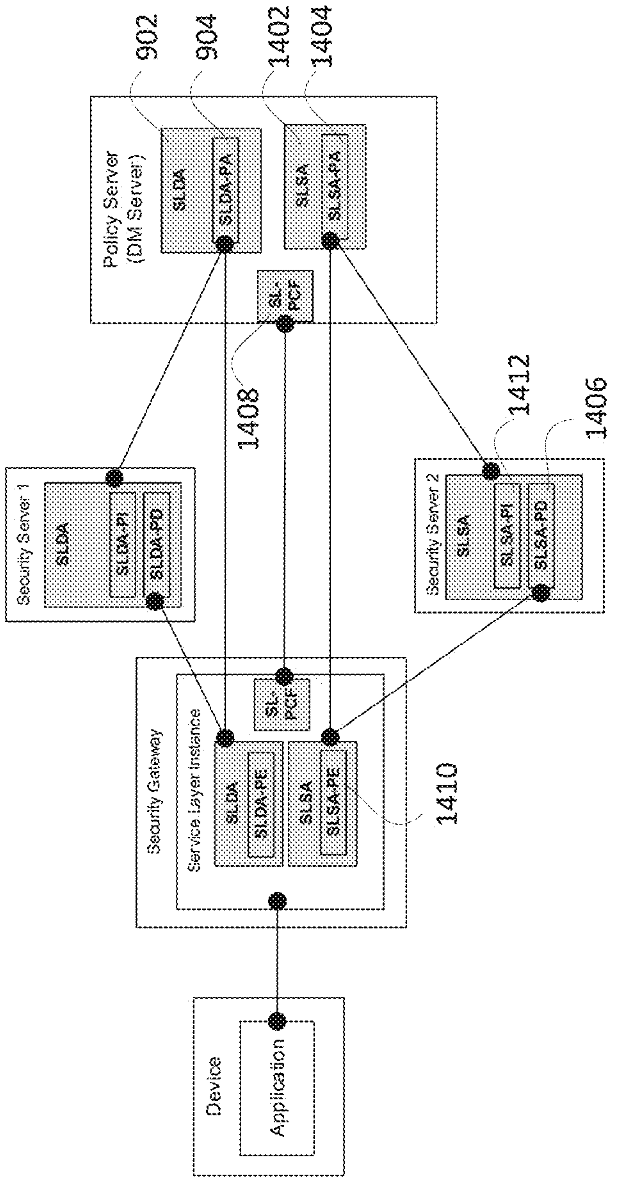
FIG. 14 is a diagram of a Static and Dynamic Policy Management

FIG. 14 depicts a policy management (provisioning, decision and enforcement) framework involving both static and dynamic policies. An IoT Service Provider may have an existing static access policy management, with the introduction of dynamic authorization, a Service Layer Policy Co-ordination Function (SL-PCF) 1408 is able to handle the co-ordination of dynamic and static policies and enforcement of those policies. A SLDA-PA 904 and a SLSA (Service Layer Static Authorization)-PA 1404 functions that provisions dynamic policies and static policies respectively. The SLSA-PA 1404 configures appropriate PD policies (at the Security Server 2) as well as PE policies at the respective entities (e.g. Security Gateway).

It is understood that the functionality illustrated in FIG. 14, may be implemented in the form of software (i.e., computer-executable instructions) stored in a memory of, and executing on a processor of, a node of an M2M network (e.g., a server, gateway, device, or other computer system), such as one of those illustrated in FIG. 44C or 44D described below.

Figure 15:
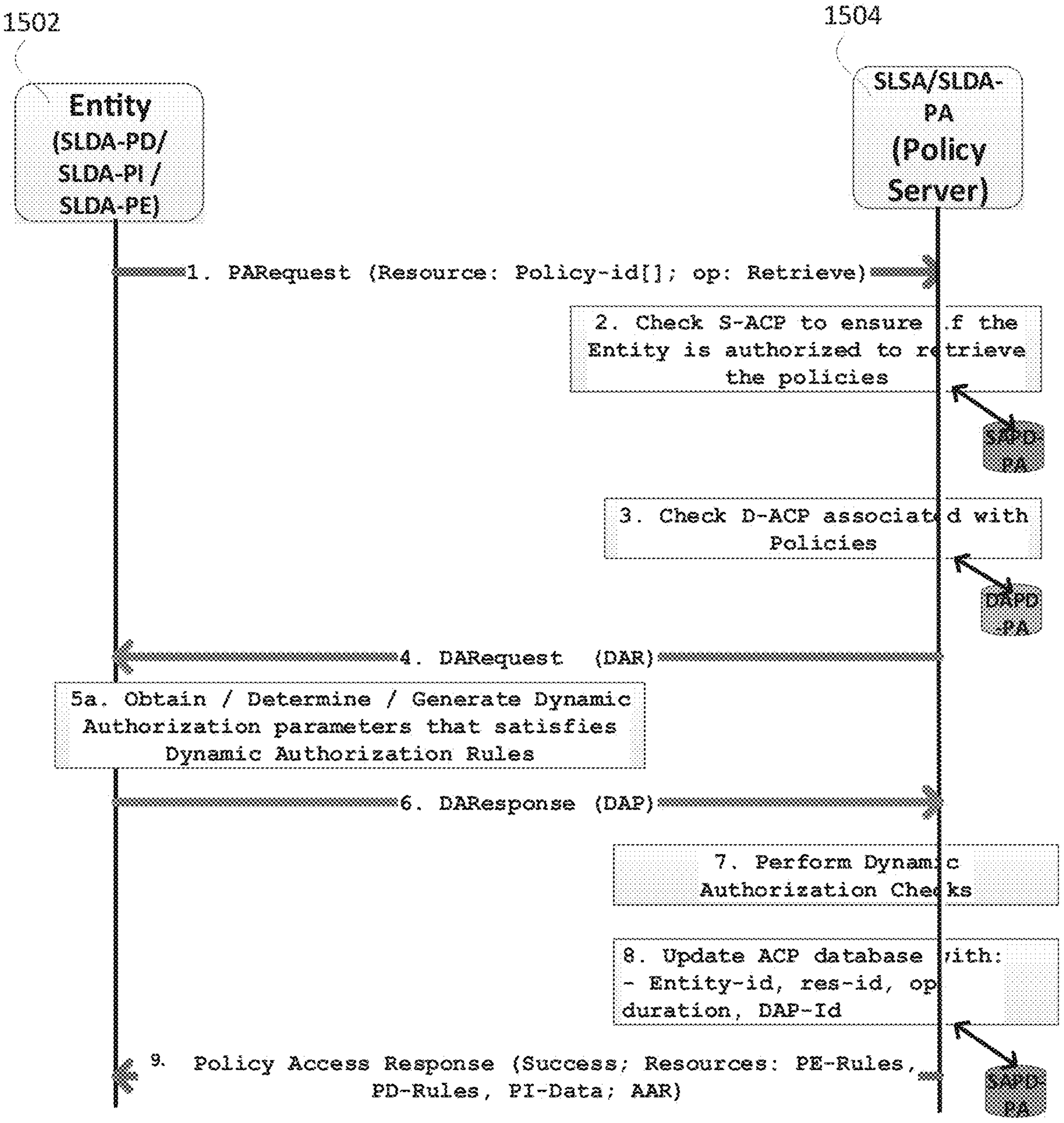
FIG. 15 is a diagram of a Policy Provisioning Process

FIG. 15 depicts a policy provisioning process, wherein an Entity 1502 that implements the SLDA-PE 910, SLDA-PD 908 and SLDA-PI 906 functions is provisioned with the appropriate policies. Detailed messaging is provided below:

Wherever applicable and where security is critical, all communications that occur between an entity and another entity can occur over a secure communications channel (e.g. using TLS/SSL connection) and protected in an end-to-end manner.

In step 1 of FIG. 15, the Entity 1502 requests for the retrieval of appropriate set of policies relating to PE and PD as well as parameters for the PI. The retrieval process may be triggered on a periodic basis or triggered by in-band or out-of-band signaling from a Policy Server 1504 that implements the SLDA-PA 904. The Policy Server 1504 may invoke the services of a Device Management Server or may be co-hosted with it. The Entity 1502 sends a request for the policies by including an optional policy-id that identifies the resource In step 2 of FIG. 15, the SLDA-PA 904 checks to see if there is an existing Static Access Control Policy (S-ACP) that authorizes the Entity 1502 to obtain the policies. The SLSA 1402/SLDA 902—PA checks the SAPD-PA 904 (Static Authorization Policy Database) associated with the PA to check if the Entity 1502 has been authorized to be provisioned with the PD/PE-related policies. If an entry exists for the Entity 1502 and provided that the level of authorization meets the requirement for policy provisioning then the processing jumps to Step 10.

In step 3 of FIG. 15, if there is no entry for the Entity 1502 in the SAPD then the PA queries the Dynamic Authorization Policy Database (DAPD) in order to determine how the Entity 1502 may be able to be authorized.

In step 4 of FIG. 15, the Policy Server 1504 then requests the Entity 1502 to perform a Dynamic Authorization Request (DARequest) message containing the Dynamic Authorization Rules (DAR). The Rules may indicate:

a. Authorization Level b. Explicit Authorization Mechanisms (e.g. Authentication, Payment/Subscription, Platform Validation/Integrity-check etc.)

In step 5 of FIG. 15, the Entity 1502 performs the required Authorization Check Processes with corresponding Dynamic Authorization Enabling Functions (DAEF) 1802, which is described in detail in a later section. Based on the checks that were carried out, the Entity 1502 either obtains the Dynamic Authorization Parameters (DAP) from corresponding DAEFs or may be determined or generated by the Entity 1502. The DAP may a be cryptographic credential that is digitally signed (e.g. signed authorization token, access token), non-signed, messaging (XML messaging), JSON data etc. The DAP may include parameters that contain the results of the various authorization checks or each of the authorization checks may result in a separate DAP.

In step 6 of FIG. 15, the Entity 1502 then sends the DAP(s) using a Dynamic Authorization Response (DAResponse) message to the Policy Server 1504/PA.

In step 7 of FIG. 15, the Policy Server 1504/DA verifies the DAPs and checks to ensure the DAR has been met.

In step 8 of FIG. 15, the Policy Server 1504 updates the static policy (SAPD) to include the Entity-id, res-id, operation that is allowed (e.g. Retrieve), DAP-Id, that identifies the DAP and duration of the allowed authorization.

In step 9 of FIG. 15, the SAPD-PA then provisions the PE-Rules, PA-Rules and the PI-Data as well as the Approved Authorization Rules (AAR). The AAR may contain information on:

a. Authorization Level (AuthLevel) achieved b. Type of Operations that can be performed (Create/Update/Retrieve/Delete)

c. Resource/Resource tree to which the operations can be performed d. The length of authorization (validity/expiration)

e. Listing of mechanisms that have to be performed to enhance AuthLevel f. Resource/Operations that can never be performed It is understood that the entities performing the steps illustrated in FIG. 15 are logical entities that may be implemented in the form of software (i.e., computer-executable instructions) stored in a memory of, and executing on a processor of, a network node or computer system such as those illustrated in FIG. 44C or FIG. 44D. That is, the method(s) illustrated in FIG. 15 may be implemented in the form of software (i.e., computer-executable instructions) stored in a memory of a network node, such as the node or computer system illustrated in FIG. 44C or FIG. 44D, which computer executable instructions, when executed by a processor of the node, perform the steps illustrated in FIG. 15. It is also understood that any transmitting and receiving steps illustrated in FIG. 15 may be performed by communication circuitry of the node under control of the processor of the node and the computer-executable instructions (e.g., software) that it executes.

Creation of Resource-Specific Authorization Rules

Figure 16:
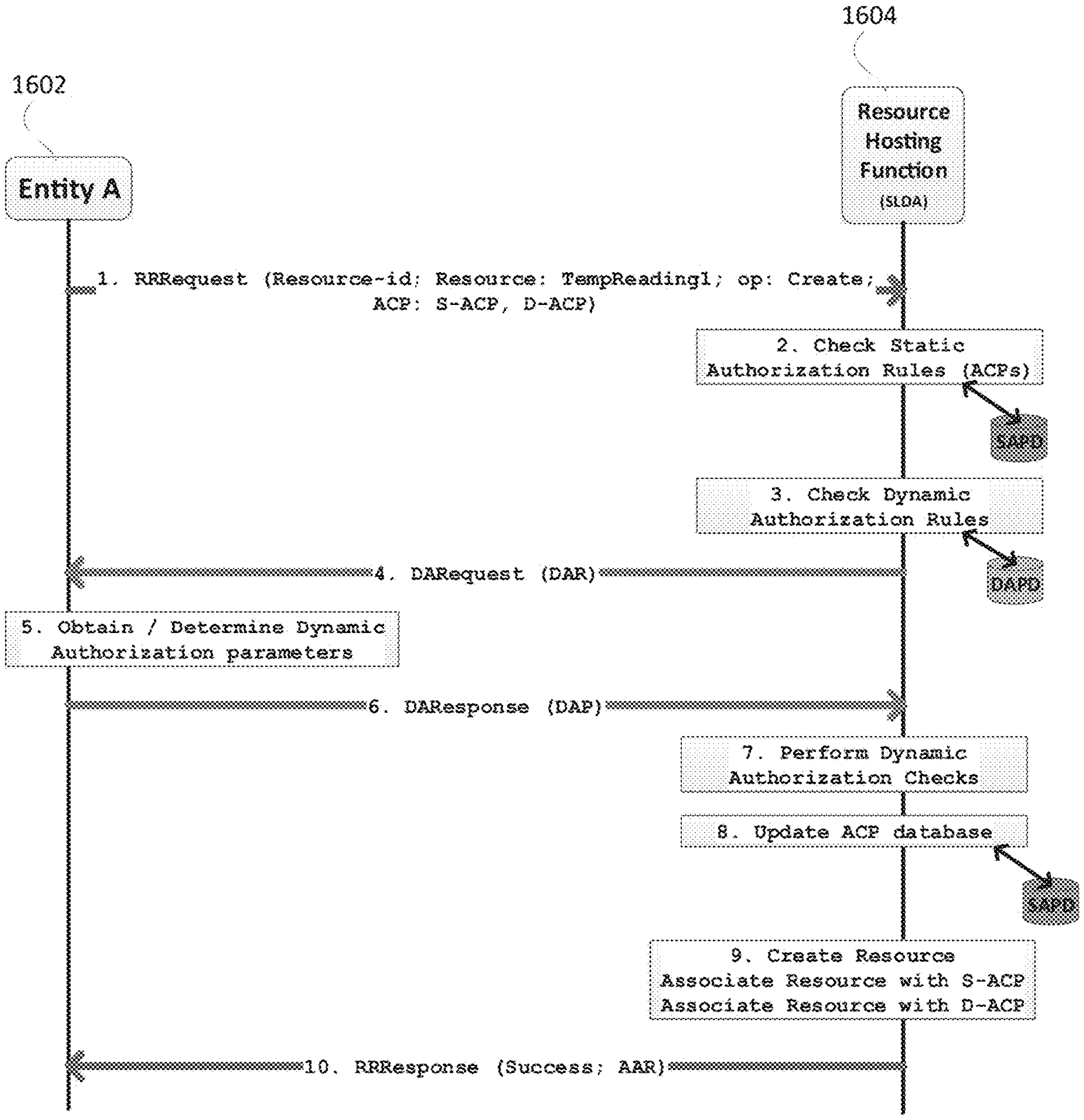
FIG. 16 is a diagram of a Creating and Hosting Access Policies for a Resource

An Entity (Entity A 1602), which may be a resource generator or owner, requests hosting of the data onto a Resource Hosting Function (RHF 1604). The RHF 1604 may implement the SLDA functionalities (PE, PD, and PI). It is assumed here that all the policies relating to authorization rules associated with entities have been pre-provisioned and populated onto the SAPD and the dynamic policies are provisioned onto the DAPD based on mechanisms described in 6.3.1. Messaging details for the illustrated FIG. 16 follow:

In step 1 of FIG. 16, an Entity that requests hosting/creation of a resource (TempReading1), having an associated Resource-id, along with associated Static ACP (S-ACP) as well as Dynamic-ACP (D-ACP) are sent as part of the Resource Registration Request (RRRequest) message to RHF 1604 that implements SLDA.

In step 2 of FIG. 16, the RHF 1604 checks to see if the Entity A 1602 has the authorization based on checks performed with a SAPD. If an entry exists then the messaging skips to Step 9.

In step 3 of FIG. 16, if no S-ACP matches for the request from the Entity then the RHF 1604 obtains the dynamic authorization rules from the DAPD In step 4 of FIG. 16, the RHF 1604 sends the rules (DAR) using a Dynamic Authorization Request (DAR) message to the Entity A 1602

In step 5 of FIG. 16, the Entity A 1602 performs various authorization checks based on the DAR that was obtained from the RHF 1604. The Entity A 1602 obtains/generates DAP(s) that vouches for the authorization checks In step 6 of FIG. 16, Entity A 1602 sends the DAP to the RHF 1604 using DAResponse message.

In step 7 of FIG. 16, the RHF 1604 performs checks on the DAP(s) and verifies that it matches the DAR.

In step 8 of FIG. 16, if the DAP(s) were successfully verified then the SAPD is populated with the appropriate values indicating the entity-id, operations allowed, resources accessible, DAP-Id(s), validity etc.

In step 9 of FIG. 16, the RHF 1604 registers and creates the Entity A 1602 resource and associates the S-ACP and D-ACP with the Entity A 1602 resource In step 10 of FIG. 16, the RHF 1604 forwards the RRResponse containing the AAR It is understood that the entities performing the steps illustrated in FIG. 16 are logical entities that may be implemented in the form of software (i.e., computer-executable instructions) stored in a memory of, and executing on a processor of, a network node or computer system such as those illustrated in FIG. 44C or FIG. 44D. That is, the method(s) illustrated in FIG. 16 may be implemented in the form of software (i.e., computer-executable instructions) stored in a memory of a network node, such as the node or computer system illustrated in FIG. 44C or FIG. 44D, which computer executable instructions, when executed by a processor of the node, perform the steps illustrated in FIG. 16. It is also understood that any transmitting and receiving steps illustrated in FIG. 16 may be performed by communication circuitry of the node under control of the processor of the node and the computer-executable instructions (e.g., software) that it executes.

Authorized Access Process

Figure 17:
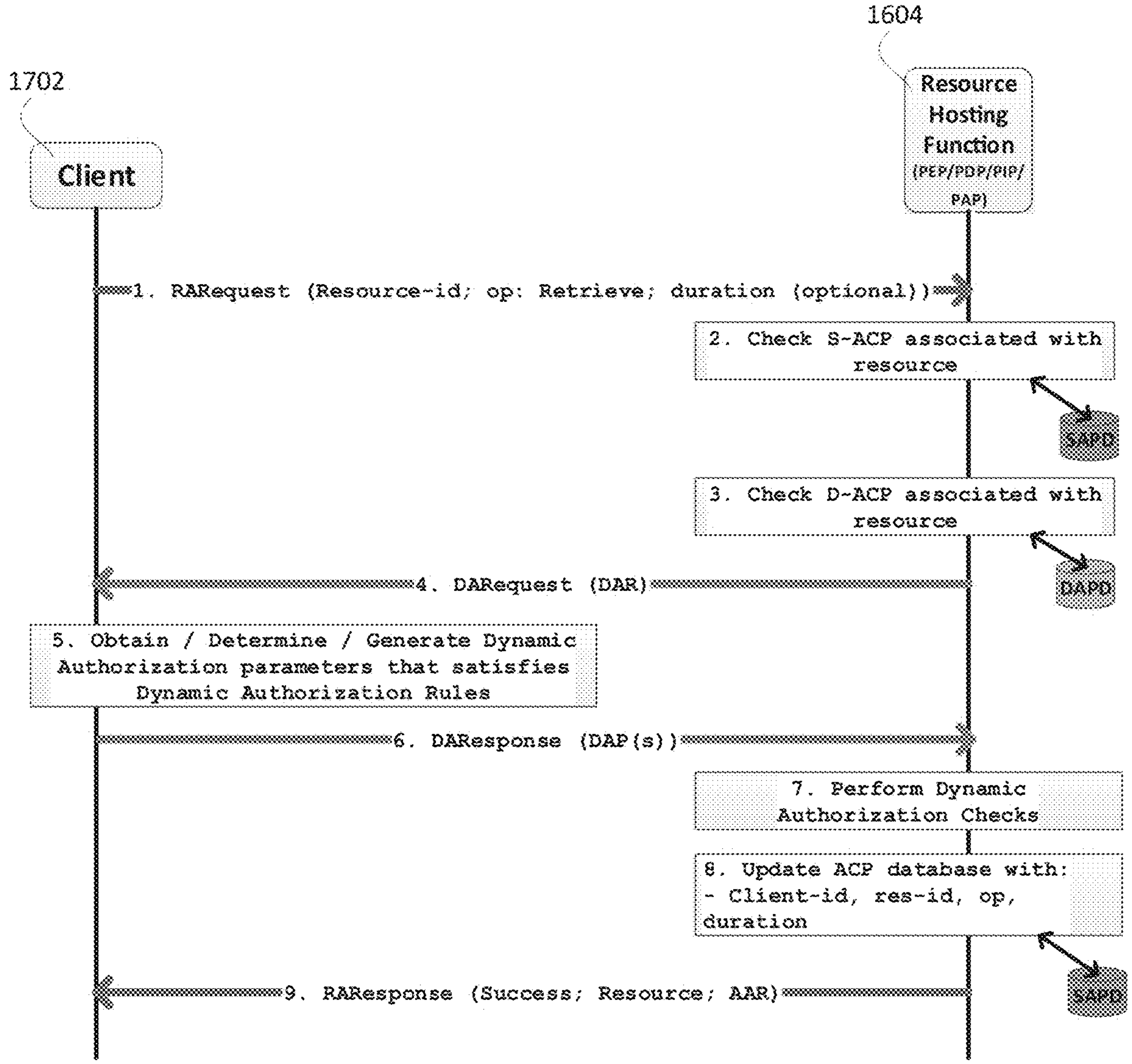
FIG. 17 is a diagram of a Client requesting access controlled resource

FIG. 17 depicts a Client 1702 that would like to access a resource hosted on a RHF 1604. RHF 1604 implements the SLDA-PE 910, PI, PD functions and in addition also hosts the PA function. Therefore a system administrator would be able to configure PE and PD policies using an interface on the RHF 1604 by means of the PA. The message flow may be viewed as a continuation of the previous flow depicted in FIG. 16 and described in 6.3.2. Messaging details follow:

In step 1 of FIG. 17, the Client 1702 sends a Resource Access Request (RARequest) message containing the Resource-id, optionally name of the resource and the type of operation requested. It may also explicitly request to the resource for a certain duration in time, which is optional.

In step 2 of FIG. 17, the RHF 1604 based on the S-ACP determines if the Client 1702 is authorized or not. If it is authorized then the messaging skips to Step 10.

In step 3 of FIG. 17, if the Client 1702 is not authorized then the RHF 1604 determines the dynamic authorization policies (D-ACP) and creates a DAR. If a "duration" value existed within the RARequest then the D-ACP may be tailored to meet the "duration" value. If the duration "value" is higher than a threshold then a higher level of authorization may have to be performed.

In step 4 of FIG. 17, the RHF sends a DARequest containing the DAR

In step 5 of FIG. 17, the Client 1702 performs the appropriate authorization checks with the appropriate DAEFs in order to satisfy the DAR. The Client 1702 obtains or generates DAP(s) that vouches for the various checks.

In step 6 of FIG. 17, the Client 1702 sends the DAP(s) to the RHF 1604 using a DAResponse message containing the DAPs In step 7 of FIG. 17, the RHF 1604 verifies the DAPs and compares to the DAR In step 8 of FIG. 16, if the DAPs meet the requirements of the DAR then the RFH may updates the SAPD with the Client-id, res-id, op, duration, DAP-Id(s)

In step 9 of FIG. 17, the RHF 1604 sends a RAResponse message containing the Resource and a AAR It is understood that the entities performing the steps illustrated in FIG. 17 are logical entities that may be implemented in the form of software (i.e., computer-executable instructions) stored in a memory of, and executing on a processor of, a network node or computer system such as those illustrated in FIG. 44C or FIG. 44D. That is, the method(s) illustrated in FIG. 17 may be implemented in the form of software (i.e., computer-executable instructions) stored in a memory of a network node, such as the node or computer system illustrated in FIG. 44C or FIG. 44D, which computer executable instructions, when executed by a processor of the node, perform the steps illustrated in FIG. 17. It is also understood that any transmitting and receiving steps illustrated in FIG. 17 may be performed by communication circuitry of the node under control of the processor of the node and the computer-executable instructions (e.g., software) that it executes.

Distributed Policy Entities and Authorization Models

With respect to FIGS. 16 and 17, the policy functions such as PD and PE were hosted on the same entity (e.g. RHF 1604). Here we provide mechanisms wherein the SLDA-PD 908/SLDA-PI may be hosted on the same entity while the SLDA-PE 910 is hosted on the RHF 1604. In addition, solutions that support the various authorization models are explored.

PUSH Model

Figure 18:
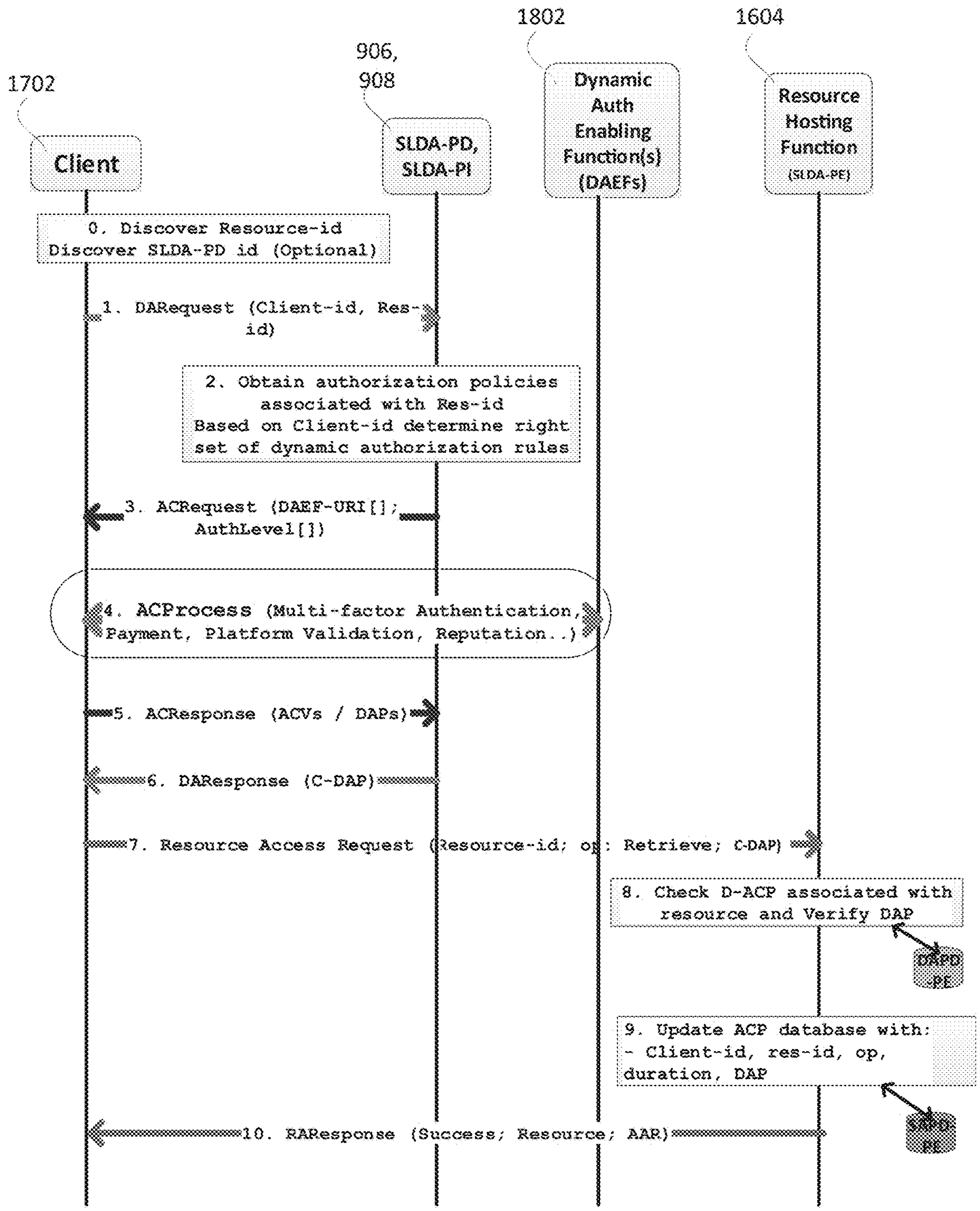
FIG. 18 is a diagram of Resource Access using PUSH model

The PUSH model may be suitable when the RHF 1604 is a constrained entity while the Client 1702 is assumed to be non-constrained or a less constrained device. As previously noted that all communications that require a high degree of security may be transported over a secure communications channel that is protected for confidentiality, integrity and authentication (e.g. using TLS/SSL). FIG. 18 illustrates resource access using a PUSH model. Messaging details follow:

In step 0 of FIG. 18, it is assumed here that the Client 1702 discovers a resource and associated resource-id and the SLDA-PD 908 that may be able to authorize the Client 1702 in order that the Client 1702 is able to access the resource.

In step 1 of FIG. 18, the Client 1702 sends a DARequest containing the Client-id and the resource id (Res-id)

In step 2 of FIG. 18, the SLDA-PD 908 based on the provisioned rules obtains the dynamic authorization policies that enables the Client 1702, identified by the Client-id to access a resource identified by a Res-id. The PD may in some cases have to generate the dynamic authorization policies based on the Client-Id and the Res-id.

In step 3 of FIG. 18, the PD sends a Authorization Check Request (ACRequest) containing a listing of the URI associated with each DAEF 1802 and also a listing of Authorization Level (AuthLevel) that is associated with each authorization check. An example of AuthLevel is provided below:

a. Authentication: AuthLevel=High/Medium/Low b. Platform Integrity/Validation: AuthLevel=High/Medium/Low c. Subscription: AuthLevel=Platinum/Gold/Silver d. Reputation: AuthLevel=High/Medium/Low In step 4 of FIG. 18, the Client 1702 performs Authorization Check Processes (ACProcess), which is described in little more detail in 6.3.4.2. The Client 1702 may perform checks with a Multi-Factor Authentication Server, Payment Server, Platform Validation Server etc based on the DAEF 1802 listing provided and the associated AuthLevel with each check. This process may be an in-band process or may be carried out-of-band. It is possible based on the scenarios and use cases that authentication is skipped particularly when anonymous access is requested.

In step 5 of FIG. 18, as a result of the ACProcess, a number of Authorization Check Values (ACVs) may be generated, which is raw data confirming each of the authorization check. Additionally and may be optionally a DAP may be created for each authorization check. The DAP vouches for the authorization check, which can be viewed a condensed version of the ACVs that contains only the relevant information required for authorization. The Client 1702 sends the ACVs/DAPs to the PD.

In step 6 of FIG. 18, once the PD verifies the ACVs/DAP for authenticity, integrity and accuracy, the PD may consolidate all the DAPs to a single C-DAP which is digitally signed or digitally signs each DAP and forwards it to the Client 1702.

In step 7 of FIG. 18, the Client 1702 creates a RARequest containing the Res-id, op and the DAP(s) and sends to the RHF 1604.

In step 8 of FIG. 18, since the Client 1702 has sent DAP(s), the RHF 1604 implementing the PE infers that there may not be an entry in the static policies and therefore does not check the SAPD-PE and instead checks that the DAP(s) matches the requirements of the dynamic authorization policies associated with the res-id by checking the D-ACP in the DAPD-PE.

In step 9 of FIG. 18, if the DAP(s) meets the authorization requirements then the PE updates the SAPD-PE with the Client-id, res-id, op(s), duration, DAP-Id(s), optionally DAP(s). The DAPs may be stored separately identified by DAP-Id, since the size of the DAPs may be large and cumbersome to manage.

In step 10 of FIG. 18, the RHF 1604 sends the Resource as well as the associated AAR to the Client 1702.

It is understood that the entities performing the steps illustrated in FIG. 18 are logical entities that may be implemented in the form of software (i.e., computer-executable instructions) stored in a memory of, and executing on a processor of, a network node or computer system such as those illustrated in FIG. 44C or FIG. 44D. That is, the method(s) illustrated in FIG. 18 may be implemented in the form of software (i.e., computer-executable instructions) stored in a memory of a network node, such as the node or computer system illustrated in FIG. 44C or FIG. 44D, which computer executable instructions, when executed by a processor of the node, perform the steps illustrated in FIG. 18. It is also understood that any transmitting and receiving steps illustrated in FIG. 18 may be performed by communication circuitry of the node under control of the processor of the node and the computer-executable instructions (e.g., software) that it executes.

Authorization Check Process (ACProcess)

Figure 19:
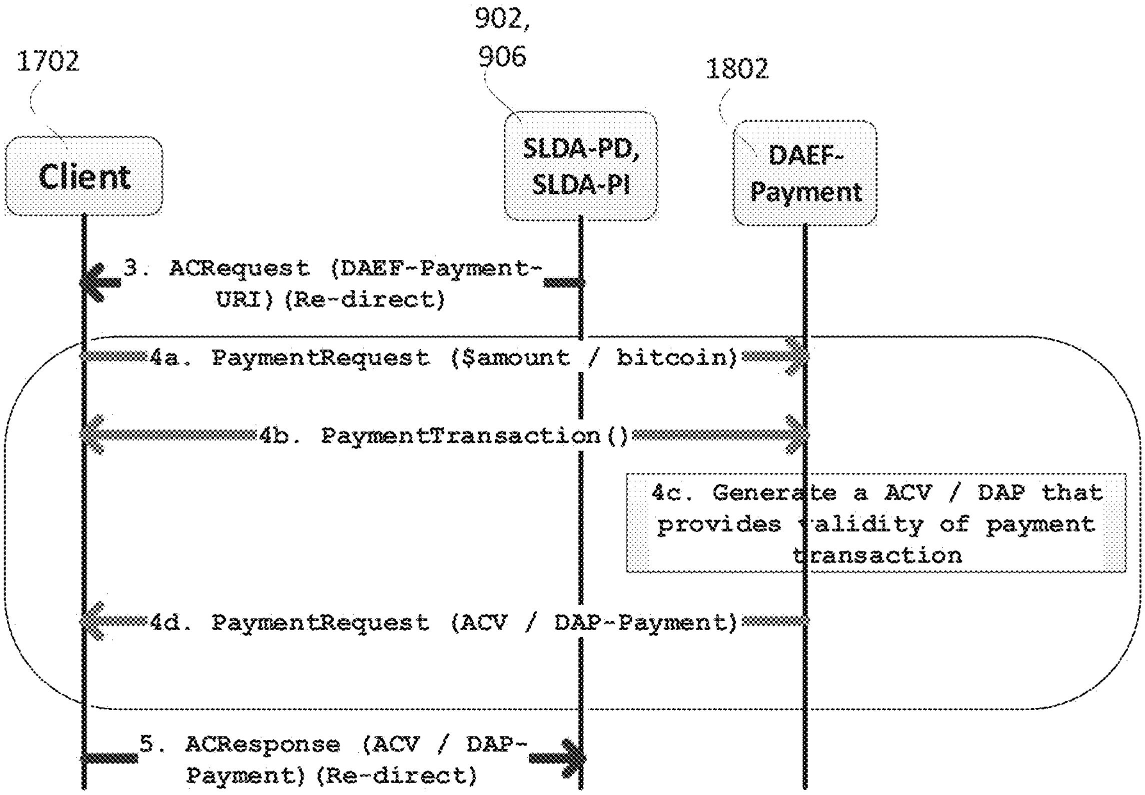
FIG. 19 is a diagram of a Payment Authorization Process

FIG. 19 depicts an ACProcess which involves the process of involving a payment process. It may be possible that the Client 1702 is not aware of the DAEF-Payment server, however, the Client 1702 trusts the SLDA-PD 908 which trusts a DAEF-Payment server. Messaging details:

In step 4*a* of FIG. 19, the Client 1702 requests for a payment authorization to a DAEF-Payment. The Client 1702 may be re-directed by the SLDA-PD 908 or is provided with the URI of the DAEF-Payment server by the SLDA-PD 908 or is discovered by the Client 1702. The Client 1702 performs a PaymentRequest and provides the currency and amount for payment (e.g. virtual currency), a Request-Id that ties the transactions with SLDA-PD ACRequest.

In step 4*b* of FIG. 19, the DAEF 1802 initiates a PaymentTransaction process, where the amount is sent by the Client 1702 to the DAEF 1802

Step 4*c* of FIG. 19, generates a ACV that details that transaction and may optionally generate a DAP provides a verification of the payment and transaction. The Payment DAP may be represented using JSON data, XML, CBOR data, explicit message, JSON Web Token etc. A list of preferred contents of the DAP-Payment is provided below:

Transaction-Id: 542912379542395
Request-Id:
Redeemer-Id: SLDA-PD-URI
Date: 13/11/15
Time: 23:23 hrs
Issuer: DAEF-Payment-URI
Issued to: Client
Currency: Bitcoins
Amount: 100.00
Digital Signature of Issuer: D28B45BA234C452DB . . .

In step 4*d* of FIG. 19, the DAEF 1802 forwards the DAP/ACV to the Client 1702. Optionally only a DAP-Id is provided by the DAEF-Payment to the Client 1702.

In step 5 of FIG. 19, the Client 1702 sends an ACResponse containing the DAP and optionally the ACV to the SLDA-PD. This message may be re-directed by the DAEF 1802 to the SLDA-PD 908 or is sent by the Client 1702. The SLDA-PD 908 registers the Transaction-id, Payment information, Request-Id and other relevant information and provides appropriate authorization confirmation. The SLDA-PD 908 has to be ensure that the payment DAP is not replayed by the Client 1702. If only a DAP-Id was provided by the Client 1702, then the SLDA-PD 908 must fetch the DAP from the DAEF 1802 and once verified then makes the transaction as "satisfied" which implies that the DAEF 1802 considers the payment to have been redeemed and the transaction credit cannot be re-used.

It must be noted that the Authorization Check Process described above for FIG. 19 deals with a payment authorization, however, similar mechanisms may be used to perform other authorization checks (e.g. multi-factor authentication, platform validation, subscription etc. . . . ). Step 4*b* of FIG. 19 may be replaced with message(s) between the Client and corresponding DAEF(s) that is used to perform other authorization checks. It may be also be possible to perform the authorization checks by leveraging protocol frameworks such as OpenID, OpenID-Connect, EAP, SAML etc. and to piggyback the mechanisms described here over those existing protocol frameworks.

It is understood that the entities performing the steps illustrated in FIG. 19 are logical entities that may be implemented in the form of software (i.e., computer-executable instructions) stored in a memory of, and executing on a processor of, a network node or computer system such as those illustrated in FIG. 44C or FIG. 44D. That is, the method(s) illustrated in FIG. 19 may be implemented in the form of software (i.e., computer-executable instructions) stored in a memory of a network node, such as the node or computer system illustrated in FIG. 44C or FIG. 44D, which computer executable instructions, when executed by a processor of the node, perform the steps illustrated in FIG. 19. It is also understood that any transmitting and receiving steps illustrated in FIG. 19 may be performed by communication circuitry of the node under control of the processor of the node and the computer-executable instructions (e.g., software) that it executes.

PULL Model

Figure 20:
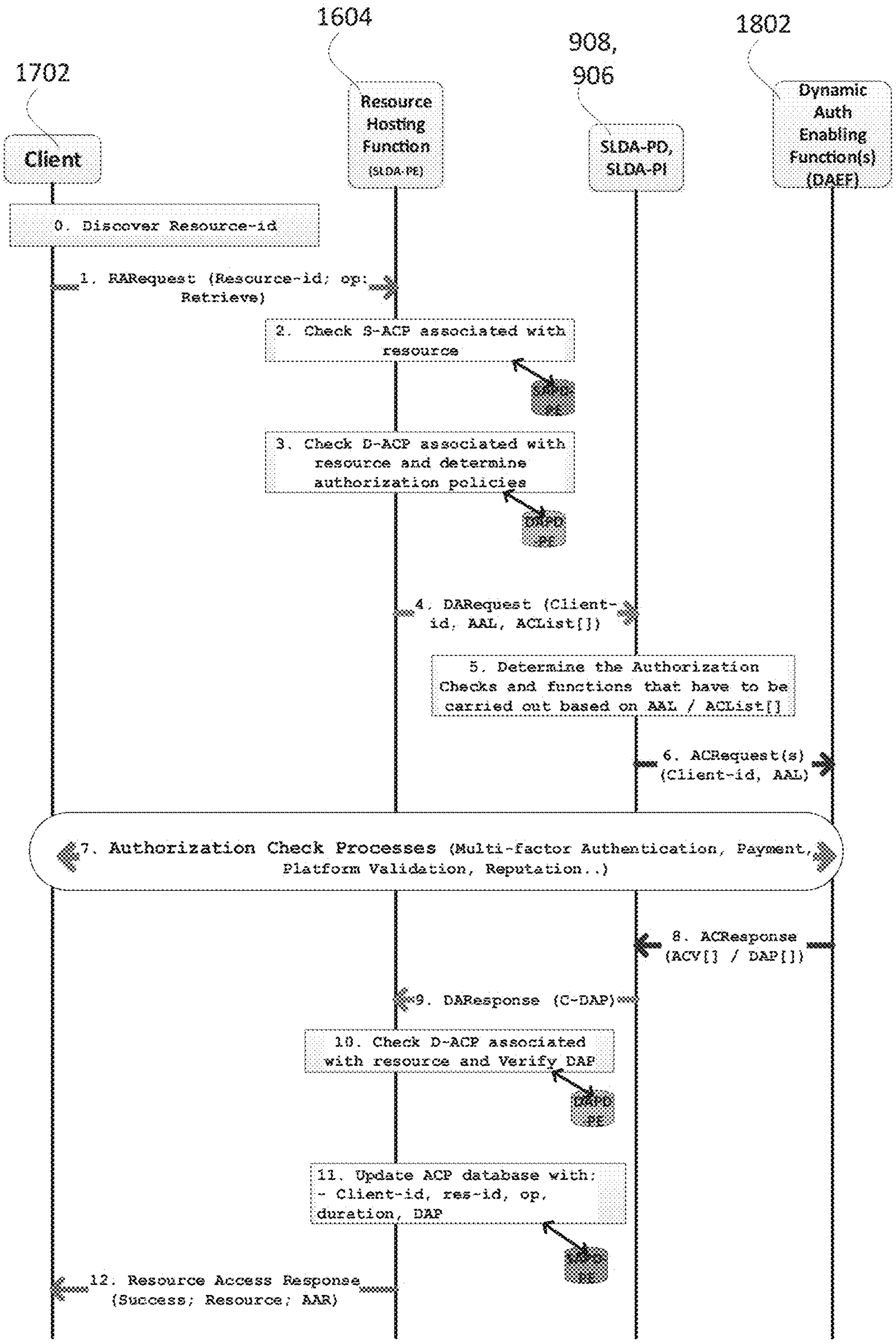
FIG. 20 is a diagram of Authorization based on PULL Model

A constrained Client 1702 may request access to a resource and perform authorization facilitated by the RHF 1604. Messaging details are provided below with respect to FIG. 20:

In step 1 of FIG. 20, the Client 1702 request for resource identified by Res-Id, op="retrieve" with a RHF 1604 using a RRRequest. The RHF 1604 implements SLDA-PE 910 functionality.

In step 2 of FIG. 20, the RHF 1604 checks the S-ACP to verify if the Client 1702 has been authorized by checking the static SAPD-PE. If the Client 1702 is authorized to perform the operation on the resource then the messaging jumps to step 12.

In step 3 of FIG. 20, the SLDA-PE 910 checks the dynamic authorization policies and determines the DAR In step 4 of FIG. 20, the SLDA-PE 910 creates a DARequest containing the DAR, Client-Id and Res-Id and sends it to the SLDA-PD. Alternatively, the PE provides explicit list of authorization checks ACList[ ] and associated AuthLevel[ ] that is expected to be achieved.

In step 5 of FIG. 20, the SLDA-PD 908 determines the DAEFs that will have to be contacted in order that the authorizations are carried out and AuthLevels are achieved In step 6 of FIG. 20, the SLDA-PD 908 sends a ACRequest containing the Client-Id and the associated AAL to each of the DAEFs.

In step 7 of FIG. 20, the Client 1702 and each of the DAEFs performs ACProcess described in 6.3.3 for each of the authorization check (e.g. Payment, Platform Validation, Authentication etc. . . . ). The messaging between the Client 1702 and each of the DAEFs may be performed either in-band or out-of-band messaging via the RHF 1604 or by other means in a direct manner.

In step 8 of FIG. 20, each of the ACProcess, DAEFs sends the ACVs/DAPs to the SLDA-PD.

In step 9 of FIG. 20, the SLDA-PD 908 verifies each of ACVs/DAPs and optionally creates a consolidated DAP (C-DAP) that includes information provided in each of the individual DAP from each of the DAEF 1802 and digitally signed by the SLDA-PD 908 and is sent to the RHF 1604 using DAResponse. Alternatively, the SLDA-PD 908 sends each of the DAP without consolidation or signing.

In step 10 of FIG. 20, the SLDA-PE 910 verifies the DAP(s) and ensures that it matches the D-ACP associated with the resource In step 11 of FIG. 20, if the DAP(s) matches the requirements then the SLDA-PE 910 updates the static access policies in the SAPD-PE 910 with the Client-Id, Res-Id, op, duration, DAP-Id(s), DAP (optional)

In step 12 of FIG. 20, the SLDA-PE 910/RHF 1604 sends the Resource and the AAR to the Client It is understood that the entities performing the steps illustrated in FIG. 20 are logical entities that may be implemented in the form of software (i.e., computer-executable instructions) stored in a memory of, and executing on a processor of, a network node or computer system such as those illustrated in FIG. 44C or FIG. 44D. That is, the method(s) illustrated in FIG. 20 may be implemented in the form of software (i.e., computer-executable instructions) stored in a memory of a network node, such as the node or computer system illustrated in FIG. 44C or FIG. 44D, which computer executable instructions, when executed by a processor of the node, perform the steps illustrated in FIG. 20. It is also understood that any transmitting and receiving steps illustrated in FIG. 20 may be performed by communication circuitry of the node under control of the processor of the node and the computer-executable instructions (e.g., software) that it executes.

PUSH Confirm Model

Figure 21:
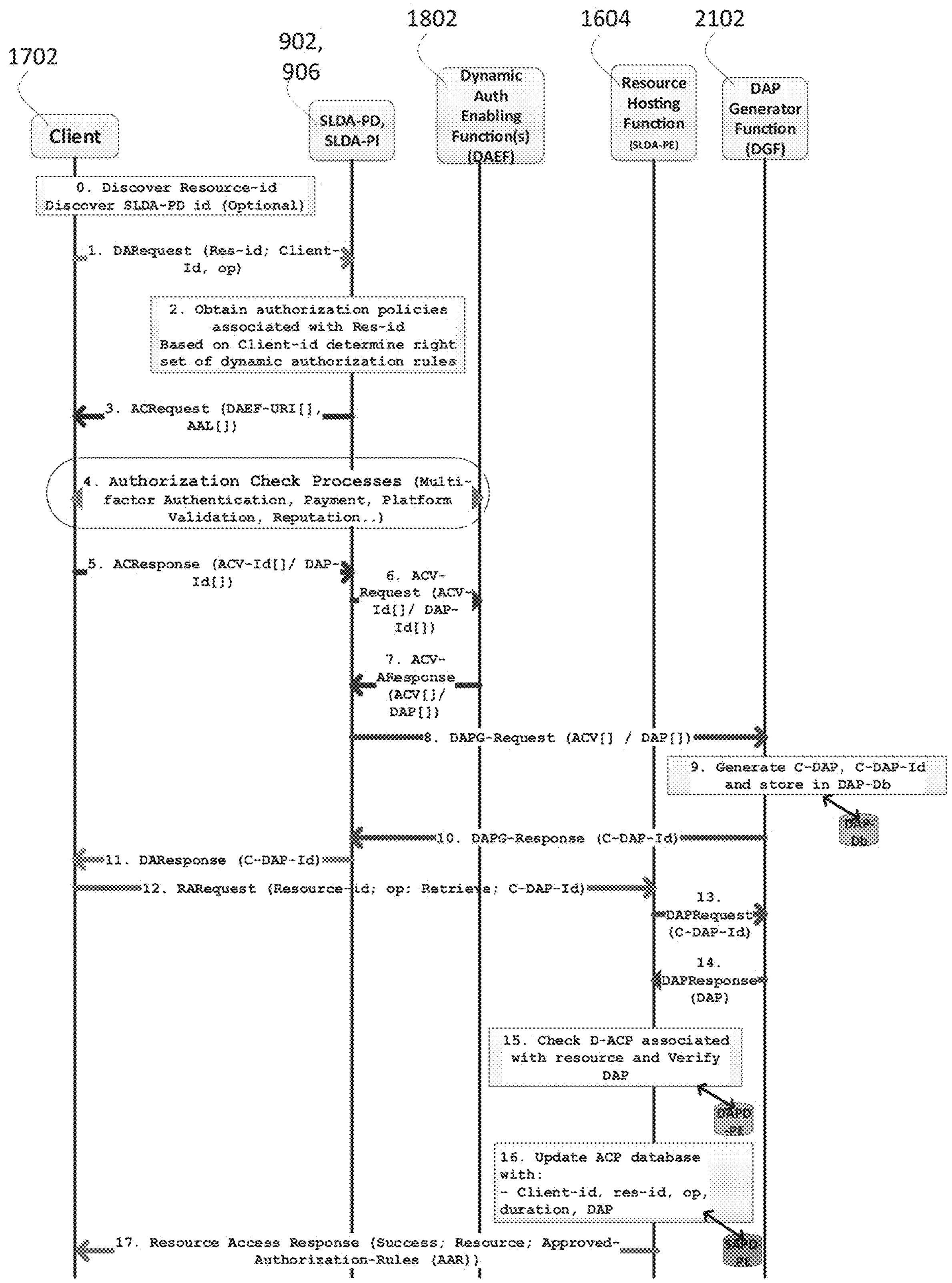
FIG. 21 is a diagram of Authorization based on PUSH Confirm model

In the PUSH Confirm model follows the PUSH model very closely. Messaging details are provided below that reflects the illustrated FIG. 21:

In step 1 of FIG. 21, the Client 1702 requests DARequest containing the Res-Id, Client-Id, op In step 2 of FIG. 21, The SLDA-PD 908 based on the Client-Id, Res-Id and op, it determines the right set of D-ACP In step 3 of FIG. 21, the SLDA-PD 908 sends a ACRequest containing the list of DAEF-URI[ ] and the associated AAL[ ]

In step 4 of FIG. 21, the Client 1702 performs ACProcess with each of the DAEFs and based on the AAL associated with each authorization check. The Client 1702 is provisioned with ACV-Ids and/or DAP-Ids but not the ACVs or DAPs In step 5 of FIG. 21, the Client 1702 forwards the ACV-Ids and/or DAP-Ids to the SLDA-PD 908 using a ACResponse In step 6 of FIG. 21, the SLDA-PD 908 performs a ACV-Request with each of the DAEF 1802 containing the ACV-Id and/or DAP-Id In step 7 of FIG. 21, the DAEFs responds with corresponding ACVs and/or DAPs using an ACV-Response message In step 8 of FIG. 21, the SLDA-PD 908 requests for the creation of C-DAP by means of a DAP Generation Request (DAPGRequest) message containing the ACV[ ] and or the DAP[ ] to a DAP Generator Function (DGF) 2102

In step 9 of FIG. 21, based on the ACV[ ] and/or DAP[ ], the DGF 2102 generates a C-DAP and associated C-DAP-Id and stores it within the DAP Database (DAP-D)

In step 10 of FIG. 21, the DGF 2102 sends the C-DAP-Id to the SLDA-PD.

In step 11 of FIG. 21, the SLDA 902 sends the C-DAP-Id to the Client 1702 using a DAResponse message In step 12 of FIG. 21, the Client 1702 performs a RARequest containing the Res-Id, op, Client-Id, C-DAP-Id to the RHF 1604

In step 13 of FIG. 21, the RHF 1604 sends the C-DAP-Id to the DGF 2102 using DAPRequest message In step 14 of FIG. 21, the DGF 2102 may verify authorization of the RHF 1604 before provisioning it with the C-DAP In step 15 of FIG. 21, the RHF 1604 verifies the C-DAP with the D-ACP In step 16 of FIG. 21, if the C-DAP meets the authorization requirements then the RHF 1604 updates the SAPD-PE with Client-Id, Res-Id, op, duration, C-DAP-Id and C-DAP (optional)

In step 17 of FIG. 21, the RHF 1604 sends the Resource and the AAR to the Client 1702

It is understood that the entities performing the steps illustrated in FIG. 21 are logical entities that may be implemented in the form of software (i.e., computer-executable instructions) stored in a memory of, and executing on a processor of, a network node or computer system such as those illustrated in FIG. 44C or FIG. 44D. That is, the method(s) illustrated in FIG. 21 may be implemented in the form of software (i.e., computer-executable instructions) stored in a memory of a network node, such as the node or computer system illustrated in FIG. 44C or FIG. 44D, which computer executable instructions, when executed by a processor of the node, perform the steps illustrated in FIG. 21. It is also understood that any transmitting and receiving steps illustrated in FIG. 21 may be performed by communication circuitry of the node under control of the processor of the node and the computer-executable instructions (e.g., software) that it executes.

Indirect PUSH

Figure 22:
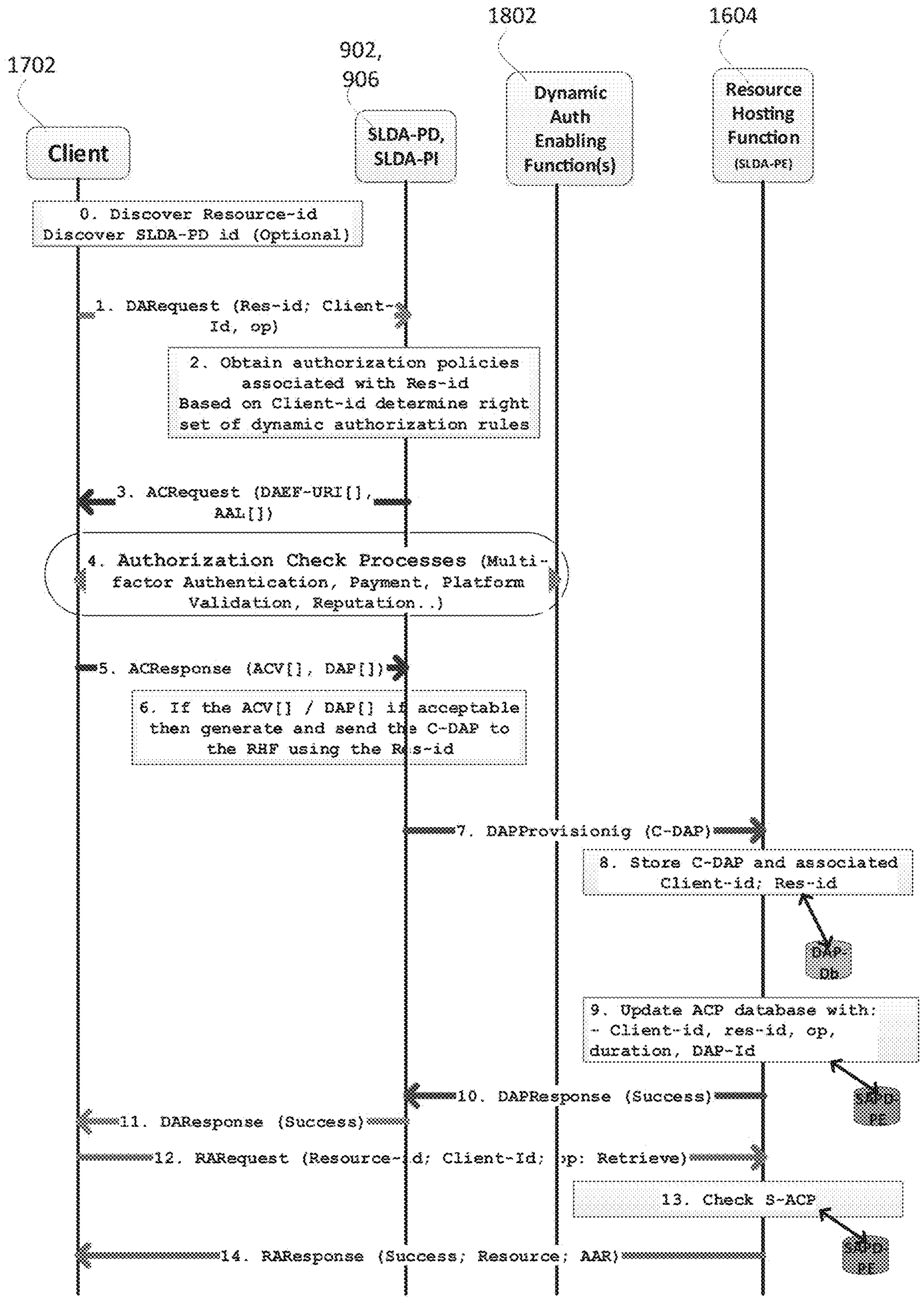
FIG. 22 is a diagram of Authorization based on Indirect PUSH model

Illustrated in FIG. 22 is an authorization based on Indirect push model. Messaging details follow:

Steps 1-4 of FIG. 22 are the same as in FIG. 21

In step 5 of FIG. 22, the Client 1702 obtains/generates ACV[ ] and/or DAP[ ] for each authorization checks that are performed and sends the ACResponse to the SLDA-PD 908 containing the ACVs and DAPs In step 6 of FIG. 22, the SLDA-PD 908 verifies the ACV[ ] and/or the DAP[ ] and if they are acceptable the SLDA-PD 908 generates C-DAP.

In step 7 of FIG. 22, the SLDA-PD 908 sends a DAP Provisioning (DAPProvisioning) message containing the C-DAP to the RHF 1604. The URI of the RHF 1604 is determined based on the Res-Id that was provided by the Client 1702

In step 8 of FIG. 22, the RHF 1604 (SLDA-PE) verifies the C-DAP and ensures that the C-DAP meets the requirements of the D-ACP associated with the resource. SDPA-PE stores the C-DAP into the DAP-Db In step 9 of FIG. 22, the SLDA-PE 910 creates an entry into the ACP database (SAPD-PE) if the "duration" of the authorization exceeds the authorization_duration_threshold. Therefore a dynamic authorization check(s) causes to create a static authorization rule provided the authorization duration is very large.

In step 10 of FIG. 22, if the DAP is acceptable then the SLDA-PE 910 sends a DAPResponse message containing "success message"

In step 11 of FIG. 22, the SLDA-PD 908 sends DAResponse message to the Client 1702 containing the "success" message In step 12 of FIG. 22, on receiving a "success" message from the SLDA-PD 908, the Client 1702 initiates a RARequest containing Res-Id, op, Client-Id In step 13 of FIG. 22, the SLDA-PE 910 checks the static S-ACP in the SAPD-PE and finds a match In step 14 of FIG. 22, the RHF 1604 sends the Resource and AAR to the Client 1702

It is understood that the entities performing the steps illustrated in FIG. 22 are logical entities that may be implemented in the form of software (i.e., computer-executable instructions) stored in a memory of, and executing on a processor of, a network node or computer system such as those illustrated in FIG. 44C or FIG. 44D. That is, the method(s) illustrated in FIG. 22 may be implemented in the form of software (i.e., computer-executable instructions) stored in a memory of a network node, such as the node or computer system illustrated in FIG. 44C or FIG. 44D, which computer executable instructions, when executed by a processor of the node, perform the steps illustrated in FIG. 22. It is also understood that any transmitting and receiving steps illustrated in FIG. 22 may be performed by communication circuitry of the node under control of the processor of the node and the computer-executable instructions (e.g., software) that it executes.

oneM2M Service Layer Dynamic Authorization Embodiment

The following sub-sections propose architecture, resource, and procedural level enhancements that enable a oneM2M system to support the SLDA functionality proposed in this disclosure.

A summary of the proposed oneM2M enhancements include:

1) An architectural level embodiment of SLDA functionality within a oneM2M system showing which types of oneM2M entities SLDA functionality can be hosted on (e.g. MEF 2304, MAF 2302 and CSEs).
2) Some proposed enhancements to the existing oneM2M defined <accessControlPolicy> resource to include an identifier for an individual privilege within the privilege list that enables partial addressing of individual privilege within privileges list, an expiration time for each individual privilege, and the definition of new types of authorization context that support use cases involving payment-based, bartering-based, reputation-based, and security assessment-based dynamic authorization.
3) The definition of a oneM2M <dynAuthPolicy> resource and attributes to support configuration of service layer dynamic authorization policies.
4) The definition of a oneM2M <dynAuthRequest> resource and corresponding request and response message formats to support explicitly requesting dynamic authorization to be performed.
5) The definition of a oneM2M <consult> resource and corresponding request and response message formats to support the ability to consult explicitly requesting dynamic authorization to be performed.
6) The definition of several oneM2M procedures providing message sequence level descriptions of how different types of dynamic authorization functionality can be supported within a oneM2M system.

oneM2M Service Layer Dynamic Authorization Architecture

Figure 23:
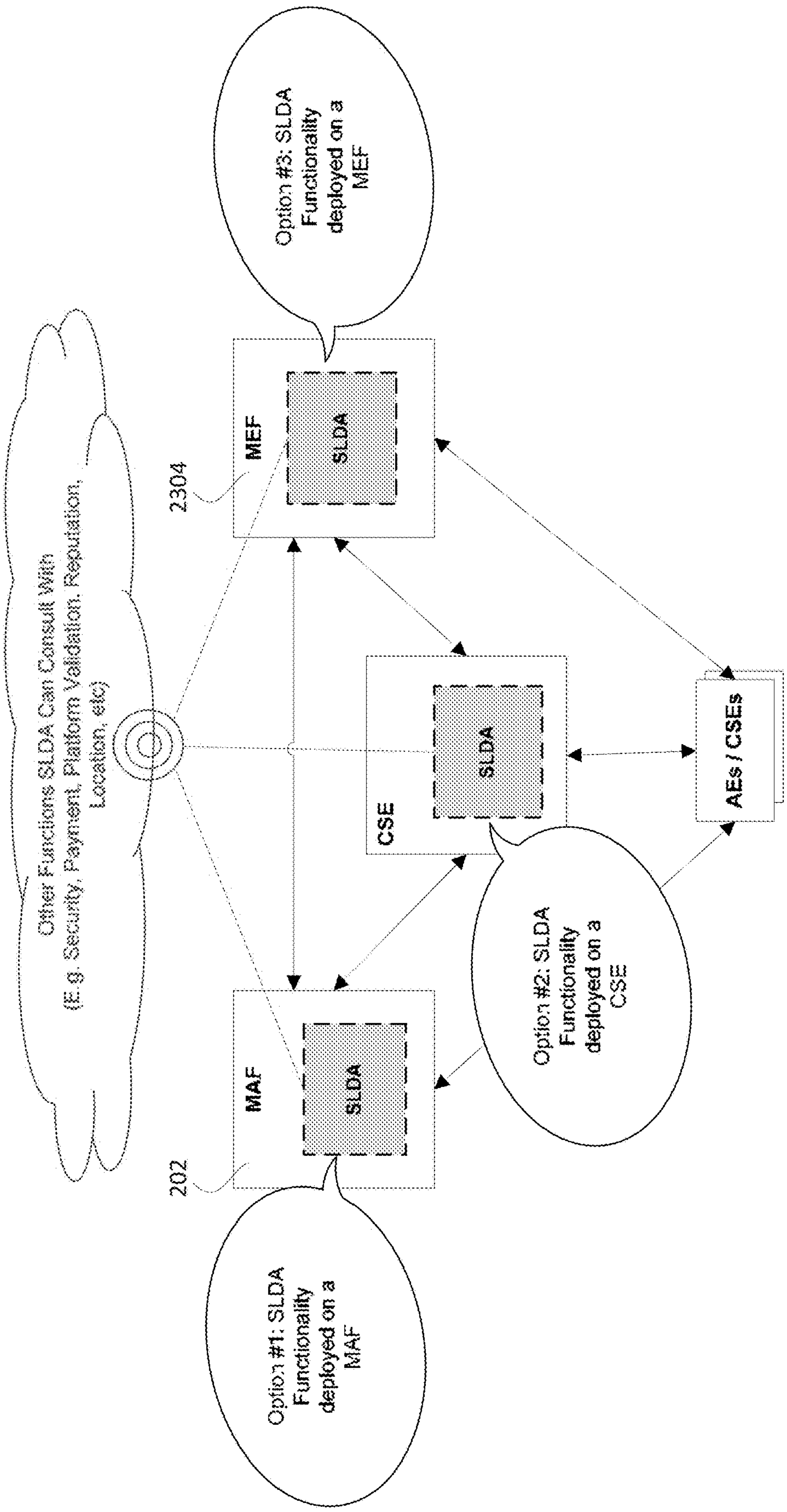
FIG. 23 is a diagram of a SLDA functionality deployed centrally on a oneM2M MEF 2304, MAF 2302 or CSE entity
Figure 24:
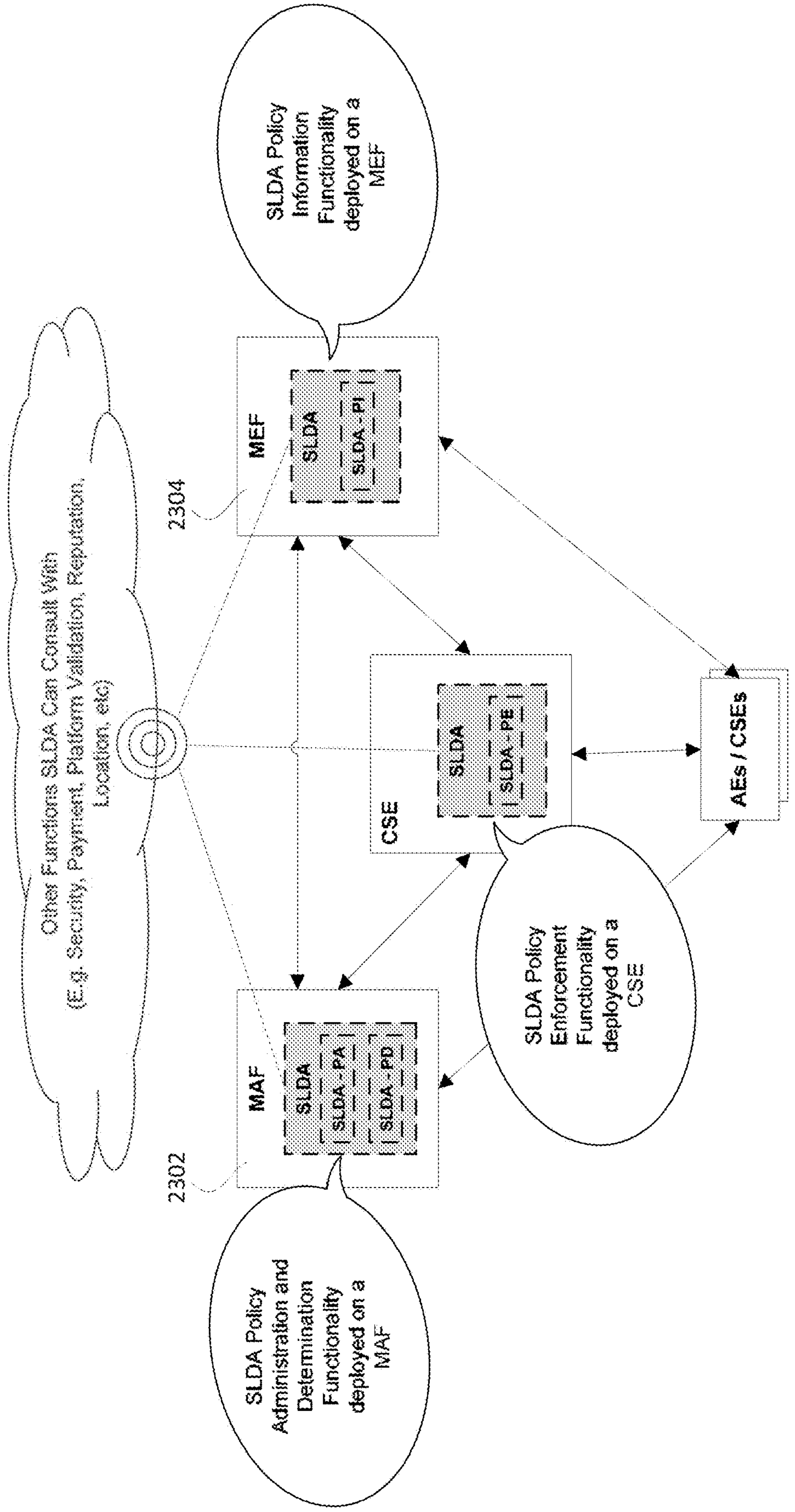
FIG. 24 is a diagram of SLDA functionality deployed distributed across oneM2M MEF 2304, MAF 2302 and CSE Entities

The SLDA function 902 proposed in this disclosure can optionally be hosted on various oneM2M defined entities including a CSE, a MEF 2304 or a MAF 2302 as shown in FIG. 23. The SLDA function 902 can be centralized and hosted in its entirety on one of these oneM2M defined entities, or alternatively, the SLDA function 902 can be partitioned such that its sub-functions (SLDA-PA, SLDA-PD 908, SLDA-PE 910 and SLDA-PI) can be hosted in a distributed manner across multiple oneM2M entities as shown in FIG. 24. For example, the SLDA-PI sub-function can be hosted on a MEF 2304, the SLDA-PD 908 and SLDA-PA 904sub-functions on a MAF 2302 and the SLDA-PE 910 sub-function on a CSE. When hosted in a distributed manner, the SLDA 902 sub-functions can coordinate with one another to perform dynamic authorization functions.

It is understood that the functionality illustrated in FIGS. 23-24, may be implemented in the form of software (i.e., computer-executable instructions) stored in a memory of, and executing on a processor of, a node of an M2M network (e.g., a server, gateway, device, or other computer system), such as one of those illustrated in FIG. 44C or 44D described below.

oneM2M Service Layer Dynamic Authorization Resources

Figure 25:
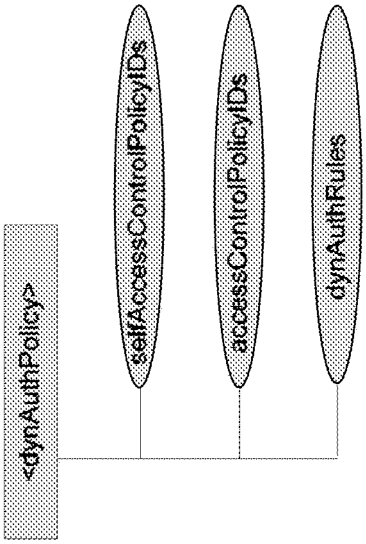
FIG. 25 is a diagram of <dynAuthPolicy> oneM2M Resource

The graphical representation for describing resource structures is the following:

- Square boxes are used for resources and child resources
- Ellipses are used for attributes
- Resource names delimited with "<" and ">" indicate the name of the resource is assigned during the creation of the resource
- Highlighted resources and attributes are new resources and attributes proposed by this disclosure to support SLDA functionality <dynAuthPolicy> Resource The proposed <dynAuthPolicy> resource shown in FIG. 25 can serve as the interface to configure the SLDA function 902 with dynamic authorization rules. This resource can be used to create, retrieve, update and delete SLDA 902 policies. Once configured with one or more <dynAuthPolicy> resources, the SLDA function 902 can use the rules defined within the policies to perform dynamic authorization decision making.

Various types of dynamic authorization rules can be supported such as but not limited to those defined by this disclosure that include consultation-based, payment-based, barter-based, security assessment-based and reputation-based policies. How to represent each of the rules in a oneM2M system is further described in more detail in the sub-sections below.

In addition to dynamic authorization rules, the <dynAuthPolicy> resource can also support a selfAccessControlPolicyIDs attribute. This attribute can be used to reference access control policies that define the access privileges for the <dynAuthPolicy> resource itself. These privileges can be used to control which entities are allowed to access (e.g. retrieve, update or delete) the <dynAuthPolicy> resource and its attributes.

Optionally, the <dynAuthPolicy> resource can also support an accessControlPolicyIDs attribute that can be configured with a list of links to one or more <accessControlPolicy> resources whose static privileges a SLDA function 902 can dynamically create, update or delete using this <dynAuthPolicy> resource.

TABLE 1

Attributes of <dynAuthPolicy> Resource

| Attribute Name | Description |
| --- | --- |
| selfAccessControlPolicyIDs | Links to authorization policy(s) defining which entities have the privilege to perform CRUD operations to this <dynAuthPolicy> resource. |
| accessControlPolicyIDs | Links to one or more access control policies whose privileges can be dynamically created, updated or deleted by an SLDA function 902 based on the rules defined by this <dynAuthPolicy> resource. |
| dynAuthRules | List of one or more rules used by a SLDA function 902 to perform dynamic authorization. These rules are used to determine whether or not the SLDA function 902 is to dynamically grant access privileges to an entity attempting to access a resource or service that the entity does not currently have proper privileges to access.<br>Each rule can be specified as a list of criteria that must be met by an originator of a request before access privileges are dynamically granted.<br>The following is a list of supported criteria types defined by this disclosure. For the case where a rule consists of multiple criteria, the criteria must all be met in order for the originator to be considered a candidate for granting privileges to.<br>Allowed Originators (ar) - A list of IDs of originators that are candidates for dynamic authorization. Wildcard characters such as a '*' can be used to<br>Blocked Originators (br) - A list of IDs of originators that are NOT candidates for dynamic authorization. Wildcard characters such as a '*' can be used to<br>Allowed Operations (aop) - A list of allowed operations that are candidates for dynamic authorization<br>Blocked Operations (bop) - A list of operations that are NOT candidates for dynamic authorization<br>Allowed Locations (al) - A list of locations originator is allowed to be in to be considered a candidate for dynamic authorization<br>Blocked Locations (bl) - A list of locations originator is forbidden to be in to be considered a candidate for dynamic authorization<br>Allowed Time Schedule (ats) - A list of times that requests are allowed to considered a candidate for dynamic authorization<br>Blocked Time Schedule (bts) - A list of times that requests are NOT allowed to considered a candidate for dynamic authorization<br>Allowed IP addresses (aia) - A list of originator IP addresses that are allowed to be considered candidates for dynamic authorization<br>Blocked IP addresses (aia) - A list of originator IP addresses that are NOT allowed to be considered candidates for dynamic authorization<br>Allowed Requester Roles (arr) - A list of requester roles that are allowed to be considered candidates for dynamic authorization<br>Blocked Requester Roles (brr) - A list of requester roles that are NOT candidates for dynamic authorization |

TABLE 1-continued

Attributes of <dynAuthPolicy> Resource

| Attribute Name | Description |
|---|---|
| | Allowed Apps (aa) - A list of classes of apps or App-IDs that are allowed to be considered candidates for dynamic authorization<br>Blocked Apps (ba) - A list of classes of apps or App-IDs that are NOT candidates for dynamic authorization<br>Requires Payment Verification (rpv) - Originator's payment information must first be verified before it can be considered a candidate for dynamic authorization. If a payment consultation contact is specified in the consultationContact list, then the SLDA function 902 can consult with it.<br>Requires Service Subscription Verification (rsv) - If present, then originator's service subscription must first be verified to be valid before it can be considered a candidate for dynamic authorization. If a service subscription consultation contact is specified in the consultationContact list, then the SLDA function 902 can consult with it.<br>Requires Consultation-based Authorization (rca) - If present, SLDA 902 must perform consultation-based authorization. If an authorization consultation contact is specified in the consultationContact list, then the SLDA function 902 can consult with it.<br>Requires Security Assessment (rsa) - If present, SLDA 902 must perform security assessment-based authorization to verify that originator meets a certain level of security. If an authorization consultation contact is specified in the consultationContact list, then the SLDA function 902 can consult with it.<br>Required Barter Terms (rbt) - A list of barter terms that originator must agree to for it to be considered a candidate for dynamic authorization.<br>Required Reputation Level (rrl) - A required ranking or level of reputation that an originator must have to be considered a candidate for dynamic authorization. E.g. High (H), Average (A), Low (L). If a contact is specified in the consultationContact list for a reputation function, the SLDA function 902 can consult with it.<br>Required Platform Validation Level (rpv) - A required level of validation an originator's platform must have to be considered a candidate for dynamic authorization. E.g. High (H), Average (A), Low (L). If a contact is specified in the consultationContact list for a platform validation function, the SLDA function 902 can consult with it.<br>Required Pre-Requisites (rpr) - A list of required credentials, subscriptions, actions or other arrangements an originator must have established/completed to be considered a candidate for dynamic authorization.<br>For example a list of dynAuthRules can be expressed as follows:<br>owl: AE1, AE2, AE3; ao: U, R, S; fo: C, D; rpv; rsv; rrl: H |
| consultationContacts | List of consultation contacts. Each contact in the list can be structured as a tuple having the following components. consultationContacts are used by a SLDA function 902 for cases where it needs to consult with other functions in the network to collect information needed to process the dynAuthRules. E.g. Determine the location of the originator, or verify the payment information of an originator, etc.<br>consultationContactType - The type of contact. The following types are defined by this disclosure:<br>Credential Enrollment Function Contact<br>Authorization Function Contact<br>Payment Function Contact<br>Barter Function Contact<br>Location Function Contact<br>Reputation Function Contact<br>Platform Function Validation Contact<br>Security Function Contact<br>consultationContactAddr - The address of the consultationContact. For example, a URI, FQDN, IP address and port, etc.<br>E.g. A list of consultationContacts can be expressed as follows<br>LF: location-server.com; PF: payment-server.com; SF: security-server.com |
| privilegeLifetime | The max lifetime that the SLDA 902 should assign to any of the access control privileges it grants to an originator. Values of zero translate into privileges that are only active for the current request being processed. In this case, the SLDA 902 will not update or add static access control privileges. Non-zero values will result in the SLDA function 902 configuring the expiration time of a privilege that is added/updated to a <accessControlPolicy> by the SLDA. |

Rather than using the proposed explicit method of using an accessControlPolicyIDs attribute to explicitly link <accessControlPolicy> resources with a <dynAuthPolicy> resource, an implicit method is also defined below via the use of several use case embodiments.

Figure 26:
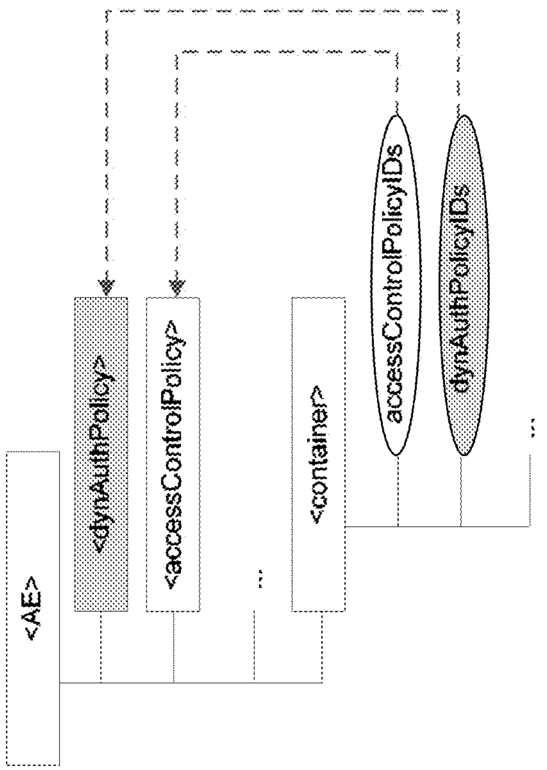
FIG. 26 is a diagram of Linking to a <dynAuthPolicy> via a dynAuthPolicyIDs attribute

For example, as shown in FIG. 26, a dynAuthPolicyIDs attribute can be added to existing oneM2M resources (e.g. a <container> resource). This attribute can be used to link a oneM2M resource with a <dynAuthPolicy> resource in a similar manner as oneM2M's current support for linking a oneM2M resource with an <accessControlPolicy> using an accessControlPolicyIDs attribute. An SLDA function 902 can in turn determine which <accessControlPolicy> resources can be managed by which <dynAuthPolicy> resources by simply making use of the accessControlPolicyIDs and dynAuthPolicyIDs attributes supported by a oneM2M resource. For example, if a request is made to access the <container> resource shown in FIG. 26, a check could first be performed to determine whether the <accessControlPolicy> referenced by the container's accessControlPolicyIDs attribute, had an privilege to allow the requester to perform the desired operation. If so, the request could be allowed to proceed and dynamic authorization would not be required. However, if the requester did not have proper privileges, then the SLDA function 902 could be triggered to try and perform dynamic authorization. The SLDA function 902 could first check whether the <container> resource had a dynAuthPolicyIDs attribute which was configured to link to a valid <dynAuthPolicy> resource. If so, the SLDA function 902 could then access the dynAuthRules attribute of and use it to determine whether or not grant or deny the requester privileges. It could also use the privilegeLifetime attribute to determine whether to grant privileges just for this request or for future requests as well. If future requests, it could then update the static privileges within the <accessControlPolicy> resource(s) linked to by the <container>. The SLDA function 902 could do this by updating the privileges of <accessControlPolicy> resource(s) link to by the container's accessControlPolicyIDs attribute.

Figure 27:
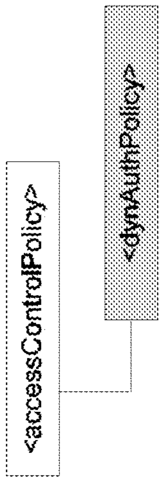
FIG. 27 is a diagram of <dynAuthPolicy> as a child resources of <accessControlPolicy>

As an alternative, a <dynAuthPolicy> resource could instead be created as a child resource of a <accessControlPolicy> resource as shown in FIG. 27. If/when it was found that a requester did not have adequate privileges to perform a desired operation on a targeted resource, an SLDA function 902 could then check whether the corresponding <accessControlPolicy> resource had a <dynAuthPolicy> child resource. If so, the SLDA function 902 could then check whether it could dynamically grant proper privileges to the requester based on the rules specified by the <dynAuthPolicy> child resource.

Figure 28:
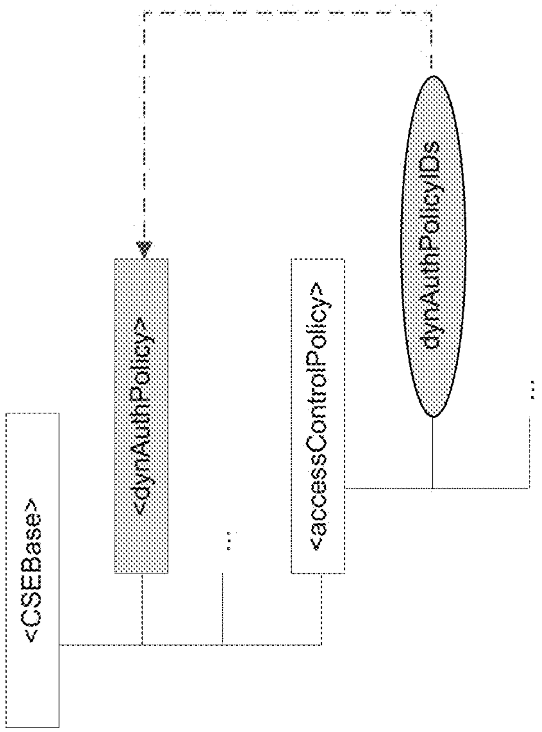
FIG. 28 is a diagram of Linking <dynAuthPolicy> via dynAuthPolicyIDs attribute added to accessControlPolicy>
Figure 29:
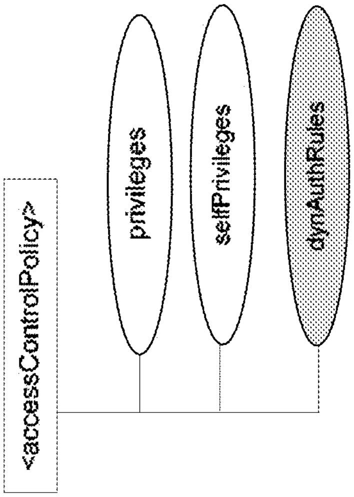
FIG. 29 is a diagram of <dynAuthPolicy> attributes merged into <accessControlPolicy>

Yet as another alternative, a dynAuthPolicyIDs attribute could instead be added to a <accessControlPolicy> resource as shown in FIG. 28. If/when it was found that a requester did not have adequate privileges to perform a desired operation on a targeted resource, an SLDA function 902 could then check whether the corresponding <accessControlPolicy> resource had a dynAuthPolicyIDs attribute configured. If so, the SLDA function 902 could then reference the corresponding <dynAuthPolicy> resources to check whether it could dynamically grant proper privileges to the requester based on the rules specified by the <dynAuthPolicy> child resources.

Yet as another alternative, rather than defining a new <dynAuthPolicy> resource, the proposed attributes could instead be added to the existing <accessControlPolicy> resource.

<dynAuthRequest> Resource

Figure 30:
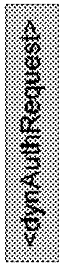
FIG. 30 is a diagram of <dynAuthRequest> Virtual Resource

This disclosure also defines an <dynAuthRequest> resource as shown in FIG. 30. This resource can be defined as a virtual resource having no attributes (as shown), or it can be defined as a normal resource having attributes (not shown). It can be used to issue an explicit dynamic authorization request to an SLDA function 902 to request specific types of access privileges be dynamically added to the <accessControlPolicy> privileges affiliated with one or more desired resources or services. This resource can be useful for scenarios where a requester lacks the proper access privileges to a desired resource or service and also lacks privileges to update the access controls to grant itself. In this case, the requester can use the <dynAuthRequest> resource to send an explicit request to an SLDA function 902 to try and obtain the desired access privileges. If successful, the SLDA function 902 can update the access control policy(s) for the targeted resource(s) or service(s) to add the requested privileges and return status back to the requester. If successful, the requester can thereafter issue requests to access the desired resource or service and it will have the proper privileges to perform the access.

Figure 31:
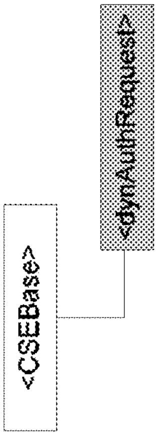
FIG. 31 is a diagram of <dynAuthRequest> instantiated under CSEBase

The <dynAuthRequest> resource can be instantiated at various levels in the oneM2M resource tree hierarchy. In one embodiment shown in FIG. 31, a <dynAuthRequest> resources can be instantiated under a <CSEBase> resource and made available to any service layer registrant having access privileges to access the <CSEBase> resource. This type of embodiment could be used to allow service layer registrants to explicitly request privileges to any of the CSEBase sub-resources which have not already been pre-configured (i.e. dynamically request privileges on-the-fly rather than relying on pre-configured privileges).

Figure 32:
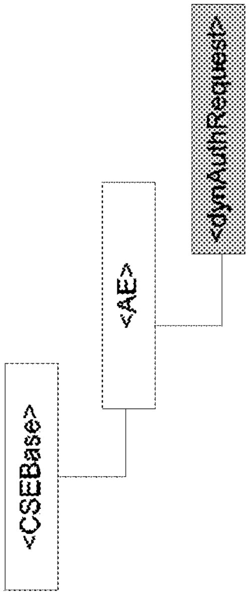
FIG. 32 is a diagram of <dynAuthRequest> Instantiated Under a <AE> Resource

Alternatively, in another embodiment shown in FIG. 32 a <dynAuthRequest> resource can be instantiated under other oneM2M resource types such as an <AE>. The same could be done for other existing oneM2M resource types such as <container>, <subscription> or <accessControlPolicy>. In doing so, the scope of dynamic authorization requests can be limited to those service layer registrant having pre-existing access privileges to these resources. For example, only a service layer registrant having existing access privileges to <CSEBase>/<AE> in this example could issue a dynamic authorization request to <CSEBase>/<AE>/<dynAuthRequest> to try and obtain access privileges to sub-resources under <CSEBase>/<AE>.

To use this resource, this disclosure also defines dynamic authorization request and response messages (i.e. oneM2M primitives) having several proposed parameter as defined in Table 2 and Table 3 below. To initiate an explicit dynamic authorization request, a requester can form a request by properly initializing the defined parameters based on the type of access privileges it is wishing to obtain. The requester can then send the request message to a <dynAuthRequest> resource. Upon receiving the request, the SLDA function 902 can process it (i.e. compare the request message parameters against its configured <dynAuthPolicy> resource rule(s) that correspond with the targeted resource or service that the requester is wishing to obtain privileges for). Based on the outcome, the SLDA function 902 can determine whether or not to modify the access control privileges per the request. The SLDA 902 can then form a response having parameters that define which of the requested privileges were granted and which were denied. In the event that dynamic authorization functionality was not supported (e.g. <dynAuthRequest> resource not supported) or a targeted resource or service did not have a properly configured <dynAuthPolicy> resource, an error can be returned.

TABLE 2

Parameters of Explicit Dynamic Authorization Request Message

| Parameter Name | Description |
|---|---|
| requesterID | A oneM2M service layer ID of the requester (e.g. AE-ID, CSE-ID, App-ID, etc.) |
| requestType | The type of dynamic authorization request:<br>Add new privilege |

TABLE 2-continued

Parameters of Explicit Dynamic Authorization Request Message

| Parameter Name | Description |
|---|---|
| | Update an existing privilege<br>Remove a privilege<br>Verify the existence of a privilege |
| requestedPrivileges | A list of one or more privileges that a requester is requesting be added, updated, removed or verified by an SLDA function 902. Each privilege can consist of the following types of information:<br>accessControlPrivilegeID - Only used for updating or deleting an existing <accessControlPolicy> privilege. This identifier is assigned by the entity managing the <accessControlPolicy> when a new privilege within the list of privileges is added. An identifier of a particular privilege that can be used to uniquely identify the specific privilege being targeted in the privilege list.<br>targets - A list of one or more resources or services which the requester is requesting access to. For example, this attribute can be configured with a list of URIs, a list of targeted service names, or a list of service IDs.<br>originators - A list of one or more originators that the requester is requesting privileges for (including itself if applicable)<br>operations - A list of one or more operations that the requester is requesting privileges for. For example, privileges to perform 'Create, 'Update', 'Retrieve', 'Delete', 'Subscribe', 'Discovery' operations.<br>roles - A list of one or more roles (e.g. user, administrator, etc.) that the requester would like corresponding access control privileges for. These privileges would allow the originator to be authorized to access a targeted resource or service only when operating in this role(s). For example, a requester can specify that it would like access privileges be created to allow originators to access a resource while it is functioning in an administrative role only, but not otherwise. Using this information, the SLDA function 902 can compare the desired role(s) against the <dynAuthPolicy> rules to determine whether new role-based access privileges can be added for the targeted resource or service which satisfy these desired roles.<br>locations - A list of one or more locations that the requester would like the SLDA function 902 to create corresponding access control privileges for to allow originators to be authorized to access a targeted resource or service while at this location(s). For example, a requester can specify that it would like access privileges be created to allow an originator to access a resource while at home on a particular network having a particular network address, but not otherwise. Using this information, the SLDA function 902 can compare the desired location(s) against the <dynAuthPolicy> rules to determine whether new location-based access privileges can be added for the targeted resource or service which satisfy these desired locations.<br>timeSchedules - A list of time schedules that requester would like the SLDA function 902 to create corresponding access control privileges for to allow originators to be authorized to access a targeted resource or service during these time windows.<br>ipAddresses - A list of IP addresses that requester would like the SLDA function 902 to create corresponding access control privileges for to allow originators to be authorized to access a targeted resource or service from these IP addresses.<br>apps - A list of one or App-IDs or classes of apps that the requester is requesting privileges for |
| paymentInfo | A list of payment information for each of the originators that the requester is requesting the SLDA 902 to grant access privileges for. This information can be used by an SLDA 902 to assess whether each originator meets payment-based dynamic authorization rules if applicable. The following are some proposed forms of payment information that can be included for each originator:<br>Payment Token that SLDA function 902 can authenticate and charge against<br>Payment/Billing Preferences (e.g. time based billing (monthly/weekly/daily), event based billing (per transaction), etc.<br>Service Layer Subscription Info<br>Payment Account Info<br>Price/Rate Information - Price/rate range originator is willing to pay for access to resource or service |
| barterInfo | A list of barter related information for each of the originators that the requester is requesting the SLDA 902 to grant access privileges for. The information can include an indication whether the originator is willing to reciprocate access to the resources that it is the creator of, in exchange for access to the targeted resources. The information can include a list of one or more types and/or IDs of resources that a requester is willing to grant access to other entities in exchange for being granted access to their targeted resources/services. Using this information, an SLDA function 902 can support bartering capabilities by comparing these defined terms against applicable bartering policy information defined within a <dynAuthPolicy> that corresponds to the resource or service that is being targeted. By comparing these bartering terms against the defined bartering policy rules, an SLDA function 902 can determine whether or not the terms can be agreed to and whether to dynamically add new access privileges. |
| capabilities | A list of one or more types and/or IDs of capabilities (e.g. resources, services, features, functionality) for each of the originators the requester is requesting SLDA 902 to grant access privileges for. Using this information, an SLDA function 902 can support |

TABLE 2-continued

Parameters of Explicit Dynamic Authorization Request Message

| Parameter Name | Description |
|---|---|
| | comparing these defined capabilities against applicable capability policy information defined within a <dynAuthPolicy> that corresponds to the resource or service that is being targeted. By comparing these capabilities against the defined capability policy rules, an SLDA function 902 can determine whether or not the terms can be agreed to and whether to dynamically add new access privileges. |
| subscriptionInfo | A list of service layer subscription information for each of the originators that the requester is requesting the SLDA 902 to grant access privileges for. This information can be used by an SLDA 902 to assess whether each originator meets service subscription-based dynamic authorization rules if applicable. The following are some proposed forms of service subscription information that can be included for each originator:<br>Service Provider<br>Service Plan Level or Tier<br>Service Plan Options |
| consultInfo | Contact information regarding entities in the network that an SLDA function 902 can consult with to assist with authorizing the originator of a request. For example, a requester can specify the network address of a trusted third party entity in the network that is able to vouch (i.e. authenticate) the identity, reputation, location, payment information, security assessment, etc. of an originator. |

TABLE 3

Parameters of Explicit Dynamic Authorization Response Message

| Parameter Name | Description |
|---|---|
| dynAuthStatus | The status of the dynamic authorization request:<br>Fully Granted - All requested privileges established<br>Partially Granted - Some but not all requested privileges granted<br>Denied - Requested privileges denied |
| dynAuthCredentialId | An identifier of a dynamic authorization credential that has been assigned to the requester. |
| dynAuthCredential | A dynamic authorization credential (e.g. token) assigned to the requester to be used by the requester to access the resources or services specified in the original request.<br>Note - Depending on the dynamic authorization deployment scheme and model used, this credential may be optional. |
| grantedPrivileges | A list of privileges from the original request that were either fully granted or partially granted. This parameter can consist of a list of identifiers of desired privileges included in the request that were granted. The list can also contain additional details that can be useful for the scenario where a requested privilege is partially granted. For example, a modified version of the requestedPrivileges parameter of the original request can be returned to indicate which privileges were granted. |
| deniedPrivileges | A list of privileges from the original request that were denied. This parameter can consist of a list of identifiers of desired privileges included in the request that were denied. The list can also contain additional details that can be useful for the scenario where a requested privilege is partially granted. For example, a modified version of the requestedPrivileges parameter of the original request can be returned to indicate which privileges were denied. |
| otherPrivilegesOfInterest | A list of privileges that may be of interest to requester although they were not requested in the original request. An SLDA 902 can pro-actively grant access privileges to a requester for resources or services which the requester might be interested in accessing based on the resources or services it has explicitly requested access to. |
| paymentTerms | A list of one or more payment terms established by the SLDA function 902 on behalf of the requester in order to grant the requested privileges to the requester. |
| barterTerms | A list of one or more barter terms established by the SLDA function 902 on behalf of the requester in order to grant the requested privileges to the requester. For example, this parameter can contain a list of other entities in the network that the SLDA function 902 has given access privileges to the requester's resources or services in exchange for granting the requested privileges. |
| subscriptionTerms | A list of one or more service subscriptions terms established by the SLDA function 902 on behalf of the requester in order to grant the requested privileges to the requester. For example, this parameter can contain a list of one or more levels or types of business subscriptions/agreements that have been established for the requester (e.g. 'Plan A' or 'Upgrade A'). |

<consult> Resource

Figure 33:
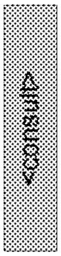
FIG. 33 is a diagram of <consult> Virtual Resource

This disclosure also defines a <consult> resource as shown in FIG. 33. This resource can be defined as a virtual resource having no attributes (as shown) or a normal resource having attributes (not shown). The URI of this resource can be used as a consultation point of contact which an SLDA function 902 can use when performing dynamic authorization which requires consulting with another entity in the network. For example, when a <dynAuthPolicy> is configured with a consultation-based rule that defines a consultationContact, the URI of a <consult> resource can be used. A <consult> resource can be hosted by various oneM2M defined entities such as CSEs, AEs, MEFs and MAFs. In addition, this resource can also be hosted by other types of entities not yet defined by oneM2M such as a location function, reputation verification function (e.g. social media servers), platform validation and assessment function, payment function, security function and service Subscription Verification Function 4102.

To use this resource, this disclosure also defines dynamic authorization consult request and response messages (i.e. oneM2M primitives) having several proposed parameter as defined in Table 4 and Table 5 below. To perform consultation, an SLDA function 902 can construct a consult request message and target this message towards a <consult> resource hosted by an entity within the system. Upon receiving this request, the entity can process it according to the type of consult, construct a corresponding response message with the consult results, and return the response to the SLDA function 902.

TABLE 4

Parameters of Consult Request Message

| Parameter Name | Description |
|---|---|
| consultantAddr | This is the address which this request is targeted at. For example, the URI of the <consult> resource. |
| consulterID | A oneM2M service layer ID of the originator issuing this consult request (E.g. AE-ID, CSE-ID, App-ID, etc). For example, the CSE-ID hosting an SLDA function 902. |
| consultType | The type of consult request. Several different types of consultation can be supported including one or more of the following proposed types.<br>Request for Consultation-based Dynamic Authorization<br>Request for a Dynamic Authorization Credential<br>Request for the location of an specified entity<br>Request to verify payment info/token of a specified entity<br>Request to verify reputation of a specified entity<br>Request to verify service layer subscription of a specified entity<br>Request to validate platform entity is hosted on<br>Request to assess security of a specified entity<br>Request to perform bartering/negotiating on behalf of consultSubject and resource or service owner |
| consultationInfo | Each type of consult request has corresponding information associated with it. This information can be sourced from an explicit dynamic authorization request or from an SLDA 902 that is performing autonomous dynamic authorization. Some proposed types of information include the following:<br>consultSubject - Identifier of an entity which is the subject being consulted on behalf of. For example, a oneM2M AE-ID for which an SLDA function 902 is consulting on behalf of and issuing a location consult request to a location server to determine the AE's location. In this example, the AE-ID would is the consultSubject.<br>Security context/assessment information of the consultSubject which the SLDA 902 can collect and track<br>requesterID - See description in Table 2<br>requestType - See description in Table 2<br>requestedPrivileges - See description in Table 2<br>paymentInfo - See description in Table 2<br>barterInfo - See description in Table 2<br>capabilities - See description in Table 2<br>subscriptionInfo - See description in Table 2<br>security context information<br>security assessment requirements |

TABLE 5

Parameters of Consult Response Message

| Parameter Name | Description |
|---|---|
| consultStatus | The status of the consult request:<br>Consultation Rejected<br>Consultation Successful<br>Consultation Error |
| consultResults | Each type of consult response has corresponding results associated with it. Some of this results are generic and applicable to all the different types of consult requests, while some results are specific to a particular type as described below.<br>List of privileges granted to requested resource or serviced and corresponding lifetime of privileges<br>List of denied privileges to requested resources or serviced that were not granted and reasons why<br>List of privileges that were pro-actively granted to resources or services that were not requested but the consultSubject may be interested in.<br>An dynamic authorization credential<br>A location of an entity<br>A payment verification status<br>Reputation reviews/ranking)<br>Platform validation assessment results<br>Security assessment level (e.g. trusted, un-trusted, etc)<br>Barter results (i.e. whether or not bartering terms were reached and what were they) |

<accessControlPolicy> Resource Enhancements

Figure 6A:
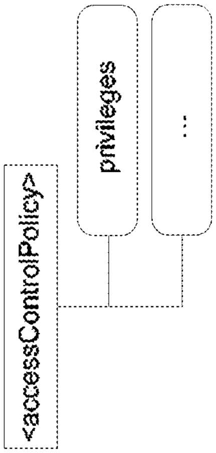
FIG. 6A is a diagram of a oneM2M <accessControlPolicy> Resource
Figure 6B:
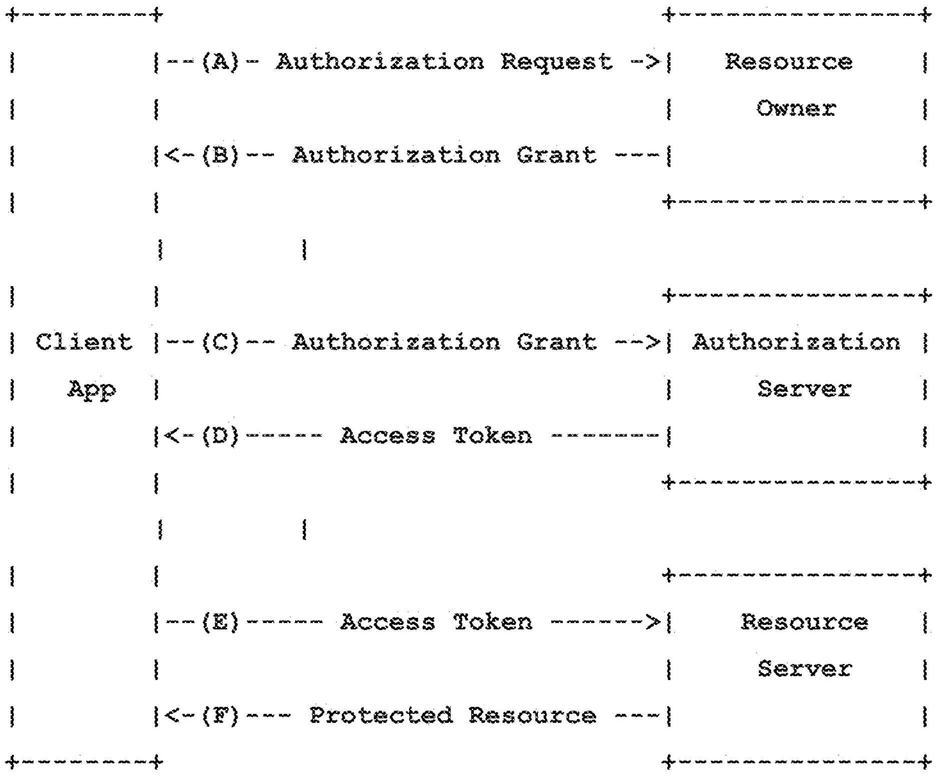
FIG. 6B is a diagram of a OAuth 2.0 authorization framework

As described in with respect to FIG. 6 above, oneM2M currently supports an <accessControlPolicy> resource having a set of defined privileges based on an ACL. This ACL is a set of access-control-rule tuples that can be stored within the privileges attribute, where each tuple is comprised of three components consisting of 1) accessControlOriginators, 2) accessControlOperations and 3) accessControlContext.

This disclosure proposes three enhancements to the existing privileges attribute of the <accessControlPolicy> resource described below.

Figure 34:
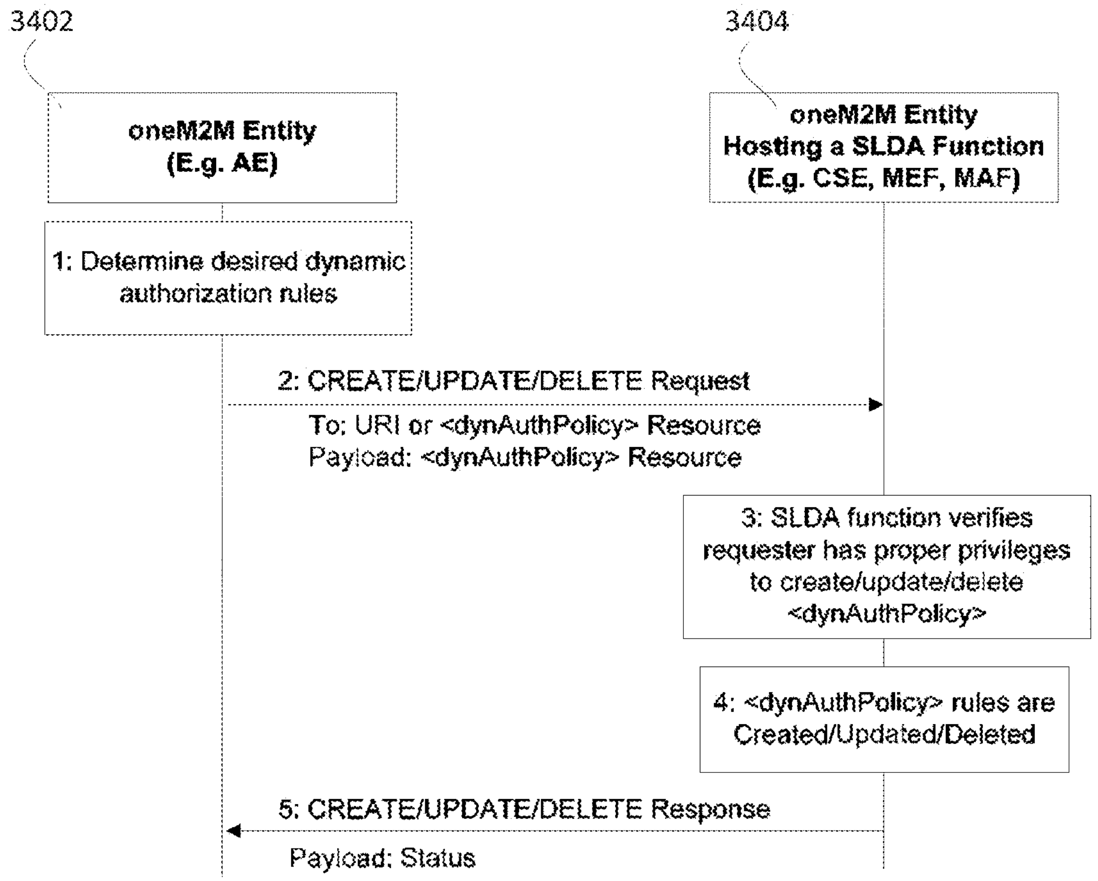
FIG. 34 is a diagram of Configuration of Service Layer Dynamic Authorization Policies

1) A fourth component has been added to privileges access-control-rule tuple called an accessControlPrivilegeID. This fourth component can be used to identify and address an individual privileges access-control-rule tuple. This identifier can be useful when supporting updating or deleting of an individual tuple. Otherwise, an update or delete of an individual tuple requires updating the entire privileges access-control-rule tuple list which can be less efficient.
2) A fifth component has been added to the privileges access-control-rule tuple called an accessControlExpirationTime. This component can be used to define a lifetime associated with a particular access-control-rule tuple. This enables access-control-rule tuples to have different lifetimes with respect to one another, which can provide more flexibility from a privileges perspective.
3) Four additional types of accessControlContext have also been defined by this disclosure:
    - accessControlPaymentTerms—List of payment terms that must be established before a service layer registrant is allowed to access resources associated with this authorization policy.
    - accessControlReputationLevel—Required reputation level that a service layer registrant must have before it is allowed to access resources associated with this authorization policy. accessControlBarterTerms—List of barter terms that must be established before a service layer registrant is allowed to access resources associated with this authorization policy.

accessControlSecurityAssessment—Required level of security that a service layer registrant must have before it is allowed to access resources associated with this authorization policy oneM2M Service Layer Dynamic Authorization Procedures Configuration of Service Layer Dynamic Authorization Policies Dynamic authorization policies can be configured via creating/updating/deleting the dynAuthRules attribute of a targeted <dynAuthPolicy> resource as shown in FIG. 34. Once configured, an SLDA function 902 can make use of these policies to perform dynamic authorization request handling.

In step 1 of FIG. 34, a oneM2M entity 3402 (e.g. AE) determines the type of dynamic authorization rule it would like to configure and the corresponding values for this rule (such as consultation-based rules, payment-based rules, barter-based rules, security-assessment-based rules and reputation-based rules).

In step 2 of FIG. 34, a oneM2M entity 3402 (e.g. AE) sends request targeting a second oneM2M entity 3404 (e.g. CSE, MEF 2304 or MAF 2302) that hosts a SLDA function 902. The request contains a <dynAuthPolicy> resource representation, where the dynAuthRules attribute of the <dynAuthPolicy> resource can be configured with dynamic authorization policy rules from Step 1.

In step 3 of FIG. 34, the SLDA function 902 hosted on the oneM2M entity 3404 receives the request and checks whether the requester has the proper privileges to perform the specified operation on the targeted <dynAuthPolicy> resource. This check is performed by confirming whether the requester has configured privileges within the corresponding <accessControlPolicy> resource associated with the targeted <dynAuthPolicy>. If yes, the SLDA function 902 continues with processing the request, otherwise the SLDA function 902 returns an error to the requester indicating lack of privileges to perform this operation to the requester.

In step 4 of FIG. 34, the SLDA function 902 processes the request and based on the operation either creates, updates or deletes the specified rules to/from the dynAuthRules attribute of the targeted <dynAuthPolicy> resource In step 5 of FIG. 34, the service layer returns a response to the requester indicating whether or not the request to create, update, or delete the specified rules in the dynAuthRules attribute of the targeted <dynAuthPolicy> resource was successful or not.

It is understood that the entities performing the steps illustrated in FIG. 34 are logical entities that may be implemented in the form of software (i.e., computer-executable instructions) stored in a memory of, and executing on a processor of, a network node or computer system such as those illustrated in FIG. 44C or FIG. 44D. That is, the method(s) illustrated in FIG. 34 may be implemented in the form of software (i.e., computer-executable instructions) stored in a memory of a network node, such as the node or computer system illustrated in FIG. 44C or FIG. 44D, which computer executable instructions, when executed by a processor of the node, perform the steps illustrated in FIG. 34. It is also understood that any transmitting and receiving steps illustrated in FIG. 34 may be performed by communication circuitry of the node under control of the processor of the node and the computer-executable instructions (e.g., software) that it executes.

Autonomous Service Layer Dynamic Authorization

Figure 35:
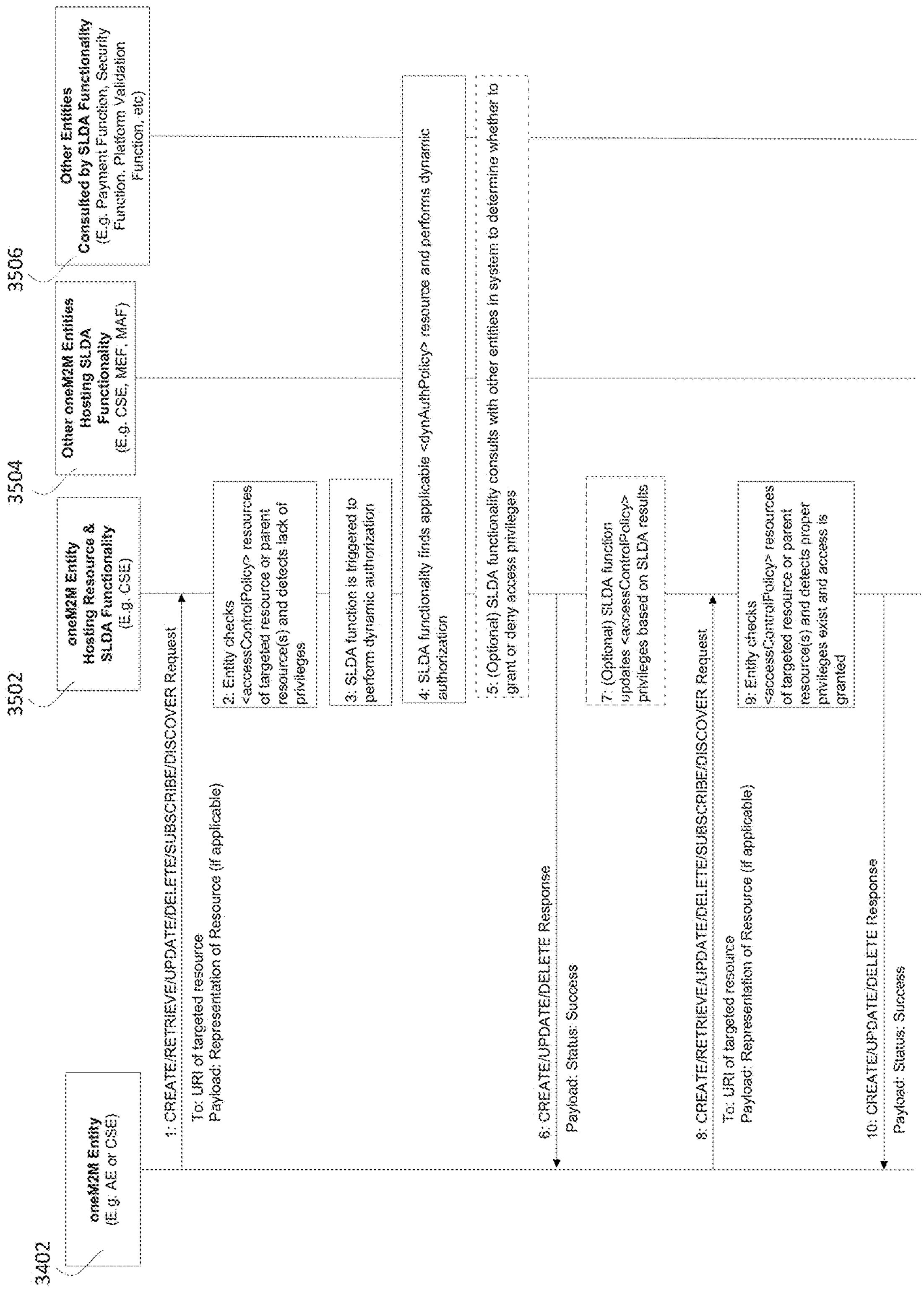
FIG. 35 is a diagram of Autonomous Service Layer Dynamic Authorization Processing

Service Layer Dynamic Authorization can be triggered and performed autonomously by a oneM2M entity 3502 that hosts a SLDA function 902 as shown in FIG. 35. Via this procedure an SLDA function 902 can support autonomously granting or denying privileges on-the-fly during the processing of requests made to access resources which a requester does not have existing privileges to access. By supporting this procedure, burden can be removed from requesters since they do not have to explicitly request access privileges for resources they do not have privileges established for. Via this procedure, service layer dynamic authorization can be performed without requesters even being aware that it is being performed. This can reduce the overhead on requesters especially for use involving resource constrained devices (e.g. sensor applications hosted on IoT devices).

This procedure can also be beneficial for the service layer itself since it offers a mechanism for access control policies to be dynamically created or updated on-the-fly leveraging SLDA 902 results rather than having to have an external management entity in the network statically pre-configure access control policies with a set of privileges in advance. Pre-configuring access control policies in advance can be burdensome, inflexible and not very scalable.

In step 1 of FIG. 35, a requesting oneM2M entity 3402 (e.g. AE or CSE) can issues a request (i.e. Create/Retrieve/Update/Delete/Subscribe/Discover) to another oneM2M entity 3502.

In step 2 of FIG. 35, the receiving oneM2M entity 3502 (e.g. CSE) detects access to targeted resource. The receiving entity checks the corresponding <accessControlPolicy> resource(s) applicable to the targeted resource (if any) to determine whether the requester has sufficient privileges configured to allow it to perform the desired type of access. In this example, the requester lacks sufficient access privileges.

In step 3 of FIG. 35, rather than immediately returning an 'access denied' error to the requester, the receiving entity 3502 triggers dynamic authorization processing to be performed by the SLDA functionality that can either be hosted on the receiving entity or on another entity in the system. SLDA functionality can also be split across multiple entities with some functionality hosted on the receiving entity.

In step 4 of FIG. 35, the receiving entity 3502, if enabled with SLDA functionality, begins to perform dynamic authorization processing. Depending on whether the receiving entity hosts SLDA functionality itself will determine whether the SLDA processing is performed completely local or whether the receiving entity will communicate with other oneM2M entities, such as entities 3504 and 3506, in the system to assist it with performing SLDA 902. As described with respect to FIGS. 23 and 24, different deployment options exist for hosting the SLDA functionality in a centralized or distributed fashion allowing different types of oneM2M entities (CSEs, MEF 2304, MAF 2302) to host an SLDA 902 either in its entirety or a particular SLDA 902 sub-function. If no SLDA functionality is found the SLDA 902 processing can be stopped and an 'access denied' error can be returned to the requester. If SLDA functionality is found to be hosted on either the receiving entity and/or other entities in the system, then this functionality is triggered to attempt to locate <dynAuthPolicy> resources applicable to the targeted resource. If a <dynAuthPolicy> cannot be found, the SLDA 902 can discontinue dynamic authorization processing and return an 'access denied' error to the requester. If one or more <dynAuthPolicy> resources are found, the SLDA functionality can use the dynAuthRules attribute for each resource found to evaluate against the requester's request and determine whether privileges can be dynamically granted.

In optional step 5 of FIG. 35, while evaluating the dynAuthRules of the applicable <dynAuthPolicy> resources, the SLDA function 902 may need to consult with other entities, such as entities 3504 and 3506, in the system depending on the type of dynAuthRules specified. Consultation may be needed to gather the proper information the SLDA function 902 requires to determine whether or not to grant or deny access privileges to the requester. Some proposed type of consultation that the SLDA function 902 can perform are described in more detail with respect to FIGS. 37-42. This consultation can be performed using the proposed <consult> resource and its corresponding request and response primitives described in further detail with respect to FIG. 33.

In step 6 of FIG. 35, Based on the results of evaluating the request against the dynAuthRules and possibly consulting with other entities, such as entities 3504 and 3506, in the system to obtain additional information that it factors into its decision making, the SLDA functionality decides to grant access to the requester. As a result, the receiving entity 3502 performs the request on the targeted resource and returns a successful response to the requester 3402. The requester 3402, is unaware that autonomous SLDA 902 was performed. All it is aware of is its request completed successfully.

In optional step 7 of FIG. 35, using the dynamic authorization results, the SLDA function 902 can optionally choose to update the privileges attribute within the <accessControlPolicy> resource(s) associated with the targeted resource to add access control privileges for the requester. This decision can be controlled via a dynAuthRule defined within a <dynAuthPolicy > resource. For example, the dynAuthRule can support a rule (e.g. privilege lifetime rule) to control whether or not the SLDA function 902 adds or updates the static privileges of the <accessControlPolicy> resources and if so what the expiration time of this privilege is. As a result, the SLDA function 902 can use this rule to control whether it updates or adds a privilege and if so the expiration time (e.g. this can be done using the accessControlExpirationTime component of the privilege as proposed above). Based on these rules, the SLDA function 902 can determine whether or not to add/update privileges and their respective lifetimes. By choosing to update the privileges, the requester can be granted access to the resource and perform the same operation without dynamic authorization having to be repeated.

In step 8 of FIG. 35, a requesting oneM2M entity 3402 (e.g. AE or CSE) issues a request (i.e. Create/Retrieve/Update/Delete/Subscribe/Discover) to the same resource on the same oneM2M entity.

In step 9 of FIG. 35, the receiving oneM2M entity 3502 (e.g. CSE) detects access to a targeted resource. The receiving entity checks the corresponding <accessControlPolicy> resource(s) applicable to the targeted resource and detects that the requester now has sufficient access privileges as a result of the SLDA function 902 having added these privileges as part of Step 7.

In step 10 of FIG. 35, the receiving entity 3502 performs the request on the targeted resource and returns a successful response to the requester.

It is understood that the entities performing the steps illustrated in FIG. 35 are logical entities that may be implemented in the form of software (i.e., computer-executable instructions) stored in a memory of, and executing on a processor of, a network node or computer system such as those illustrated in FIG. 44C or FIG. 44D. That is, the method(s) illustrated in FIG. 35 may be implemented in the form of software (i.e., computer-executable instructions) stored in a memory of a network node, such as the node or computer system illustrated in FIG. 44C or FIG. 44D, which computer executable instructions, when executed by a processor of the node, perform the steps illustrated in FIG. 35. It is also understood that any transmitting and receiving steps illustrated in FIG. 35 may be performed by communication circuitry of the node under control of the processor of the node and the computer-executable instructions (e.g., software) that it executes.

Explicit Service Layer Dynamic Authorization Request Handling

This section defines procedure to enable a requester to explicitly issue a dynamic authorization request to try and obtain desired privileges to access specified resource(s).

Figure 36:
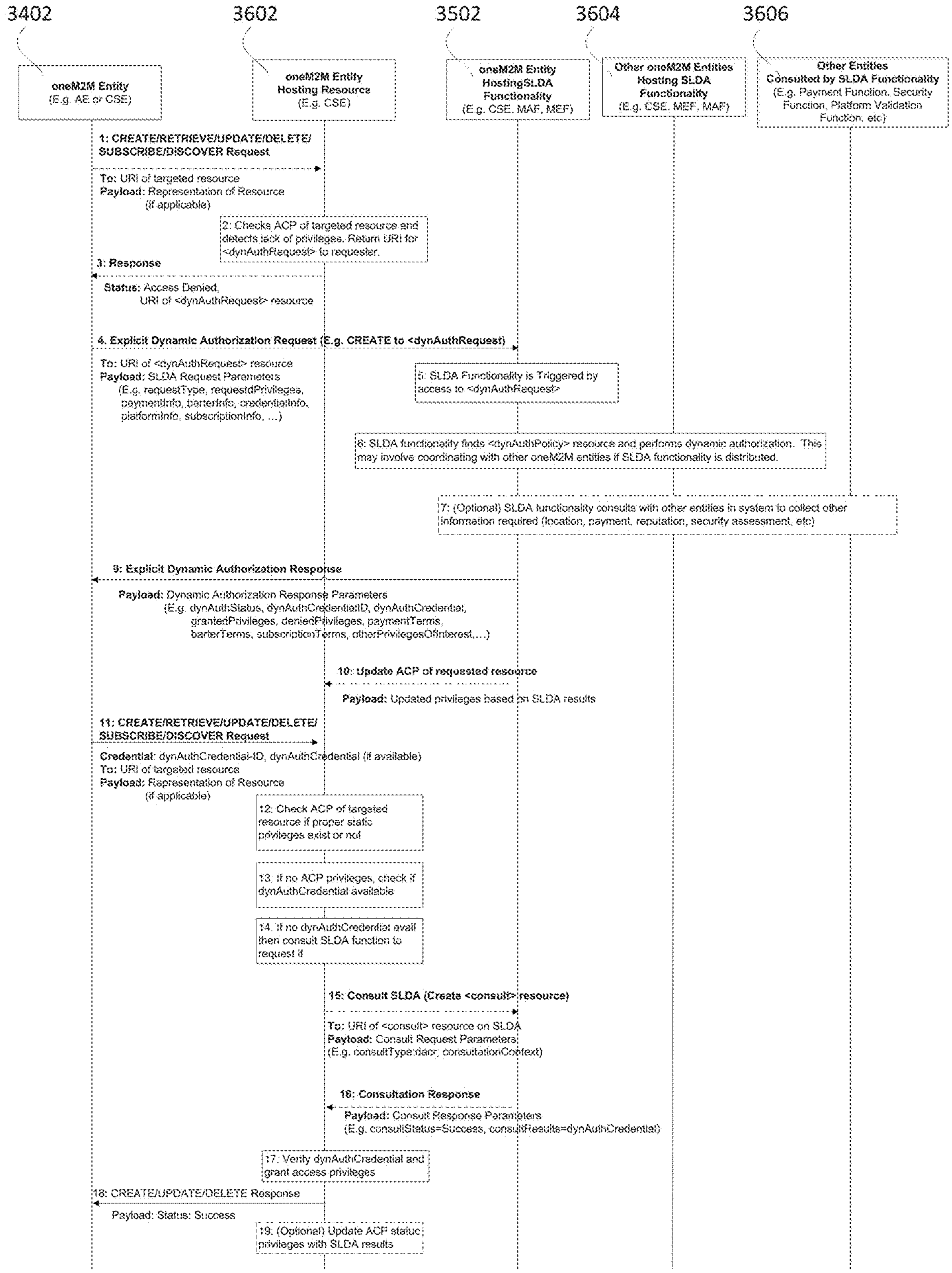
FIG. 36 is a diagram of Explicit Service Layer Dynamic Authorization Request Handling

In optional step 1 of FIG. 36, a requesting oneM2M entity 3402 (e.g. AE or CSE) can issues a request (i.e. Create/Retrieve/Update/Delete/Subscribe/Discover) to another oneM2M entity 3602.

In optional step 2 of FIG. 36, the receiving oneM2M entity 3602 (e.g. CSE) detects access to targeted resource. The receiving entity 3602 checks the corresponding <accessControlPolicy> resource(s) applicable to the targeted resource (if any) to determine whether the requester 3402 has sufficient privileges configured to allow it to perform the desired type of access. In this example, the requester lacks sufficient access privileges.

In optional step 3 of FIG. 36, rather than immediately returning an 'access denied' error to the requester, the receiving entity 3602 returns a link to an entity 3502 in the system that supports service layer dynamic authorization. This link can be a link to the <dynAuthRequest> resource hosted by an entity that supports a SLDA function 902.

In step 4 of FIG. 36, a requesting oneM2M entity 3402 formulates and issues an explicit service layer dynamic authorization request and targets the request to a SLDA function 902 in the network. This request can be targeted to a <dynAuthRequest> resource hosted by an entity that supports a SLDA function 902. The request can include information such as requestType, requestdPrivileges, paymentInfo, barterInfo, credentialInfo, platformInfo, subscriptionInfo which are all defined above.

In step 5 of FIG. 36, the receiving oneM2M entity 3602, upon receiving this request, inspects the target UTI and detects that it is targeted a <dynAuthRequest> resource. Based off of this, the entity knows to trigger the SLDA function 902 to process the request.

In step 6 of FIG. 36, the SLDA function 902 checks whether <dynAuthPolicy> resource(s) exist for the privileges being requested. This is done by locating the resource (s) that the requester is requesting access privileges for. Once found, the SLDA function 902 then checks whether these resources have corresponding <dynAuthPolicy> resources affiliated with them or not. If not, then an error response can be returned to the requester. If found, the SLDA function 902 can proceed with processing. The SLDA function 902 next examines the dynAuthRules attributes of each <dynAuthPolicy> resource affiliated with the targeted resource. The dynAuthRules are first compared against the information the requester included in its request (e.g. requestType, requestdPrivileges, paymentInfo, barterInfo, credentialInfo, platformInfo, subscriptionInfo) to see whether the request abides by the rules. If not an error is returned. Otherwise, the SLDA 902 continues dynamic authorization processing per Step #7 below In optional step 7 of FIG. 36, the SLDA function 902 checks whether it needs to perform any consultation with other functions in the system. The SLDA 902 determines this by examining the dynAuthRules which specify whether the SLDA function 902 needs to consult with a payment, barter, security, subscription verification, reputation verification or authorization function. Note, this may involve coordinating with other entities, such as entities 3604 and 3606, in the oneM2M system which host these functions. The consultation can be performed using the procedures with respect to FIGS. 37-42.

In step 8 of FIG. 36, the SLDA function 902 returns a response to the explicit dynamic authorization requester. In this response the SLDA function 902 can return information such as dynAuthStatus, dynAuthCredentialID, dynAuthCredential, grantedPrivileges, deniedPrivileges, paymentTerms, barterTerms and subscriptionTerms which are defined in Table 2.

In optional step 9 of FIG. 36, using the dynamic authorization results, the SLDA function 902 can optionally choose to update the privileges attribute within the <accessControlPolicy> resource(s) associated with the targeted resource to add access control privileges for the requester. This decision can be controlled via a dynAuthRule defined within a <dynAuthPolicy> resource. For example, the dynAuthRule can support a rule (e.g. privilege lifetime rule) to control whether or not the SLDA function 902 adds or updates the static privileges of the <accessControlPolicy> resources and if so what the expiration time of this privilege is. As a result, the SLDA function 902 can use this rule to control whether it updates or adds a privilege and if so the expiration time (e.g. this can be done using the accessControlExpirationTime component of the privilege as proposed above). Based on these rules, the SLDA function 902 can determine whether or not to add/update privileges and their respective lifetimes. By choosing to update the privileges, the requester can be granted access to the resource and perform the same operation without dynamic authorization having to be repeated.

In step 10 of FIG. 36, a requesting oneM2M entity 3402 (e.g. AE or CSE) can issues a request (i.e. Create/Retrieve/Update/Delete/Subscribe/Discover) to another oneM2M entity. Within the request the requester can include dynamic authorization credentials and/or identifiers which it obtained from Step 8.

In step 11 of FIG. 36, the receiving oneM2M entity 3602 (e.g. CSE) detects access to targeted resource. The receiving entity checks the corresponding <accessControlPolicy> resource(s) applicable to the targeted resource (if any) to determine whether the requester has sufficient privileges configured to allow it to perform the desired type of access. In this example, the requester lacks sufficient access privileges.

In step 12 of FIG. 36, rather than immediately returning an 'access denied' error to the requester, the receiving entity 3602 checks whether the request contains a dynamic authorization credential (e.g. token) or an ID for one. If not, an 'access denied' error is returned.

In step 13 of FIG. 36, if only dynamic authorization credential ID is included and not an actual credential, then the receiving entity triggers SLDA function 902 lookup of the corresponding dynamic authorization credential associated with the specified ID.

In optional step 14 of FIG. 36, the receiving entity 3602 forms a consultation request to access the dynamic authorization credential. The request is sent to the <consult> resource of the SLDA function 902 or a dedicated authorization function in the system. This is done over a secure network connection. Included in the request are parameters such as the consultationInfo defined in Table 4.

In optional step 15 of FIG. 36, upon receiving the request, the SLDA function 902 detects that it is a consult request since it targets the <consult> resource. The SLDA function 902 parses the request to detect what type of consultation request it is (by checking a consultation type parameter) and detects that it is a dynamic authorization credential request consultation. The SLDA 902 then uses the dynamic authorization credential ID included in the request to lookup the corresponding credential. The credential is then returned to the receiving entity.

In step 16 of FIG. 36, the receiving entity 3602 (or SLDA function 902) verifies the dynamic authorization credential that is either received in the request or obtained via consulting with the consultation step above. Once verified, the SLDA function 902 can then choose to grant the requested access privileges to the requester. The receiving entity processes the request and returns a successful response back to the requester.

In step 17 of FIG. 36, the receiving entity 3602 (or SLDA function 902) verifies the dynamic authorization credential that is either received in the request or obtained via consulting with the consultation step above. Once verified, the SLDA function 902 can then choose to grant the requested access privileges to the requester.

In optional step 18 of FIG. 36, using the dynamic authorization results, the SLDA function 902 can optionally choose to update the privileges attribute within the <accessControlPolicy> resource(s) associated with the targeted resource to add access control privileges for the requester. This decision can be controlled via a dynAuthRule defined within a <dynAuthPolicy > resource. For example, the dynAuthRule can support a rule (e.g. privilege lifetime rule) to control whether or not the SLDA function 902 adds or updates the static privileges of the <accessControlPolicy> resources and if so what the expiration time of this privilege is. As a result, the SLDA function 902 can use this rule to control whether it updates or adds a privilege and if so the expiration time (e.g. this can be done using the accessControlExpirationTime component of the privilege as proposed above). Based on these rules, the SLDA function 902 can determine whether or not to add/update privileges and their respective lifetimes. By choosing to update the privileges, the requester can be granted access to the resource and perform the same operation without dynamic authorization having to be repeated.

It is understood that the entities performing the steps illustrated in FIG. 36 are logical entities that may be implemented in the form of software (i.e., computer-executable instructions) stored in a memory of, and executing on a processor of, a network node or computer system such as those illustrated in FIG. 44C or FIG. 44D. That is, the method(s) illustrated in FIG. 36 may be implemented in the form of software (i.e., computer-executable instructions) stored in a memory of a network node, such as the node or computer system illustrated in FIG. 44C or FIG. 44D, which computer executable instructions, when executed by a processor of the node, perform the steps illustrated in FIG. 36. It is also understood that any transmitting and receiving steps illustrated in FIG. 36 may be performed by communication circuitry of the node under control of the processor of the node and the computer-executable instructions (e.g., software) that it executes.

Consultation-based Service Layer Dynamic Authorization

Figure 37:
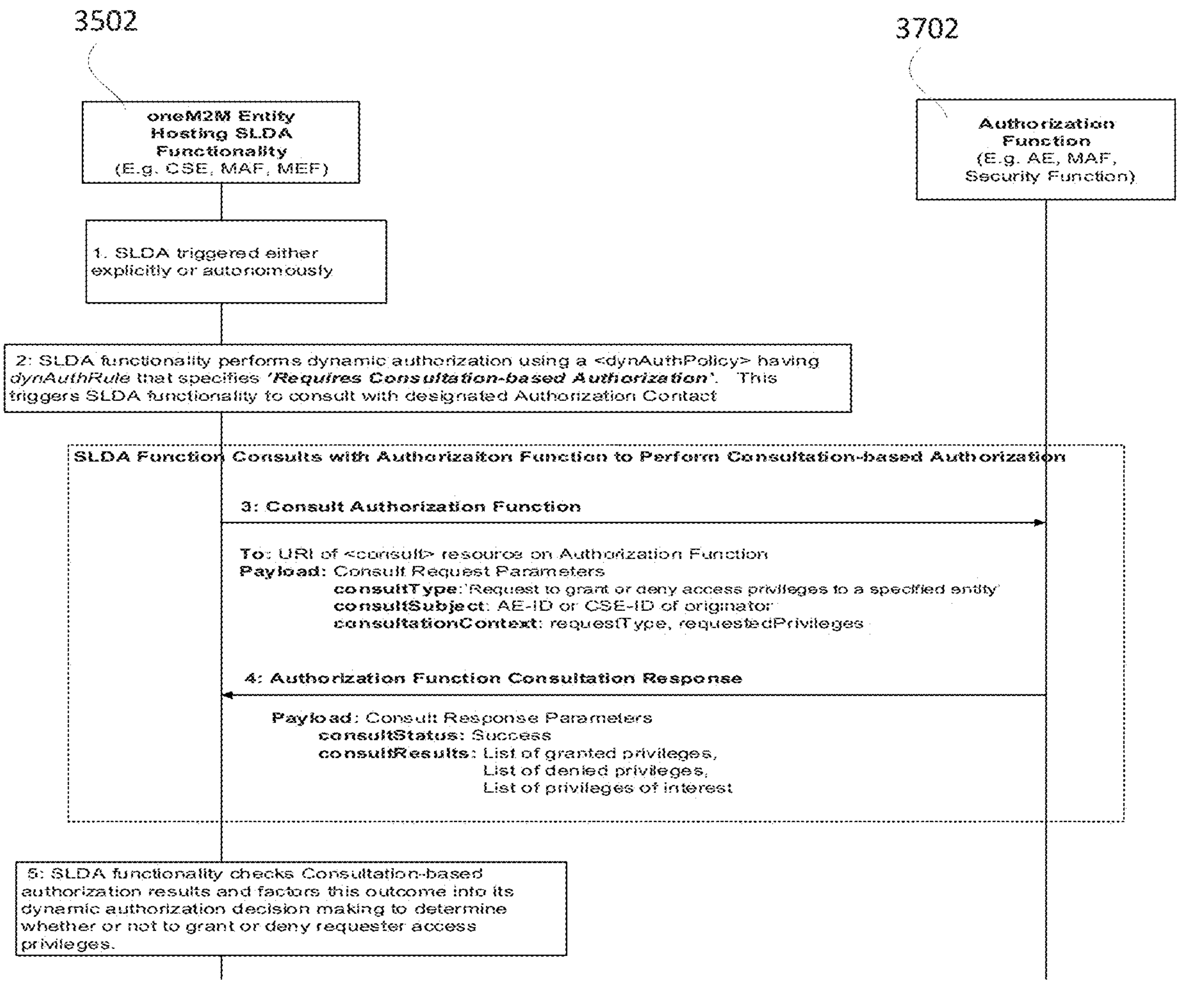
FIG. 37 is a diagram of Consultation-based Service Layer Dynamic Authorization

FIG. 37 shows the procedure for consultation-based dynamic authorization.

In step 1 of FIG. 37, the SLDA function 902 is triggered either by an explicit request (i.e. access to <dynAuthRequest resource) or autonomously via the SLDA function 902 itself (e.g. via detection of a request that failed checks on existing <accessControlPolicy> static privileges).

In step 2 of FIG. 37, the SLDA 902 locates applicable <dynAuthPolicy> resources (if any) and evaluates the dynAuthPolicy attribute to determine what rules have been configured. In this example, the dynAuthPolicy attribute has been configured with a rule specifying that 'Consultation-based authorization' is required as part of the dynamic authorization processing. This rule triggers the SLDA function 902 to consult with an Authorization Function 3702 in the system to have it weigh in on whether to grant or deny a requester the access privileges it is requesting or requires.

In step 3 of FIG. 37, the SLDA function 902 forms a consultation request message. The message is targeted to the <consult> resource hosted by the Authorization Function 3702. The consultSubject is configured with the AE-ID or CSE-ID of the requester for which dynamic authorization is being performed. The payload of the request configured with the requested/required privileges that the requester is either explicitly asking for or the ones which the SLDA function 902 has deemed necessary for the requester to access the resource or service it is targeting.

In step 4 of FIG. 37, the Authorization Function 3702 assesses whether or not to grant or deny the requester the access privileges it is requesting. The details of how this decision is made is out of scope from this disclosure and are considered specific to the type of checks the Authorization Function 3702 supports which can vary depending on deployment use case. The results of this operation are then returned to the SLDA 902 in the form of a consultation response. The response contains lists of granted and denied privileges. The response can also contain privileges of some other resources or services that may be of interest to the requester.

In step 5 of FIG. 37, the SLDA functionality checks Consultation-based authorization results and factors this outcome into its dynamic authorization decision making to determine whether or not to grant or deny requester access privileges.

It is understood that the entities performing the steps illustrated in FIG. 37 are logical entities that may be implemented in the form of software (i.e., computer-executable instructions) stored in a memory of, and executing on a processor of, a network node or computer system such as those illustrated in FIG. 44C or FIG. 44D. That is, the method(s) illustrated in FIG. 37 may be implemented in the form of software (i.e., computer-executable instructions) stored in a memory of a network node, such as the node or computer system illustrated in FIG. 44C or FIG. 44D, which computer executable instructions, when executed by a processor of the node, perform the steps illustrated in FIG. 37. It is also understood that any transmitting and receiving steps illustrated in FIG. 37 may be performed by communication circuitry of the node under control of the processor of the node and the computer-executable instructions (e.g., software) that it executes.

Payment-Based Service Layer Dynamic Authorization

Figure 38:
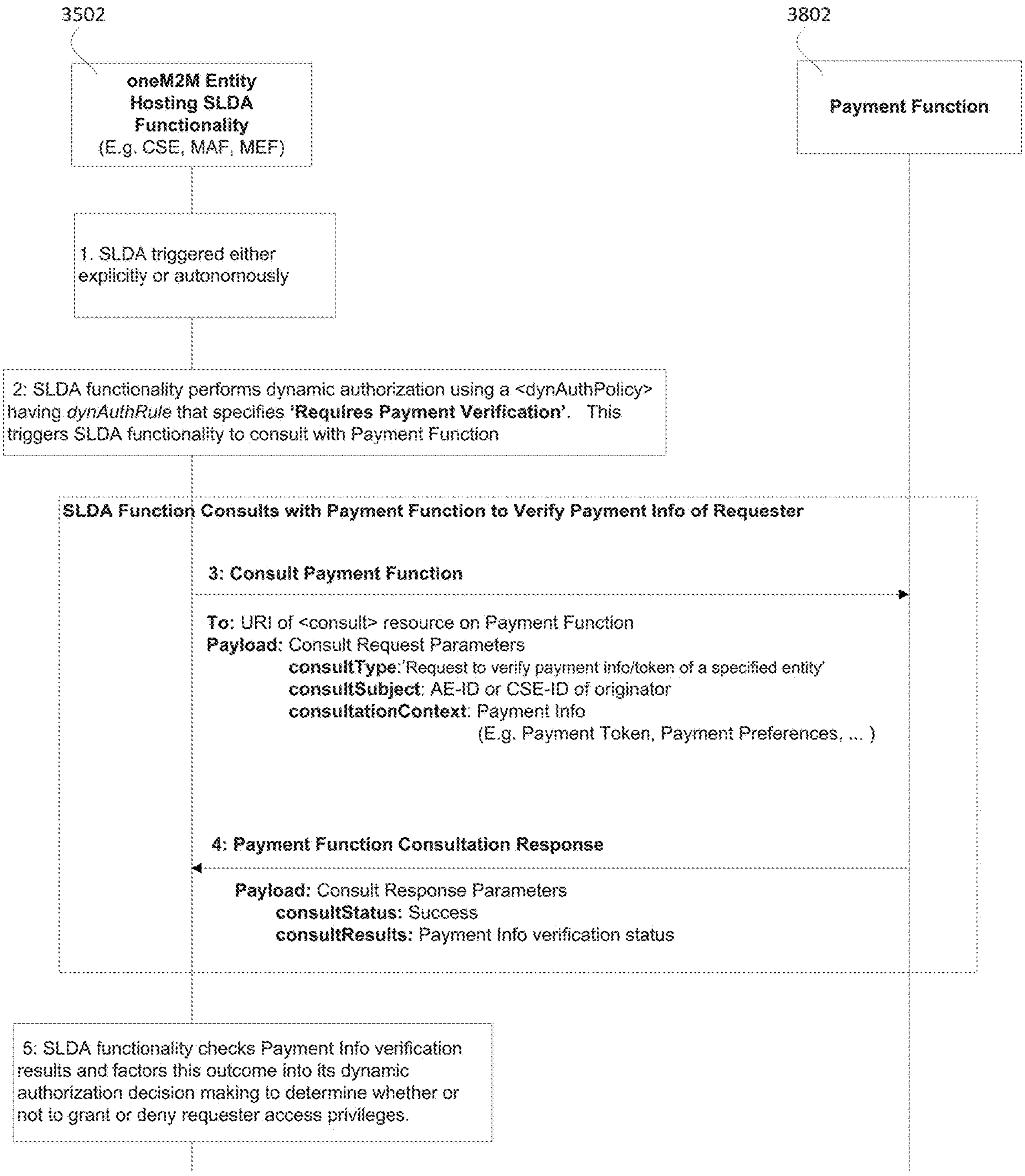
FIG. 38 is a diagram of Payment-based Service Layer Dynamic Authorization

FIG. 38 shows the procedure for Payment-based dynamic authorization.

In step 1 of FIG. 38, the SLDA function 902 is triggered either by an explicit request (i.e. access to <dynAuthRequest resource) or autonomously via the SLDA function 902 itself (e.g. via detection of a request that failed checks on existing <accessControlPolicy> static privileges).

In step 2 of FIG. 38, the SLDA 902 locates applicable <dynAuthPolicy> resources (if any) and evaluates the dynAuthPolicy attribute to determine what rules have been configured. In this example, the dynAuthPolicy attribute has been configured with a rule specifying that 'Requires Payment Verification' is required as part of the dynamic authorization processing. This rule triggers the SLDA function 902 to consult with a Payment Function 3802 in the system to have it verify the payment information of the requester.

In step 3 of FIG. 38, the SLDA function 902 forms a consultation request message. The message is targeted to the <consult> resource hosted by the Payment Function. The consultSubject is configured with the AE-ID or CSE-ID of the requester for which payment information verification is being performed. The payload of the request is configured with the payment information of the requester as well as the payment policy which can include information such as a requester's payment token and preferences and the policy's payment terms.

In step 4 of FIG. 38, the Payment Function 3802assesses the payment information to verify it is valid and also assess it against the payment rules in the policy. The results of this operation are then returned to the SLDA 902 in the form of a consultation response. The response contains the payment info verification status.

In step 5 of FIG. 38, the SLDA functionality checks payment information verification results and factors this outcome into its dynamic authorization decision making to determine whether or not to grant or deny requester access privileges.

It is understood that the entities performing the steps illustrated in FIG. 38 are logical entities that may be implemented in the form of software (i.e., computer-executable instructions) stored in a memory of, and executing on a processor of, a network node or computer system such as those illustrated in FIG. 44C or FIG. 44D. That is, the method(s) illustrated in FIG. 38 may be implemented in the form of software (i.e., computer-executable instructions) stored in a memory of a network node, such as the node or computer system illustrated in FIG. 44C or FIG. 44D, which computer executable instructions, when executed by a processor of the node, perform the steps illustrated in FIG. 38. It is also understood that any transmitting and receiving steps illustrated in FIG. 38 may be performed by communication circuitry of the node under control of the processor of the node and the computer-executable instructions (e.g., software) that it executes.

Barter-Based Service Layer Dynamic Authorization

Figure 39:
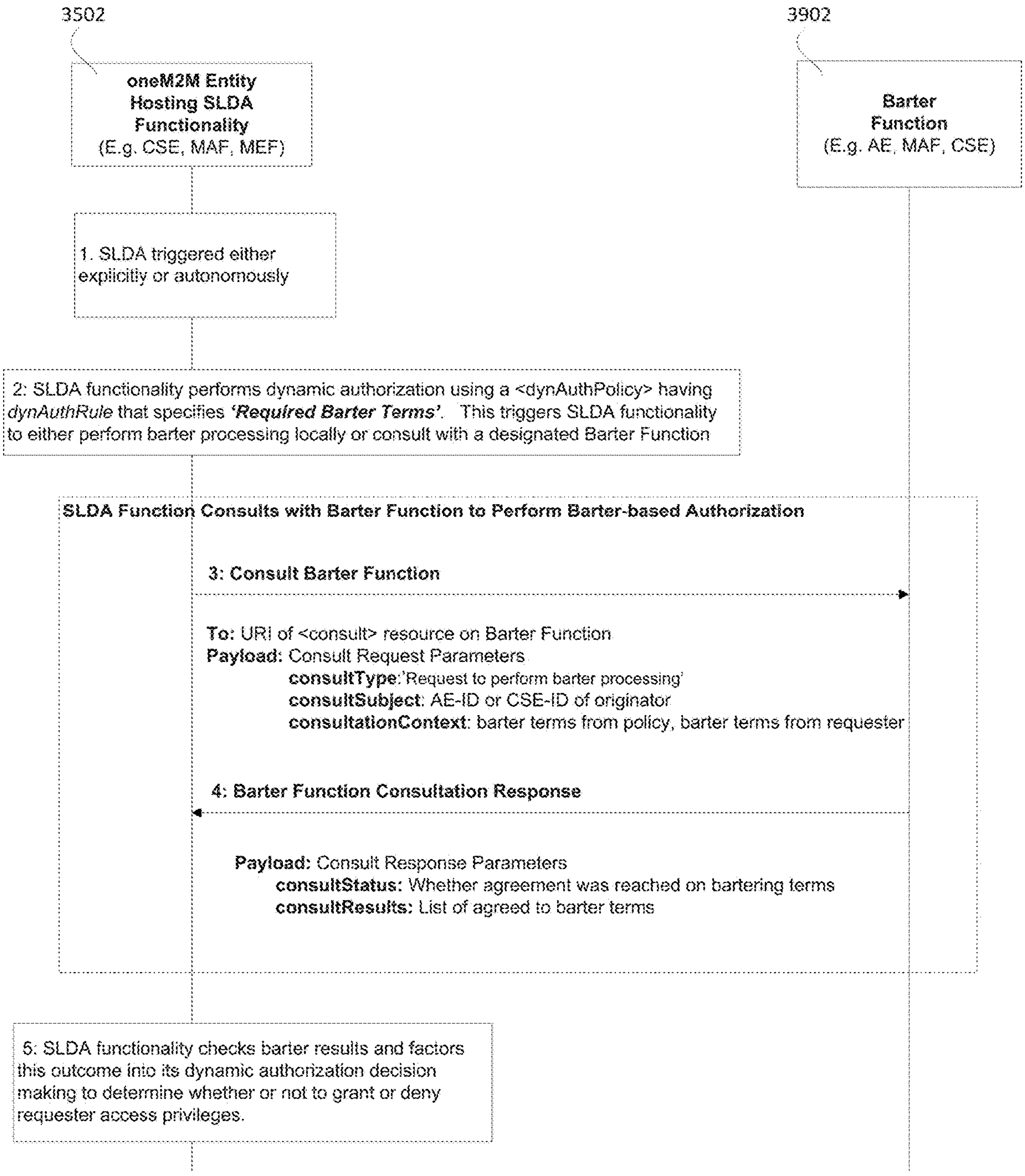
FIG. 39 is a diagram of Barter-based Service Layer Dynamic Authorization

FIG. 39 shows the procedure for Barter-based dynamic authorization.

In step 1 of FIG. 39, the SLDA function 902 is triggered either by an explicit request (i.e. access to <dynAuthRequest resource) or autonomously via the SLDA function 902 itself (e.g. via detection of a request that failed checks on existing <accessControlPolicy> static privileges).

In step 2 of FIG. 39, the SLDA 902 locates applicable <dynAuthPolicy> resources (if any) and evaluates the dynAuthPolicy attribute to determine what rules have been configured. In this example, the dynAuthPolicy attribute has been configured with a rule specifying 'Required Barter Terms' which is a list of barter requirements that the requester must meet to be granted access privileges. This rule triggers the SLDA function 902 to either perform local barter processing or consult with a Barter Function 3902 in the system to have it perform barter processing on behalf of the SLDA 902.

In step 3 of FIG. 39, the SLDA function 902 forms a consultation request message. The message is targeted to the <consult> resource hosted by the Barter Function 3902. The consultSubject is configured with the AE-ID or CSE-ID of the requester for which barter processing is being performed. The payload of the request is configured with the barter information of the requester as well as the barter policy which can include information the type of bartering terms the requester must be willing to agree to be granted access privileges. For example, reciprocity of access to the requester's resources and services in exchange for being granted access privileges by the targeted resource owner.

In step 4 of FIG. 39, the Barter Function 3902 assesses the barter terms defined by the policy as well as the requester to determine whether the requester is willing to agree to these terms. The Barter Function 3902 then returns the result back to the SLDA 902 via a consult response containing a barter status and a list of agreed to terms.

In step 5 of FIG. 39, the SLDA functionality checks barter results and factors this outcome into its dynamic authorization decision making to determine whether or not to grant or deny requester access privileges.

It is understood that the entities performing the steps illustrated in FIG. 39 are logical entities that may be implemented in the form of software (i.e., computer-executable instructions) stored in a memory of, and executing on a processor of, a network node or computer system such as those illustrated in FIG. 44C or FIG. 44D. That is, the method(s) illustrated in FIG. 39 may be implemented in the form of software (i.e., computer-executable instructions) stored in a memory of a network node, such as the node or computer system illustrated in FIG. 44C or FIG. 44D, which computer executable instructions, when executed by a processor of the node, perform the steps illustrated in FIG. 39. It is also understood that any transmitting and receiving steps illustrated in FIG. 39 may be performed by communication circuitry of the node under control of the processor of the node and the computer-executable instructions (e.g., software) that it executes.

Security Assessment-Based Service Layer Dynamic Authorization

Figure 40:
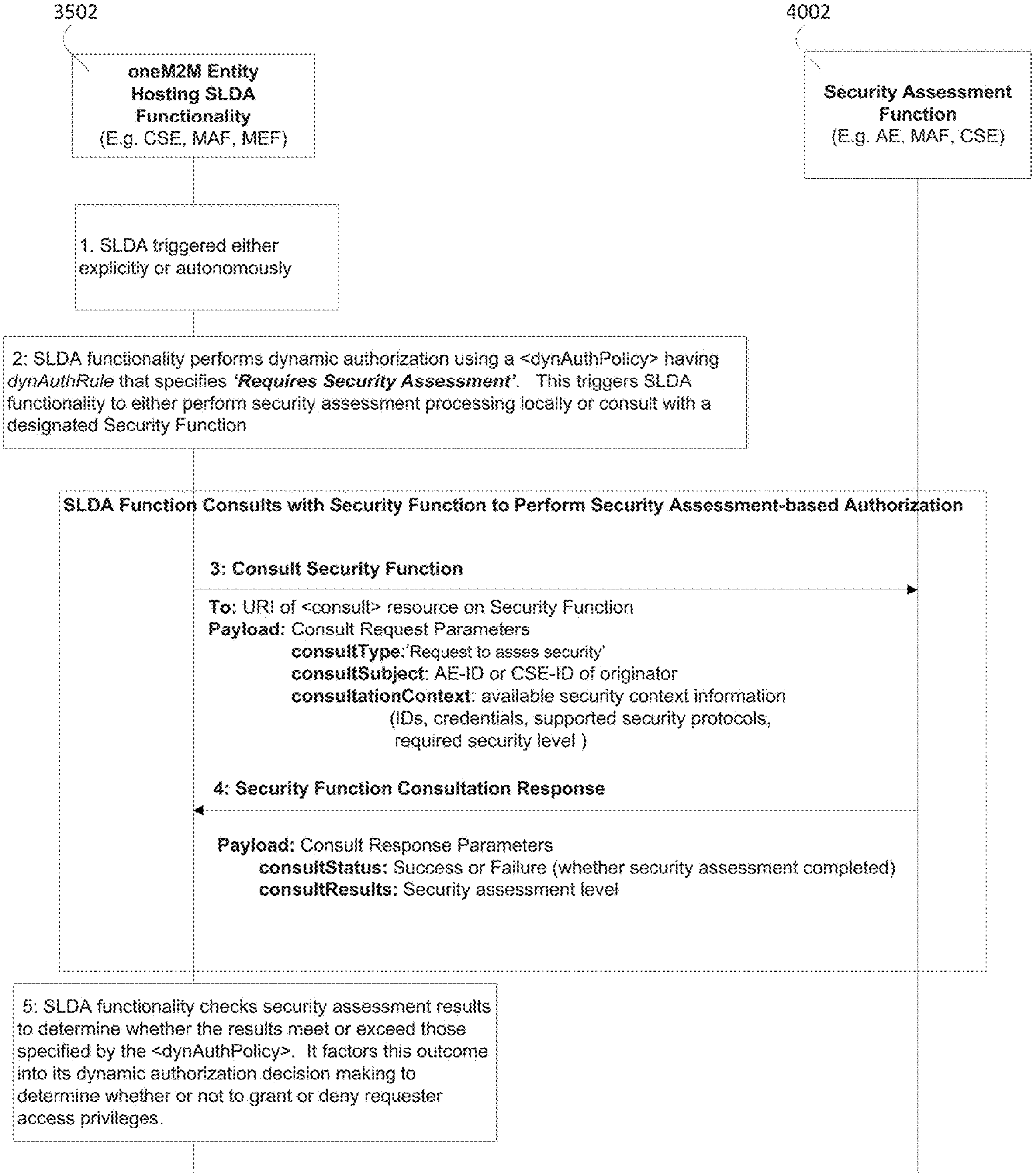
FIG. 40 is a diagram of Security Assessment-based Service Layer Dynamic Authorization

FIG. 40 shows the procedure for Security Assessment-based dynamic authorization.

In step 1 of FIG. 40, the SLDA function 902 is triggered either by an explicit request (i.e. access to <dynAuthRequest resource) or autonomously via the SLDA function 902 itself (e.g. via detection of a request that failed checks on existing <accessControlPolicy> static privileges).

In step 2 of FIG. 40, the SLDA 902 locates applicable <dynAuthPolicy> resources (if any) and evaluates the dynAuthPolicy attribute to determine what rules have been configured. In this example, the dynAuthPolicy attribute has been configured with a rule specifying 'Requires Security Assessment'. This rule triggers the SLDA function 902 to either perform local security assessment processing or consult with a Security Function 4002 in the system to have it perform security assessment processing on behalf of the SLDA 902.

In step 3 of FIG. 40, the SLDA function 902 forms a consultation request message. The message is targeted to the <consult> resource hosted by the Security Function 4002. The consultSubject is configured with the AE-ID or CSE-ID of the requester for which security assessment processing is being performed. The payload of the request is configured with the security information of the requester (IDs, credentials, type of interface security supported, platform security supported, content security supported, etc. The request can also be configured with any required security assessment level defined by the policy.

In step 4 of FIG. 40, the Security Function 4002 assesses the requester's security information against the security requirements defined in the policy to determine whether the requester meets the security assessment requirements. The Security Function 4002 then returns the result back to the SLDA 902 via a consult response containing a security assessment status.

In step 5 of FIG. 40, the SLDA functionality checks the security assessment results and factors this outcome into its dynamic authorization decision making to determine whether or not to grant or deny requester access privileges.

It is understood that the entities performing the steps illustrated in FIG. 40 are logical entities that may be implemented in the form of software (i.e., computer-executable instructions) stored in a memory of, and executing on a processor of, a network node or computer system such as those illustrated in FIG. 44C or FIG. 44D. That is, the method(s) illustrated in FIG. 40 may be implemented in the form of software (i.e., computer-executable instructions) stored in a memory of a network node, such as the node or computer system illustrated in FIG. 44C or FIG. 44D, which computer executable instructions, when executed by a processor of the node, perform the steps illustrated in FIG. 40. It is also understood that any transmitting and receiving steps illustrated in FIG. 40 may be performed by communication circuitry of the node under control of the processor of the node and the computer-executable instructions (e.g., software) that it executes.

Service Layer Subscription Verification-Based Dynamic Authorization

Figure 41:
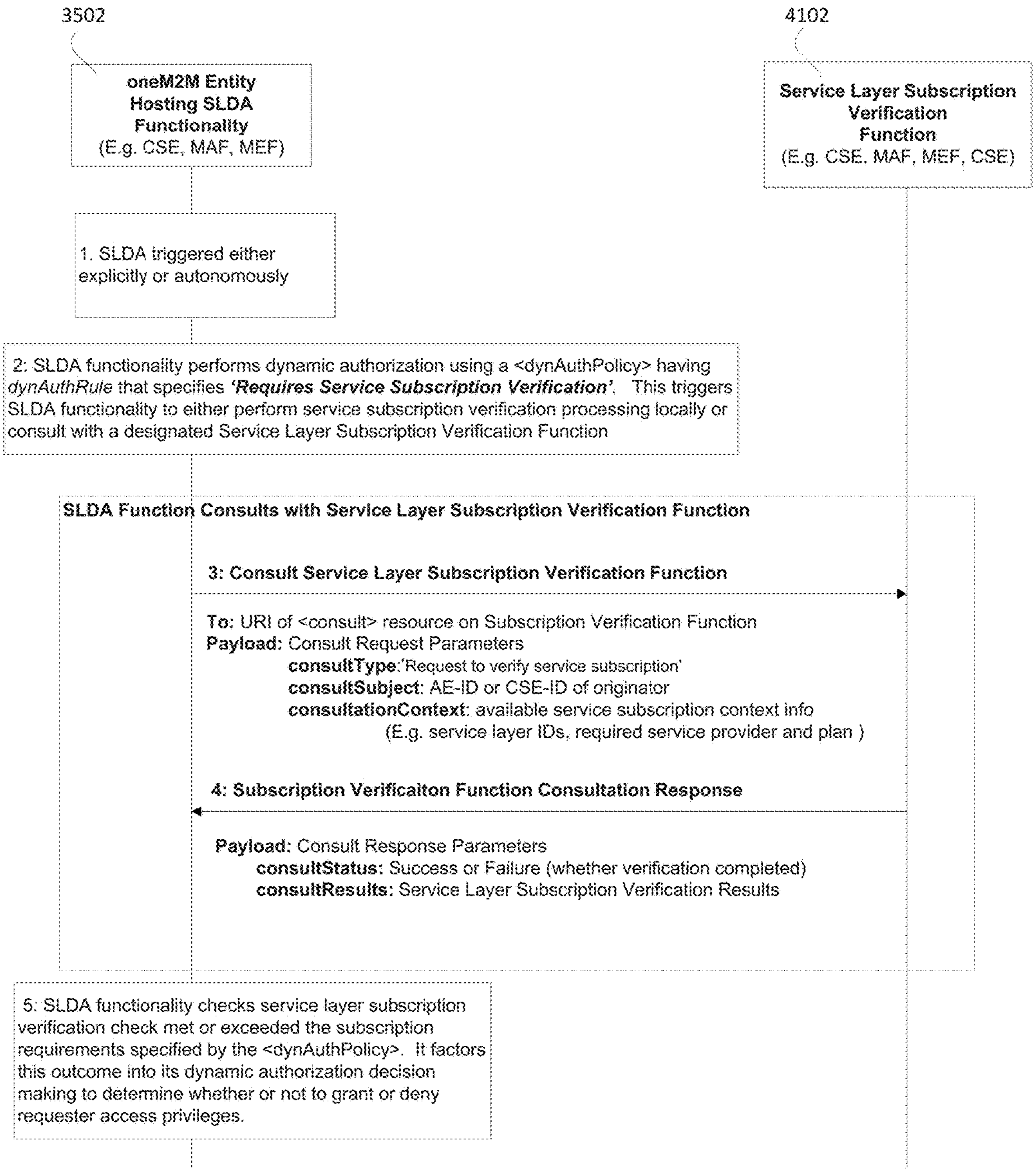
FIG. 41 is a diagram of Service Layer Subscription Verification-based Dynamic Authorization

FIG. 41 shows the procedure for Service Layer Subscription-based dynamic authorization.

In step 1 of FIG. 41, the SLDA function 902 is triggered either by an explicit request (i.e. access to <dynAuthRequest resource) or autonomously via the SLDA function 902 itself (e.g. via detection of a request that failed checks on existing <accessControlPolicy> static privileges).

In step 2 of FIG. 41, the SLDA 902 locates applicable <dynAuthPolicy> resources (if any) and evaluates the dynAuthPolicy attribute to determine what rules have been configured. In this example, the dynAuthPolicy attribute has been configured with a rule specifying 'Requires Service Subscription Verification'. This rule triggers the SLDA function 902 to either perform local service subscription verification processing or consult with a Subscription Verification Function 4102 in the system to have it perform this verification on behalf of the SLDA 902.

In step 3 of FIG. 41, the SLDA function 902 forms a consultation request message. The message is targeted to the <consult> resource hosted by the Subscription Verification Function 4102. The consultSubject is configured with the AE-ID or CSE-ID of the requester for which the verification is being performed. The payload of the request is configured with any service subscription information of the requester that is available (e.g. service layer IDs) as well as the service subscription policy rule defining requirements such as the required service provider and/or service plan that a requester must have to be granted access privileges.

In step 4 of FIG. 41, the Subscription Verification Function 4102 assesses the subscription requirements defined by the policy against the requester's service subscription to determine whether the requester meets the requirements defined by the policy. The Subscription Verification Function 4102 then returns the result back to the SLDA 902 via a consult response containing a verification status and a list of requirements that have been met as well as any that have not.

In step 5 of FIG. 41, the SLDA functionality checks the subscription verification results and factors this outcome into its dynamic authorization decision making to determine whether or not to grant or deny requester access privileges.

It is understood that the entities performing the steps illustrated in FIG. 41 are logical entities that may be implemented in the form of software (i.e., computer-executable instructions) stored in a memory of, and executing on a processor of, a network node or computer system such as those illustrated in FIG. 44C or FIG. 44D. That is, the method(s) illustrated in FIG. 41 may be implemented in the form of software (i.e., computer-executable instructions) stored in a memory of a network node, such as the node or computer system illustrated in FIG. 44C or FIG. 44D, which computer executable instructions, when executed by a processor of the node, perform the steps illustrated in FIG. 41. It is also understood that any transmitting and receiving steps illustrated in FIG. 41 may be performed by communication circuitry of the node under control of the processor of the node and the computer-executable instructions (e.g., software) that it executes.

Reputation-Based Service Layer Dynamic Authorization

Figure 42:
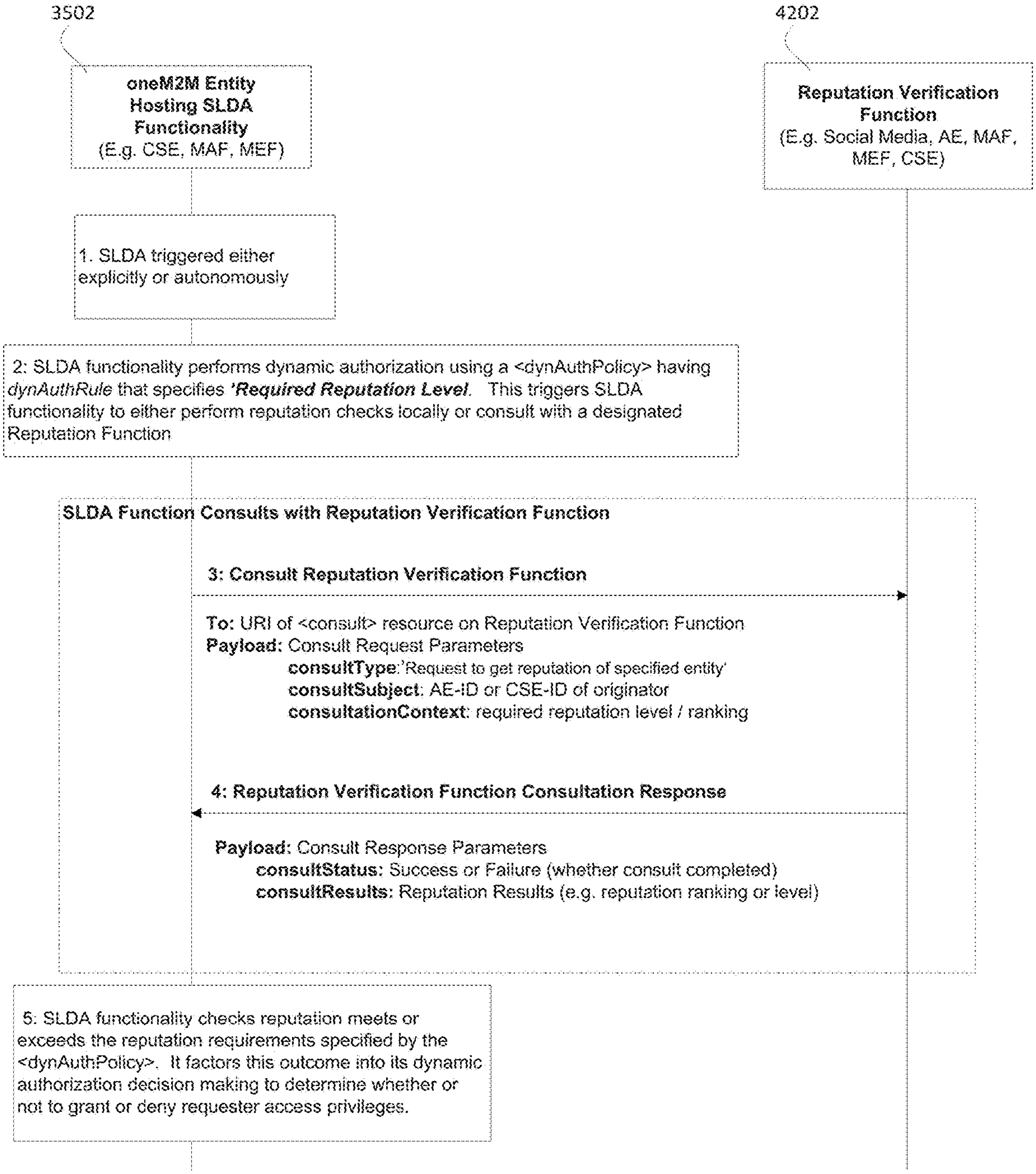
FIG. 42 is a diagram of Reputation-based Service Layer Dynamic Authorization

FIG. 42 shows the procedure for Reputation-based dynamic authorization.

In step 1 of FIG. 42, the SLDA function 902 is triggered either by an explicit request (i.e. access to <dynAuthRequest resource) or autonomously via the SLDA function 902 itself (e.g. via detection of a request that failed checks on existing <accessControlPolicy> static privileges).

In step 2 of FIG. 42, the SLDA 902 locates applicable <dynAuthPolicy> resources (if any) and evaluates the dynAuthPolicy attribute to determine what rules have been configured. In this example, the dynAuthPolicy attribute has been configured with a rule specifying 'Required Reputation Level' which defines a ranking or level that the requester's reputation must meet for it to be dynamically granted access privileges. This rule triggers the SLDA function 902 to either perform local reputation verification processing or consult with a Reputation Verification Function 4202 in the system to have it perform this verification on behalf of the SLDA 902.

In step 3 of FIG. 42, the SLDA function 902 forms a consultation request message. The message is targeted to the <consult> resource hosted by the Reputation Verification Function. The consultSubject is configured with the AE-ID or CSE-ID of the requester for which the verification is being performed. The payload of the request is configured with any reputation related information of the requester that is available (e.g. service layer IDs) as well as the reputation policy rule defining the minimum reputation level or ranking required that a requester must have to be granted access privileges.

In step 4 of FIG. 42, the Reputation Verification Function 4202 assesses the reputation requirements defined by the policy against the requester's reputation to determine whether the requester meets the requirements defined by the policy. This can be done using methods such as interfacing to social media outlets which often keep track of such information. The Reputation Verification Function 4202 then returns the result back to the SLDA 902 via a consult response containing a verification status and a reputation level or ranking.

In step 5 of FIG. 42, the SLDA functionality checks the reputation results and factors this outcome into its dynamic authorization decision making to determine whether or not to grant or deny requester access privileges.

It is understood that the entities performing the steps illustrated in FIG. 42 are logical entities that may be implemented in the form of software (i.e., computer-executable instructions) stored in a memory of, and executing on a processor of, a network node or computer system such as those illustrated in FIG. 44C or FIG. 44D. That is, the method(s) illustrated in FIG. 42 may be implemented in the form of software (i.e., computer-executable instructions) stored in a memory of a network node, such as the node or computer system illustrated in FIG. 44C or FIG. 44D, which computer executable instructions, when executed by a processor of the node, perform the steps illustrated in FIG. 42. It is also understood that any transmitting and receiving steps illustrated in FIG. 42 may be performed by communication circuitry of the node under control of the processor of the node and the computer-executable instructions (e.g., software) that it executes.

Figure 43:
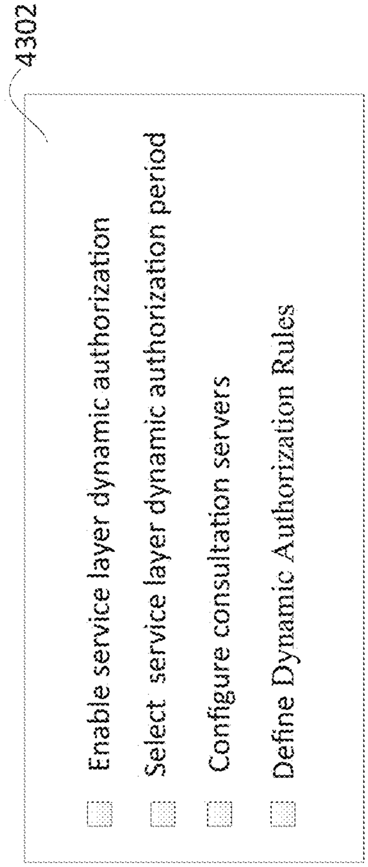
FIG. 43 is a diagram of a Graphical User Interface of one embodiment.

Interfaces, such as Graphical User Interfaces (GUIs), can be used to assist user to control and/or configure functionalities related to the service layer dynamic authorization. FIG. 43 is a diagram that illustrates an interface 4302 that allows a user to Enable service layer dynamic authorization; Select a service layer dynamic authorization period that the dynamic authorization is stored as a static authorization; and to Configure consultation servers or applications.

Interface 4302 can be used to define the specific Dynamic Authorization Rules like the one in Table 1 of the disclosure (see dynAuthRules). Interface 4302 can allow a user to either check from a list of available rules or manually enter in rules.

It is to be understood that interface 4302 can be produced using displays such as those shown in FIGS. 44C-D described below.

Example M2M/IoT/WoT Communication System

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

The term service layer refers to a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a-service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

FIG. 44A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as service layer 102, Apps 204 and 202, SLDA 902, SLDA-PA 904, SLDA-PI 906, SLDA-PD 908, SLDA-PE 910, SLSA 1402, SLSA-PA 1404, SLSA-PD 1406, SLSA-PI 1412, SLSA-PE 1410, SL-PCF 1408, entities 1502 1602 3402, 3404, 3502, 3504, 3506, 3602, 3604, 3606 Policy Server 1504, RHF 1604, client 1702, DAEF 1802 and DAEF-Payment, DGF 2102 MAF 2302, MEF 2304, Authorization Function 3702, Payment Function 3802, Barter Function 3902, Security Function 4002, Service Layer Subscription Verification Function 4102, Reputation Verification Function 4202 as well as logical entities to store and operate on the disclosed resources and logical entities to produce interfaces, such as interface 4302.

As shown in FIG. 44A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 44A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 44B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as service layer 102, Apps 204 and 202, SLDA 902, SLDA-PA 904, SLDA-PI 906, SLDA-PD 908, SLDA-PE 910, SLSA 1402, SLSA-PA 1404, SLSA-PD 1406, SLSA-PI 1412, SLSA-PE 1410, SL-PCF 1408, entities 1502 1602 3402, 3404, 3502, 3504, 3506, 3602, 3604, 3606 Policy Server 1504, RHF 1604, client 1702, DAEF 1802 and DAEF-Payment, DGF 2102 MAF 2302, MEF 2304, Authorization Function 3702, Payment Function 3802, Barter Function 3902, Security Function 4002, Service Layer Subscription Verification Function 4102, Reputation Verification Function 4202 as well as logical entities to store and operate on the disclosed resources and logical entities to produce interfaces, such as interface 4302. The M2M service layer 22 may be implemented by one or more servers, computers, devices, virtual machines (e.g. cloud/storage forms, etc.) or the like, including for example the devices illustrated in FIGS. 44C and 44D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12 in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 44B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through networks 12 in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as service layer 102, Apps 204 and 202, SLDA 902, SLDA-PA 904, SLDA-PI 906, SLDA-PD 908, SLDA-PE 910, SLSA 1402, SLSA-PA 1404, SLSA-PD 1406, SLSA-PI 1412, SLSA-PE 1410, SL-PCF 1408, entities 1502 1602 3402, 3404, 3502, 3504, 3506, 3602, 3604, 3606 Policy Server 1504, RHF 1604, client 1702, DAEF 1802 and DAEF-Payment, DGF 2102 MAF 2302, MEF 2304, Authorization Function 3702, Payment Function 3802, Barter Function 3902, Security Function 4002, Service Layer Subscription Verification Function 4102, Reputation Verification Function 4202 as well as logical entities to store and operate on the disclosed resources and logical entities to produce interfaces, such as interface 4302 may be hosted within a M2M service layer instance hosted by an M2M node, such as an M2M server, M2M gateway, or M2M device, as shown in FIG. 44B. For example, the logical entities such as service layer 102, Apps 204 and 202, SLDA 902, SLDA-PA 904, SLDA-PI 906, SLDA-PD 908, SLDA-PE 910, SLSA 1402, SLSA-PA 1404, SLSA-PD 1406, SLSA-PI 1412, SLSA-PE 1410, SL-PCF 1408, entities 1502 1602 3402, 3404, 3502, 3504, 3506, 3602, 3604, 3606 Policy Server 1504, RHF 1604, client 1702, DAEF 1802 and DAEF-Payment, DGF 2102 MAF 2302, MEF 2304, Authorization Function 3702, Payment Function 3802, Barter Function 3902, Security Function 4002, Service Layer Subscription Verification Function 4102, Reputation Verification Function 4202 as well as logical entities to store and operate on the disclosed resources and logical entities to produce interfaces, such as interface 4302 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more standalone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 44C or FIG. 44D described below.

Further, logical entities such as service layer 102, Apps 204 and 202, SLDA 902, SLDA-PA 904, SLDA-PI 906, SLDA-PD 908, SLDA-PE 910, SLSA 1402, SLSA-PA 1404, SLSA-PD 1406, SLSA-PI 1412, SLSA-PE 1410, SL-PCF 1408, entities 1502 1602 3402, 3404, 3502, 3504, 3506, 3602, 3604, 3606 Policy Server 1504, RHF 1604, client 1702, DAEF 1802 and DAEF-Payment, DGF 2102 MAF 2302, MEF 2304, Authorization Function 3702, Payment Function 3802, Barter Function 3902, Security Function 4002, Service Layer Subscription Verification Function 4102, Reputation Verification Function 4202 as well as logical entities to store and operate on the disclosed resources and logical entities to produce interfaces, such as interface 4302 can implemented as part of an M2M network that uses a Service Oriented Architecture (SOA) and/or a Resource-Oriented Architecture (ROA) to access services of the present application.

FIG. 44C is a block diagram of an example hardware/software architecture of a M2M network node 30, such as an M2M device 18, an M2M gateway 14, an M2M server, or the like. The node 30 can execute or include logical entities such as service layer 102, Apps 204 and 202, SLDA 902, SLDA-PA 904, SLDA-PI 906, SLDA-PD 908, SLDA-PE 910, SLSA 1402, SLSA-PA 1404, SLSA-PD 1406, SLSA-PI 1412, SLSA-PE 1410, SL-PCF 1408, entities 1502 1602 3402, 3404, 3502, 3504, 3506, 3602, 3604, 3606 Policy Server 1504, RHF 1604, client 1702, DAEF 1802 and DAEF-Payment, DGF 2102 MAF 2302, MEF 2304, Authorization Function 3702, Payment Function 3802, Barter Function 3902, Security Function 4002, Service Layer Subscription Verification Function 4102, Reputation Verification Function 4202 as well as logical entities to store and operate on the disclosed resources and logical entities to produce interfaces, such as interface 4302. The device 30 can be part of an M2M network as shown in FIG. 44A-B or part of a non-M2M network. As shown in FIG. 44C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the SMSF functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 44C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 44C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 44C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., figure print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52. Alternately, the node 30 may comprise apparatuses or devices, such as a sensor, consumer electronics, a wearable device such as a smart watch or smart clothing, a medical or eHealth device, a robot, industrial equipment, a drone, a vehicle such as a car, truck, train, or airplane.

FIG. 44D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as service layer 102, Apps 204 and 202, SLDA 902, SLDA-PA 904, SLDA-PI 906, SLDA-PD 908, SLDA-PE 910, SLSA 1402, SLSA-PA 1404, SLSA-PD 1406, SLSA-PI 1412, SLSA-PE 1410, SL-PCF 1408, entities 1502 1602 3402, 3404, 3502, 3504, 3506, 3602, 3604, 3606 Policy Server 1504, RHF 1604, client 1702, DAEF 1802 and DAEF-Payment, DGF 2102 MAF 2302, MEF 2304, Authorization Function 3702, Payment Function 3802, Barter Function 3902, Security Function 4002, Service Layer Subscription Verification Function 4102, Reputation Verification Function 4202 as well as logical entities to store and operate on the disclosed resources and logical entities to produce interfaces, such as interface 4302. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 44A and FIG. 44B, to enable the computing system 90 to communicate with other nodes of the network.

User equipment (UE) can be any device used by an end-user to communicate. It can be a hand-held telephone, a laptop computer equipped with a mobile broadband adapter, or any other device. For example, the UE can be implemented as the M2M terminal device 18 of FIG. 44A-B or the device 30 of FIG. 44 C.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as service layer 102, Apps 204 and 202, SLDA 902, SLDA-PA 904, SLDA-PI 906, SLDA-PD 908, SLDA-PE 910, SLSA 1402, SLSA-PA 1404, SLSA-PD 1406, SLSA-PI 1412, SLSA-PE 1410, SL-PCF 1408, entities 1502 1602 3402, 3404, 3502, 3504, 3506, 3602, 3604, 3606 Policy Server 1504, RHF 1604, client 1702, DAEF 1802 and DAEF-Payment, DGF 2102 MAF 2302, MEF 2304, Authorization Function 3702, Payment Function 3802, Barter Function 3902, Security Function 4002, Service Layer Subscription Verification Function 4102, Reputation Verification Function 4202 as well as logical entities to store and operate on the disclosed resources and logical entities to produce interfaces, such as interface 4302 may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. An apparatus implementing a service layer entity of a communication network, the service layer entity being an entity of a middleware supporting service capabilities through a set of Application Programming Interfaces (APIs) to provide the service capabilities to a plurality of applications above an application protocol layer, the apparatus comprising:

a transceiver configured to receive, by the service layer entity of the communication network, from a requesting entity of the communication network, a request message requesting access to a resource hosted by the service layer entity, wherein the resource is a uniquely addressable element in the middleware having a representation that can be manipulated via RESTful methods;

one or more processors configured to:

determine, by the service layer entity, based on a service layer access control object associated with the requested resource, that the requesting entity does not have a pre-provisioned service layer access right to the requested resource, wherein the service layer access control object is stored in the middleware to manage service layer access rights to one or more resources of the middleware;

identify, based on the service layer access control object and in response to determining that the requesting entity does not have the pre-provisioned service layer access right to the requested resource, another entity in the middleware of the communications network with which the service layer entity is to consult in performing a dynamic authorization of the requesting entity;

transmit, by the service layer entity, a consultation request message to the another entity in the middleware, the payload of the consultation request message including an identifier of the requesting entity;

determine, in communication with the another entity and based on a consultation response message received from the another entity, to grant the requesting entity a new service layer access right to the requested resource;

update the service layer access control object with the new service layer access right to the requested resource; and the transceiver further configured to send a message to the requesting entity indicating, based on the new service layer access right to the requested resource, that access to the requested resource by the requesting entity is approved.

2. The apparatus of claim 1, wherein an identity of the another entity is provided in a dynamic authorization policy associated with the requested resource.

3. The apparatus of claim 2, wherein the instructions, when executed by the one or more processors further cause the apparatus to:

receive the dynamic authorization policy for the requested resource.

4. The apparatus of claim 1, wherein the instructions, when executed by the one or more processors further cause the apparatus to:

receive, from the another entity, after performing the dynamic authorization, a list of granted service layer access rights for the requesting entity and an expiration time associated with the granted service layer access rights.

5. The apparatus of claim 4, wherein the new service layer access right to the requested resource includes the list of granted service layer access rights.

6. The apparatus of claim 1, wherein the dynamic authorization is performed after receiving an indication that the requesting entity has made a payment.

7. The apparatus of claim 1, wherein the dynamic authorization comprises evaluating reputation information about the requesting entity.

8. A method for use in an apparatus, implementing a service layer entity of a communication network, the service layer entity being an entity of a middleware supporting service capabilities through a set of Application Programming Interfaces (APIs) to provide the service capabilities to a plurality of applications above an application protocol layer, the method comprising:

receiving, by the service layer entity of the communication network, from a requesting entity of the communication network, a request message requesting access to a resource hosted by the service layer entity, wherein the resource is a uniquely addressable element in the middleware having a representation that can be manipulated via RESTful methods;

determining, by the service layer entity, based on a service layer access control object associated with the requested resource, that the requesting entity does not have a pre-provisioned service layer access right to the requested resource, wherein the service layer access control object is stored in the middleware to manage service layer access rights to one or more resources of the middleware;

identifying, based on the service layer access control object and in response to determining that the requesting entity does not have the pre-provisioned service layer access right to the requested resource, another entity in the middleware of the communications network with which the service layer entity is to consult in performing a dynamic authorization of the requesting entity;

transmitting, by the service layer entity, a consultation request message to the another entity in the middleware, a payload of the consultation request message including an identifier of the requesting entity;

determining, in communication with the another entity and based on a consultation response message received from the another entity, to grant the requesting entity a new service layer access right to the requested resource;

updating the service layer access control object with the new service layer access right to the requested resource; and sending a message to the requesting entity indicating, based on the new service layer access right to the requested resource, that access to the requested resource by the requesting entity is approved.

9. The method of claim 8, wherein an identity of the another entity is provided in a dynamic authorization policy associated with the requested resource.

10. The method of claim 9, further comprising:

receiving the dynamic authorization policy for the requested resource.

11. The method of claim 8, further comprising:

receiving, from the another entity, after performing the dynamic authorization, a list of granted service layer access rights for the requesting entity and an expiration time associated with the granted service layer access rights.

12. The method of claim 11, wherein the new service layer access right to the requested resource includes the list of granted service layer access rights.

13. The method of claim 8, wherein the dynamic authorization is performed after receiving an indication that the requesting entity has made a payment.

14. The method of claim 8, wherein the dynamic authorization comprises evaluating reputation information about the requesting entity.

15. An apparatus comprising one or more processors and memory storing instructions which, when executed by the one or more processors, implements a service layer entity of a communication network, the service layer entity being an entity of a middleware supporting service capabilities through a set of Application Programming Interfaces (APIs) to provide the service capabilities to a plurality of applications above an application protocol layer, and causes the apparatus to:

receive, by the service layer entity of the communication network, from a requesting entity of the communication network, a request message requesting access to a resource hosted by the service layer entity, wherein the resource is a uniquely addressable element in the middleware having a representation that can be manipulated via RESTful methods;

determine, by the service layer entity, based on a service layer access control object associated with the requested resource, that the requesting entity does not have a pre-provisioned service layer access right to the requested resource, wherein the service layer access control object is stored in the middleware to manage service layer access rights to one or more resources of the middleware;

identify, based on the service layer access control object and in response to determining that the requesting entity does not have the pre-provisioned service layer access right to the requested resource, another entity in the middleware of the communications network with which the service layer entity is to consult in performing a dynamic authorization of the requesting entity;

transmit, by the service layer entity, a consultation request message to the another entity in the middleware, a payload of the consultation request message including an identifier of the requesting entity;

determine, in communication with the another entity and based on a consultation response message received from the another entity, to grant the requesting entity a new service layer access right to the requested resource;

update the service layer access control object with the new service layer access right to the requested resource; and send a message to the requesting entity indicating, based on the new service layer access right to the requested resource, that access to the requested resource by the requesting entity is approved.

16. The apparatus of claim 15, wherein an identity of the another entity is provided in a dynamic authorization policy associated with the requested resource.

17. The apparatus of claim 15, wherein the instructions, when executed by the one or more processors further cause the apparatus to:

receive, from the another entity, after performing the dynamic authorization, a list of granted service layer access rights for the requesting entity and an expiration time associated with the granted service layer access rights.

18. The apparatus of claim 17, wherein the new service layer access right to the requested resource includes the list of granted service layer access rights.

19. The apparatus of claim 15, wherein the dynamic authorization is performed after receiving an indication that the requesting entity has made a payment.

20. The apparatus of claim 15, wherein the dynamic authorization comprises evaluating reputation information about the requesting entity.

* * * * *